US011650862B2

(12) United States Patent
Tanna et al.

(10) Patent No.: US 11,650,862 B2
(45) Date of Patent: May 16, 2023

(54) SERVICE BUS FOR TELECOM INFRASTRUCTURE

(71) Applicant: Parallel Wireless, Inc., Nashua, NH (US)

(72) Inventors: Poojan Tanna, Nashua, NH (US); Michael C. Silva, East Sandwich, MA (US)

(73) Assignee: Parallel Wireless, Inc., Nashua, NH (US)

( * ) Notice: Subject to any disclaimer, the term of this patent is extended or adjusted under 35 U.S.C. 154(b) by 218 days.

(21) Appl. No.: 16/528,616

(22) Filed: Jul. 31, 2019

(65) Prior Publication Data

US 2020/0042365 A1 Feb. 6, 2020

Related U.S. Application Data

(60) Provisional application No. 62/712,968, filed on Jul. 31, 2018.

(51) Int. Cl.
*H04M 7/06* (2006.01)
*G06F 9/54* (2006.01)
(Continued)

(52) U.S. Cl.
CPC .............. *G06F 9/542* (2013.01); *G06F 9/465* (2013.01); *G06F 9/5027* (2013.01); *G06F 9/546* (2013.01); *G06F 16/182* (2019.01)

(58) Field of Classification Search
CPC ........ G06F 9/542; G06F 16/182; G06F 9/465; G06F 9/5027; G06F 9/546
See application file for complete search history.

(56) References Cited

U.S. PATENT DOCUMENTS 8,549,146 B2 10/2013 Stanisic et al.
9,588,815 B1 3/2017 Mistry et al.
(Continued)

OTHER PUBLICATIONS

Paolo Bellavista et al. "Elastic Provisioning of Stateful Telco Services in Mobile Cloud Networking". (Year: 2018).*
(Continued)

*Primary Examiner* — Doon Y Chow
*Assistant Examiner* — Abdou K Seye
(74) *Attorney, Agent, or Firm* — Michael Y. Saji; David W. Rouille

(57) ABSTRACT

Systems, methods and computer software are disclosed for providing a Service Bus for telecommunications infrastructure. The services bus provides a communications system between mutually interacting software applications, including a plurality of microservices, each microservice comprising: an internal bus; a data store in communication with the internal bus; a data access object in communication with the internal bus; a message exchange object in communication with the internal bus; a MAPReduce engine in communication with the internal bus; and a restful Application Programming Interface (API) bus in communication with the data access object, the message exchange object and the MAPReduce engine. The Service Bus provides a messaging service, a synchronization service and a persistence service, and routes messages between services, monitors and controls routing of message exchange between servers, resolves contention between communicating service components, controls deployment and versioning of services, marshals use of redundant services, and provides commodity services.

20 Claims, 49 Drawing Sheets

(51) Int. Cl.
*G06F 16/182* (2019.01)
*G06F 9/50* (2006.01)
*G06F 9/46* (2006.01)

(56) References Cited

U.S. PATENT DOCUMENTS

| | | |
|---|---|---|
| 2013/0167181 A1 | 6/2013 | Dixit et al. |
| 2014/0310418 A1 | 10/2014 | Sorenson, III et al. |
| 2015/0146519 A1 | 5/2015 | Zakrzewski |
| 2016/0127169 A1 | 5/2016 | Rosa de Sousa Teixeira et al. |
| 2016/0156503 A1 | 6/2016 | Rosa de Sousa Teixeira et al. |
| 2016/0373304 A1 | 12/2016 | Sharma et al. |
| 2017/0093724 A1 | 3/2017 | Bansal et al. |
| 2017/0187785 A1* | 6/2017 | Johnson .................. H04L 67/10 |
| 2017/0208474 A1* | 7/2017 | Mody .................. H04L 5/0091 |
| 2018/0006935 A1 | 1/2018 | Mutnuru et al. |
| 2018/0091420 A1 | 3/2018 | Drake et al. |
| 2018/0176306 A1 | 6/2018 | Kahn |
| 2018/0205574 A1 | 7/2018 | Radunovic et al. |
| 2018/0242162 A1* | 8/2018 | Ashrafi .............. H04L 41/0896 |
| 2018/0285250 A1* | 10/2018 | Helsley .................. G06F 11/34 |
| 2018/0357086 A1 | 12/2018 | Kinsella et al. |
| 2018/0376338 A1 | 12/2018 | Ashrafi |
| 2019/0036678 A1* | 1/2019 | Ahmed ................. H04L 9/3033 |
| 2019/0149425 A1* | 5/2019 | Larish .................. H04L 41/145 706/16 |

OTHER PUBLICATIONS

Jack Jia, "Building Unified PaaS Architecture for Agile Development," Apr. 7, 2017, Huawei Technologies Co., Ltd.
"Enterprise Service Bus," Wikipedia, the free encyclopedia, Retrieved Jul. 30, 2018.
Jorg Niemoller, Ioannis Fikouras, Frans De Rooij, Lucas Klostermann, Ulf Stringer, Ulf Olsson, "Ericsson Composition Engine—Next-generation IN," Jan. 2009, Ericsson Review (English Edition).
Falko Menge, "Enterprise Service Bus," Free and Open Source Software Conference 2007.
"Etisalat Transforms BBS With Ericsson," Dec. 18, 2013, Light Reading, an Informa business, trading within KNect365 US, Inc.
Jeffery Vogel, Michael Stricklen, "How Loosely Coupled Architectures are Helping the Modernization of Legacy Software," Oct. 2, 2017, EYGM Limited (Formerly Bulger Partners).
"Loose Coupling," Wikipedia, the free encyclopedia, Retrieved Jul. 30, 2018.
Jurgen Kress, Berthold Maier, Hajo Normann, Danilo Schmeidel, Guido Schmutz, Bernd Trops, Clemens Utschig-Utschig, Torsten Winterberg, "Enterprise Service Bus," Jul. 2013, Oracle Technical Resources (Formerly Oracle Technology Network).
Richard Watson, "How to Architect and Design Cloud-Native Applications," Dec. 29, 2015, Gartner Research, ID G00296114, retrieved from https://www.gartner.com/en/documents/3181919.
"ICT Platform for Digital Communication Providers," Sep. 2, 2015, Ericsson and TIBCO Software, Inc.

* cited by examiner

FIG. 6

SERVICE BUS FOR TELECOM INFRASTRUCTURE

CROSS-REFERENCE TO RELATED APPLICATIONS

This application claims priority under 35 U.S.C. § 119(e) to U.S. Provisional Pat. App. No. 62/712,968, filed Jul. 31, 2018, titled "Service Bus for Telecom Infrastructure," which is hereby incorporated by reference in its entirety for all purposes. This application also hereby incorporates by reference, for all purposes, each of the following U.S. Patent Application Publications in their entirety: US20170013513A1; US20170026845A1; US20170055186A1; US20170070436A1; US20170077979A1; US20170019375A1; US20170111482A1; US20170048710A1; US20170127409A1; US20170064621A1; US20170202006A1; US20170238278A1; US20170171828A1; US20170181119A1; US20170273134A1; US20170272330A1; US20170208560A1; US20170288813A1; US20170295510A1; US20170303163A1; and US20170257133A1. This application also hereby incorporates by reference U.S. Pat. No. 8,879,416, "Heterogeneous Mesh Network and Multi-RAT Node Used Therein," filed May 8, 2013; U.S. Pat. No. 9,113,352, "Heterogeneous Self-Organizing Network for Access and Backhaul," filed Sep. 12, 2013; U.S. Pat. No. 8,867,418, "Methods of Incorporating an Ad Hoc Cellular Network Into a Fixed Cellular Network," filed Feb. 18, 2014; U.S. patent application Ser. No. 14/034,915, "Dynamic Multi-Access Wireless Network Virtualization," filed Sep. 24, 2013; U.S. patent application Ser. No. 14/289,821, "Method of Connecting Security Gateway to Mesh Network," filed May 29, 2014; U.S. patent application Ser. No. 14/500,989, "Adjusting Transmit Power Across a Network," filed Sep. 29, 2014; U.S. patent application Ser. No. 14/506,587, "Multicast and Broadcast Services Over a Mesh Network," filed Oct. 3, 2014; U.S. patent application Ser. No. 14/510,074, "Parameter Optimization and Event Prediction Based on Cell Heuristics," filed Oct. 8, 2014, U.S. patent application Ser. No. 14/642,544, "Federated X2 Gateway," filed Mar. 9, 2015, and U.S. patent application Ser. No. 14/936,267, "Self-Calibrating and Self-Adjusting Network," filed Nov. 9, 2015; U.S. patent application Ser. No. 15/607,425, "End-to-End Prioritization for Mobile Base Station," filed May 26, 2017; U.S. patent application Ser. No. 15/803,737, "Traffic Shaping and End-to-End Prioritization," filed Nov. 27, 2017. This document also hereby incorporates by reference U.S. Pat. Nos. 9,107,092, 8,867,418, and 9,232,547 in their entirety. This document also hereby incorporates by reference U.S. patent application Ser. Nos. 14/822,839, 15/828,427, U.S. Pat. App. Pub. Nos. US20170273134A1, US20170127409A1 in their entirety. This application also incorporates by reference application, titled "Distributed Multi-HNG SON" and having U.S. Pat. App. No. 62/712,954, filed on Jul. 31, 2019. Features and characteristics of and pertaining to the systems and methods described in the present disclosure, including details of the multi-RAT nodes and the gateway described herein, are provided in the documents incorporated by reference.

BACKGROUND

A microservice is a software development technique—a variant of the service-oriented architecture (SOA) architectural style that structures an application as a collection of loosely coupled services. In a microservices architecture, services are fine-grained and the protocols are lightweight. The benefit of decomposing an application into different smaller services is that it improves modularity and makes the application easier to understand, develop, test, and more resilient to architecture erosion. It also parallelizes development by enabling small autonomous teams to develop, deploy and scale their respective services independently. It also allows the architecture of an individual service to emerge through continuous refactoring. Microservices-based architectures enable continuous delivery and deployment.

Another term commonly used to describe a telecom network architecture is network function virtualization (NFV). Network functions virtualization (also network function virtualization or NFV) is a network architecture concept that uses the technologies of IT virtualization to virtualize entire classes of network node functions into building blocks that may connect, or chain together, to create communication services. NFV may be used in conjunction with a microservices-based architecture.

Microservices are modular, distributed software components that can be deployed in the cloud. Network functions virtualization (NFV) is a means of building applications and services that can be deployed with software to run on any industry-standard hardware platform, rather than relying on proprietary infrastructure solutions. Microservices can be used to build NFV services. The best way to think of microservices is as a way to simplify large, complicated software systems by breaking them into sub-components and distributing them across many computing servers or in the cloud. This allows the applications to be managed and coordinated over a large virtualized infrastructure.

The 5G standard under active development by the Third Generation Partnership Project (3GPP) is complementary to, and designed to take advantage of, a microservices-based architecture. As 5G specifies network slicing, in which different network users can place significantly different demands on the network, the flexibility of a microservices-based architecture offers advantages for providing redundant and flexible network slicing by providing resources that can be quickly deployed, brought up and brought down, instead of using monolithic hardware and software core network stacks.

The protocols described herein have largely been adopted by the 3GPP as a standard for the upcoming 5G network technology as well, in particular for interfacing with 4G/LTE technology. For example, X2 is used in both 4G and 5G and is also complemented by 5G-specific standard protocols called Xn. Additionally, the 5G standard includes two phases, non-standalone (which will coexist with 4G devices and networks) and standalone, and also includes specifications for dual connectivity of UEs to both LTE and NR ("New Radio") 5G radio access networks. The inter-base station protocol between an LTE eNB and a 5G gNB is called Xx. The specifications of the Xn and Xx protocol are understood to be known to those of skill in the art and are hereby incorporated by reference dated as of the priority date of this application.

Cloud computing benefits are realized by implementing a solution with elastic scalability, metered consumption and automation, not by simply using IaaS or PaaS. IT architects must adopt cloud-native principles and design patterns such as microservices and understand the impact of design decisions. However, cloud computing requires a cloud-native architecture.

Cloud-native applications typically: use dynamic, shared and virtual infrastructure; offer a service in an on-demand, self-service model; scale rapidly and elastically; meter consumption; and are available across common networks.

Applications are able to realize these advantages when they are designed to be: latency-aware; instrumented; failure-aware; event-driven; secure; parallelizable; automated; and resource-consumption-aware.

A cloud native application is engineered to run on a platform and is designed for resiliency, agility, operability, and observability. Resiliency embraces failures instead of trying to prevent them; it takes advantage of the dynamic nature of running on a platform. Agility allows for fast deployments and quick iterations. Operability adds control of application life cycles from inside the application instead of relying on external processes and monitors. Observability provides information to answer questions about application state.

There are certain anti-patterns that are hallmarks of the pre-cloud era, which tend to be characteristics of the telecom and NFV world, that should be avoided: ACID transactions; chatty interactions; complex dependencies; direct code-to-runtime relationship; hardware affinity; latency guarantees; manual provisioning workflow; monolithic design and deployment; resource hogging; scalability by application server clustering; scalability by scaling vertically; single points of bottleneck; single points of failure; single tenancy; single-threaded, serial execution; stateful services; and synchronous interactions.

Viewed in this light, data replication, containerization, eventual consistency, message passing, stateless services, single source of truth (SSOT), and workload decomposition, among other patterns, are helpful for realizing a truly cloud-native application, as seen herein. Cloud-native infrastructure means infrastructure that flexibly utilizes the underlying compute, storage, and network and is not tied to any specific underlying deployment.

SUMMARY

Systems and methods for a Service Bus for telecom infrastructure are described. This Service Bus will be explained with reference to providing self-organizing network (SON) functionality across multiple coordinating nodes (each referred to as a Heterogeneous Network Gateway, or HetNet Gateway, or HNG, and collectively referred to as a MultiHNG deployment). Legacy functionality is typically implemented using dedicated compute and storage resources, and typically the use of a single HNG is implemented on this basis, i.e., using a central brain architecture with fixed compute resources. However, new design patterns and practices have made it possible to design a telecom service architecture using a messaging protocol at its core. Using advanced messaging and an enterprise Service Bus architecture, multiple nodes could be coordinated effectively even using multiple "brains," or multiple HNGs, even while providing a synchronized, unified view of the system.

In one embodiment, a method may be disclosed for providing a Service Bus for telecommunications infrastructure. The Service Bus comprises a communications system between mutually interacting software applications, including a plurality of microservices, each microservice comprising: an internal bus; a data store in communication with the internal bus; a data access object in communication with the internal bus; a message exchange object in communication with the internal bus; a MAPReduce engine in communication with the internal bus; and a restful Application Programming Interface (API) bus in communication with the data access object, the message exchange object and the MAPReduce engine. The Service Bus includes a messaging service, a synchronization service and a persistence service, The Service Bus for routing messages between services, monitoring and controlling routing of message exchange between servers, resolving contention between communicating service components, controlling deployment and versioning of services, marshaling use of redundant services, and providing commodity services.

In another embodiment, a system for providing a Service Bus for telecommunications infrastructure, includes a communications system between mutually interacting software applications, including a plurality of microservices, each microservice comprising an internal bus; a data store in communication with the internal bus; a data access object in communication with the internal bus; a message exchange object in communication with the internal bus; a MAPReduce engine in communication with the internal bus; and a restful Application Programming Interface (API) bus in communication with the data access object, the message exchange object and the MAPReduce engine. The Service Bus includes a messaging service, a synchronization service and a persistence service, and wherein messages are routed between services, routing of message exchange between servers are monitored and controlled, contention between communicating service components are resolved, deployment and versioning of services are controlled, use of redundant services is marshalled, and commodity services are provided.

In another embodiment, a non-transitory computer-readable medium is disclosed that contains instructions for providing a Service Bus for telecommunications infrastructure. The instructions include instructions for providing a communications system between mutually interacting software applications, including a plurality of microservices, each microservice comprising: an internal bus; a data store in communication with the internal bus; a data access object in communication with the internal bus; a message exchange object in communication with the internal bus; a MAPReduce engine in communication with the internal bus; and a restful Application Programming Interface (API) bus in communication with the data access object, the message exchange object and the MAPReduce engine. The instructions further provide a messaging service, a synchronization service and a persistence service, and instructions for routing messages between services, monitoring and controlling routing of message exchange between servers, resolving contention between communicating service components, controlling deployment and versioning of services, marshaling use of redundant services, and providing commodity services.

BRIEF DESCRIPTION OF THE DRAWINGS

FIG. 6 is a diagram of a network architecture for a single data center, in accordance with some embodiments.

DETAILED DESCRIPTION

Figure 1:
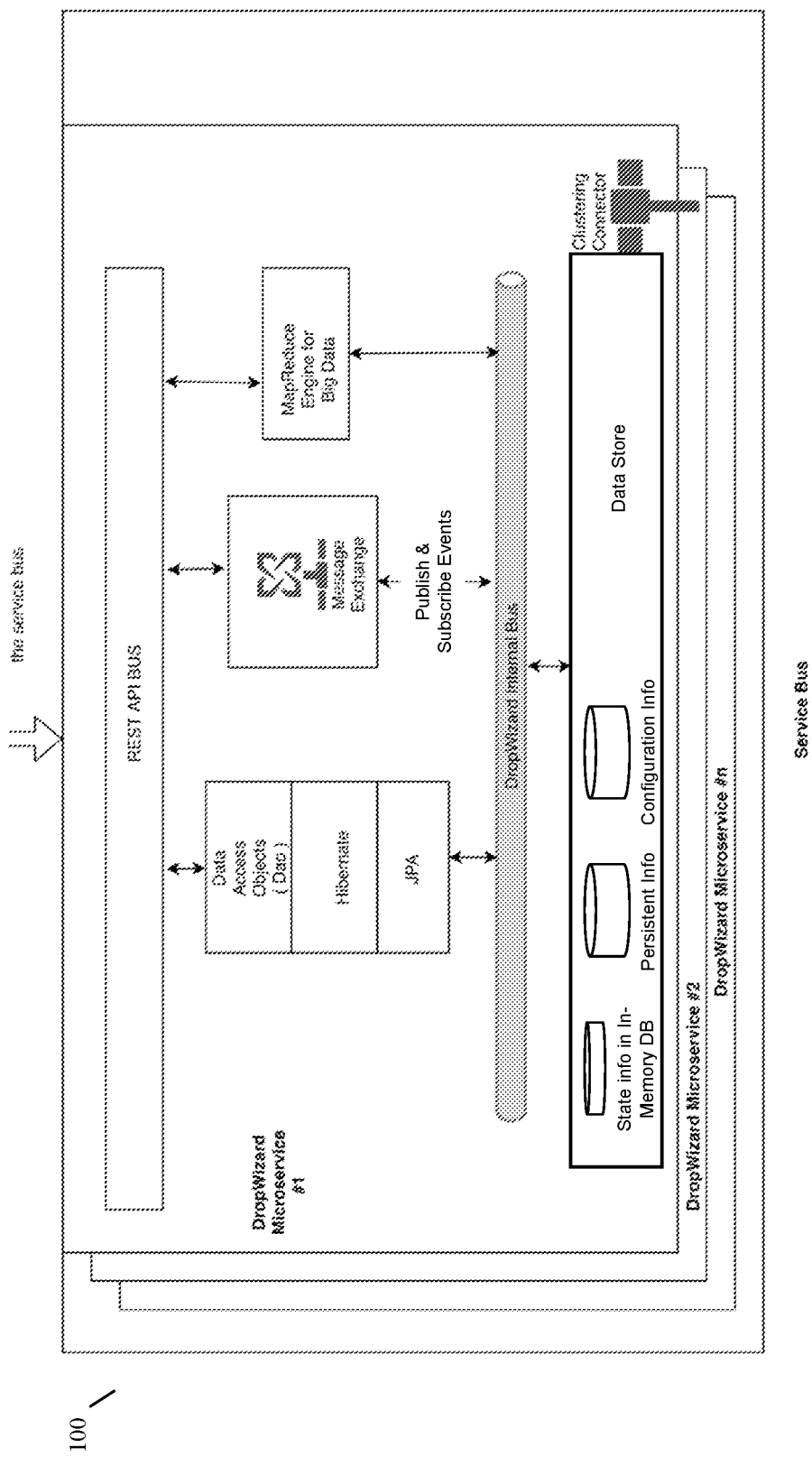
FIG. 1 is a system diagram showing components of a Service Bus, in accordance with some embodiments.

The present application details a truly cloud-native implementation of a coordinating network that is suitable for a variety of deployment scenarios and challenges. The present disclosure describes an architecture that is able to handle real-world workloads, at scale, while being upgradeable, composable, extensible, etc. This architecture is also able: to handle any radio access technology (RAT), from Wi-Fi to 2G, 3G, 4G, or even 5G; to provide multi-RAT coordination across RATs, transparently without requiring upgrades to be made of any of the core networks; and to provide customer-facing advantages when it comes to billing, data usage estimation, and quality of service. The coming 5G next-generation radio (5G NR), which requires both extremely high resource availability for demanding mm-wave and MIMO applications, and extremely low resource consumption for narrowband IOT, is the ideal test case for the scalability and flexibility provided by the present disclosure.

As used herein, a HetNet Gateway (HNG) is a multipurpose gateway situated between one or more base stations and the cellular core network, used to coordinate both signaling and data between the base stations and the cellular core network. The HNG is configured to provide a connection to one or more core networks to the base station, hiding the complexity of the underlying core network or networks; likewise, the HNG is configured to provide a connection to one or more base stations from the core networks. The HNG does this by acting as a virtualizing proxy, presenting itself as a single base station to the core network and as a single core network to the base station, regardless of the number or type of base stations that are connected through it, thereby enabling any radio access technology (RAT), any G, 2G/3G/4G/5G/Wi-Fi/etc. connectivity to the core and also enabling a variety of core infrastructures to be used with the base station, such as 2G+3G, 4G, 4G+IMS, 5G NSA, 5G SA, etc. The HNG is able to facilitate SON services as described herein for base stations that are connected through it. The HNG is able to interoperate with other HNGs to effectively and efficiently perform load balancing for gateway and proxy services as well. The HNG is further described throughout the present disclosure, in the above incorporations by reference, and in particular with reference to FIG. 7 and coordinating server 700.

As used herein, a CWS is a base station that is configured for use with the HNG. The CWS can be a 4G eNodeB, a 3G nodeB, a 2G BTS, a 5G gNodeB, a Wi-Fi access point coupled with a security gateway, or a multi-RAT node, for example, 2G+4G, 2G+3G, 3G+4G, 4G+5G, 4G+Wi-Fi, etc. The CWS typically is configured with wireless backhaul via a cellular modem that connects to another cell tower, such as a 4G or 5G macro cell tower, to provide wireless backhaul for both signaling and data. Various configurations of CWS are contemplated. For example, remote radio heads, central unit/distributed unit (CU/DU) splits, 5G NR, Wi-Fi or Wi-Fi mesh backhaul instead of or in conjunction with cellular backhaul are all contemplated. The HNG coordinates the CWS to provide the desired level and type of access network to provide coverage to UEs. Wherever "eNodeB" is used in the present disclosure, it is understood that the inventors have contemplated an implementation with a CWS providing one or more RATs as well as and other than 4G, including 2G, 3G, 5G, and Wi-Fi. The principles (e.g., PCI, ECGI, X2, etc.) that are described herein with regards to 4G have equivalents in other RATs as well that have been contemplated by the inventors, particularly since the combination CWS-HNG architecture is similar for any G/any RAT.

In some cases herein, a CWS is identified as a mobile CWS or mobile eNodeB. This is intended to reflect, in some embodiments, a base station that is configurable to be used in more than one physical location and/or a base station that is configurable to be used while in motion and/or a base station that is configurable to be used based from a vehicle.

Containers and OS-Level Virtualization

Containers, or operating-system-level virtualization, refers to an operating system feature in which the kernel allows the existence of multiple isolated user-space instances. Such instances, called containers, partitions, virtualization engines (VEs) or jails (FreeBSD jail or chroot jail), may look like real computers from the point of view of programs running in them. A computer program running on an ordinary operating system can see all resources (connected devices, files and folders, network shares, CPU power, quantifiable hardware capabilities) of that computer. However, programs running inside a container can only see the container's contents and devices assigned to the container. Containers have the advantages of being able to be spawned, destroyed, configured, or spanned across the underlying hardware in software-configurable fashion, but unlike virtual machines, which have similar advantages, they are more lightweight owing to not needing a hypervisor.

An alternative to hypervisors are Linux containers, which run in isolated partitions of a single Linux kernel running directly on the physical hardware. Linux cgroups and namespaces are the underlying Linux kernel technologies used to isolate, secure and manage the containers. Containerisation offers higher performance than virtualization, because there is no hypervisor overhead. Also, container capacity auto-scales dynamically with computing load, which eliminates the problem of over-provisioning and enables usage-based billing.

NFV Versus Scalability

Network functions virtualization (also network function virtualization or NFV) is a network architecture concept that uses the technologies of IT virtualization to virtualize entire classes of network node functions into building blocks that may connect, or chain together, to create communication services. However, this ETSI-promoted telecom-oriented standard does not provide true scalability. Instead, it proposes that telecom operators use hardware virtualization to instantiate more of the existing, monolithic, single-purpose network function devices that are already present in the network. These stateful devices are not cloud-native and do not provide the advantages, e.g., decomposability and seamless scalability, of the cloud-native design patterns. Also, this approach does not enable single ingress/egress IP, or independently-functioning HNGs that still interoperate per common customer use cases.

Auto-Scaling on any Managed Infrastructure

Infrastructure as a service (IaaS) refers to online services that provide high-level APIs used to dereference various low-level details of underlying network infrastructure like physical computing resources, location, data partitioning, scaling, security, backup etc. A hypervisor, such as Xen, Oracle VirtualBox, Oracle VM, KVM, VMware ESX/ESXi, or Hyper-V, LXD, runs the virtual machines as guests. Pools of hypervisors within the cloud operational system can support large numbers of virtual machines and the ability to scale services up and down according to customers' varying requirements. Linux containers run in isolated partitions of a single Linux kernel running directly on the physical hardware. Linux cgroups and namespaces are the underlying Linux kernel technologies used to isolate, secure and manage the containers. Containerisation offers higher performance than virtualization, because there is no hypervisor overhead. Also, container capacity auto-scales dynamically with computing load, which eliminates the problem of over-provisioning and enables usage-based billing. IaaS clouds often offer additional resources such as a virtual-machine disk-image library, raw block storage, file or object storage, firewalls, load balancers, IP addresses, virtual local area networks (VLANs), and software bundles.

Typically, IaaS involves the use of a cloud orchestration technology like Open Stack, Apache Cloudstack or Open Nebula. This manages the creation of a virtual machine and decides on which hypervisor (i.e. physical host) to start it, enables VM migration features between hosts, allocates storage volumes and attaches them to VMs, usage information for billing and lots more.

Where described herein, a "manager," "mgr," or "-conn" is a process running on a coordinating server with multiple threads or processes, which may be virtualized to run on any underlying hardware, for example a container or a virtual machine. Where a "UniTask" is described herein, the UniTask is a single generic process that can be of any of the types of managers or conn's described herein. These processes are described in their pre-cloud implementation in U.S. patent application Ser. No. 14/642,544, "Federated X2 Gateway," and its related or incorporated applications. For example, a UEMgr is a software process that operates to provide certain services to a UE or mobile device, and a SonMgr is a software process that operates to select appropriate self-organizing network (SON) parameters for a network. Any and all of the processes or methods described in this disclosure or the applications incorporated by reference herein may be implemented on such a software process, and such software processes may use containers and the other design patterns described herein to create the flexible, scalable architecture. In some embodiments, multi-RAT coordination may be provided by a UniTask. A core network may be provided by a UniTask.

Service Bus should, in some embodiments, be able to provide pattern for: One-To-One bidirectional communication between two UniTask across different systems/VM's; Many-to-Many, One-To-Many and Many-To-One communication between UniTask's for information sharing across different systems/VM's; Service Discovery such that One Unitask is able to dynamically discover another UniTask based on the service offered; dynamic Discovery the UniTask based on service offered and able to communicate using One-To-One Design pattern; persisting the Unitask State and Data; persisting the Unitask State and Data and provide the notification to other UniTask registered for monitoring the state/data change; and internal control load balancing between the same group of UniTask offering the same service.

Service Bus should support all modes of deployment including bare metal, VM's & containers; should support pattern for synchronization services like managing common resources, leader election for master/slaves nodes dynamically; should support pattern for zero touch configuration automating the IP address allocation, configuration synchronization across different UniTasks; should support all modes of pattern to support communication across Data centers. The design patterns supported by SB should be horizontally scalable. Distributed logging, statistics & alarms mechanism should be supported.

Enterprise Service Bus

An enterprise Service Bus (ESB) implements a communication system between mutually interacting software applications in a service-oriented architecture (SOA). It implements a software architecture as depicted in the picture. As it implements a distributed computing architecture, it implements a special variant of the more general client-server model, wherein, in general, any application using ESB can behave as server or client in turns. ESB promotes agility and flexibility with regard to high-level protocol communication between applications. The primary goal of the high-level protocol communication is enterprise application integration (EAI) of heterogeneous and complex service or application landscapes (a view from the network level).

The concept is analogous to the bus concept found in computer hardware architecture combined with the modular and concurrent design of high-performance computer operating systems. The motivation for the development of ESB was to find a standard, structured, and general-purpose concept for describing implementation of loosely coupled software components (called services) that are expected to be independently deployed, running, heterogeneous, and disparate within a network. ESB is also a common implementation pattern for service-oriented architecture.

An ESB applies the design concept of modern operating systems to independent services running within networks of disparate and independent computers. Like concurrent operating systems an ESB provides commodity services in addition to adoption, translation and routing of client requests to appropriate answering services.

The primary duties of an ESB are typically to: Route messages between services; Monitor and control routing of message exchange between services; Resolve contention between communicating service components; Control deployment and versioning of services; Marshal use of redundant services; and Provide commodity services like event handling, data transformation and mapping, message and event queuing and sequencing, security or exception handling, protocol conversion and enforcing proper quality of communication service.

Key benefits: Scales from point-solutions to enterprise-wide deployment (distributed bus); More configuration rather than integration coding; No central rules-engine, no central broker; Easy plug-in and plug-out and loosely coupling system. Key disadvantages: Slower communication speed, especially for those already compatible services; Single point of failure, can bring down all communications in the Enterprise; High configuration and maintenance complexity.

In the domain of software architecture, coupling is a characteristic that defines the degree to which components of a system depend on one another. Tightly coupled architectures are composed of components that require detailed knowledge of other collaborating components, either within the same application or with another application via programmatic integration, to perform their purpose. In a tightly coupled system, cross-dependencies are codified into the components themselves, and therefore any changes to the behavior of any one component often requires changes to components across the system. Additionally, components in a tightly coupled architecture often require a real-time synchronous approach to communications to ensure control flow occurs as expected by the programmers who wrote the code.

By comparison, a loosely coupled system is one in which each of its components has, or makes use of, little or no knowledge of the definitions of other separate components. A loosely coupled architecture is composed of elements that can stand independently and are resilient to changes in the behavior of components with which they collaborate. Communications between components are most often conducted using an asynchronous channel. This allows components to process events and messages on their own terms without impacting the operation of the component that sent the event or message.

Loose coupling can greatly improve application scalability, resilience, maintainability, and extensibility. Scalability improves in two dimensions—firstly, loosely coupled components are cloned as needed to handle additional demand thus scaling "out" capacity, and secondly one can further decompose components into smaller functional units to provide additional leverage for scaling up to higher levels of load.

Due to the event-driven nature of the architecture, a system utilizing loosely coupled components that communicate asynchronously is much more resilient when compared to a monolithic system with synchronous communications. Asynchronous communication avoids the waiting that one component does after it The Service Bus provides various infrastructure services which would help us to be cloud native totally Stateless horizontally scalable system. In order to realize horizontally scalable system, two patterns need to be incorporated into the design:

a) Stateless—The UniTask process should be stateless. The processing and state information need to be separated and the UniTask essentially would be processing engine with the state information. The state information would be stored externally out of the UniTask.

b) Loose Coupling—This concept emphasis to remove the stickiness within the system. For example, we currently have a UEManager tied for specific call processing providing stickiness. If we could eliminate this stickiness wherein any UEManager can process any call events we can easily scale up/down UEManager as per the customer call model providing scalability.

Service Bus provides Services to achieve Stateless and loose coupling pattern to UniTask and help scale HNG. Service Bus offers persistence—it provides Distributed Data Store both in-memory as well as on the disk using Hibernate and JPA 2.0. Sharding is used to make data highly available. Service Bus also provides a Subscribe and Publish Service—it uses RabbitMQ as the message exchange to achieve this functionality.

3. Data Analytics—It provides MapReduce engine for big data analytics.

4. Load balancing using HAProxy or another load balancer.

Service Bus is essentially a microservice. All the above-mentioned services are exposed via RESTFul API. Persistence service would help to achieve Stateless Architecture—the stateless architecture would have the state information and the call processing engine decoupled. Since the state information is decoupled it could be stored on the external datastore using the Persistence service offered by Service Bus. A RESTful API is A RESTful API is an application program interface (API) that uses HTTP requests to GET, PUT, POST and DELETE data. A RESTful API, also referred to as a RESTful web service, is based on representational state transfer (REST) technology, an architectural style and approach to microservices that is common in web services.

The stateless architecture is one of the most preferred mechanism to achieve horizontal scalability for a cloud native application.

Sub/Pub Exchange—one of the other properties of cloud native applications is loose coupling and hence remove stickiness to a process/application. In the event driven approach, the processing engines would subscribe for an event and exchange has the responsibility to send the event once published. In our software, the demuxes couples (UniRanConn & EpcConn) the call to the same processing engine (UEManager). So there is stickiness between the demuxes and UEManager and it could be removed using this framework.

Redundancy—due to stateless approach, the state information is stored in the external distributed data store. The data store has cluster formation allowing multiple processing engines on different host to access the data. Additionally, sharding is used for distributing the load and improving access time. The data is replicated for high availability. All these instruments help achieve redundancy functionality.

Data Analytics—most of the decision that are made in the system are based on limited data set present in memory. Some application specifically SON algorithms would require larger data set to make more informed decisions. Hence simplistic MapReduce engine is integrated to work on the data stored in the data store and provide summarized information.

The architecture of a Service Bus 100 is shown in FIG. 1. Service Bus is essentially a group of microservices. REST API can be managed by swagger module. Hibernate along with Java Persistence API are integrated into Service Bus to provide the abstraction of data store. HQL (Hibernate Query Language) is used in Database Access Objects to query to access the underlying datastore. Both Mongo and Cassandra flavors are available as underlying data store. Clustering and Sharding is configured for the data store. Clustering between difference microservices would enable Service Bus itself to be stateless architecture. RabbitMQ or Kafka, or other messaging protocols, etc. can be used for message exchange. REST API's are exposed to publish/subscribe to events.

UniTask communicates with Service Bus. UniTask support both Asynchronous as well as Synchronous communication framework using a unified API's.

Figure 2:
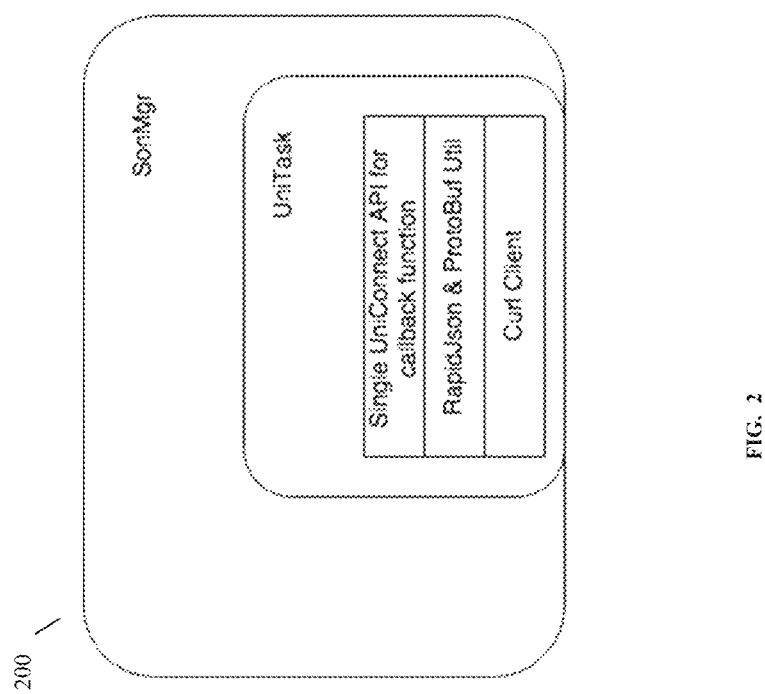
FIG. 2 is a diagram of a Service Bus interface framework, in accordance with some embodiments.

FIG. 2 shows the interface framework 200 that is part of UniTask and hence any application task inheriting the UniTask would get this Interface module as follows. Each UniTask will have the following components: single API for callback function; JSON and protobuf utilities; and a curl client for retrieving URLs. Many UniTasks are in one SonMgr.

Figure 3:
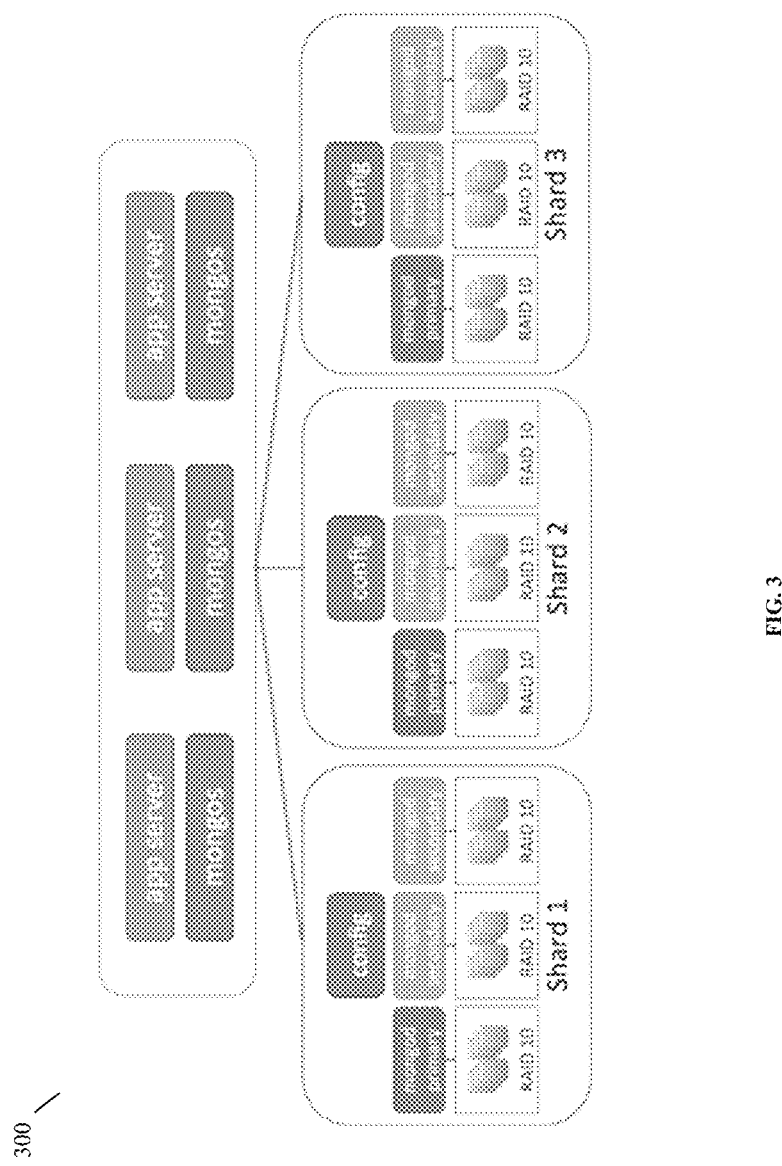
FIG. 3 is a diagram of a Service Bus distributed data store, in accordance with some embodiments.

Service Bus realizes Distributed Data store 300 as shown in FIG. 3. Multiple MongoDB database app servers are shown, each sharded as shown here. Each shard has a config front end, coupled with one primary and several secondary database instances. Each database instance is backed by storage, here, shown with exemplary storage in RAID level 10.

Figure 4:
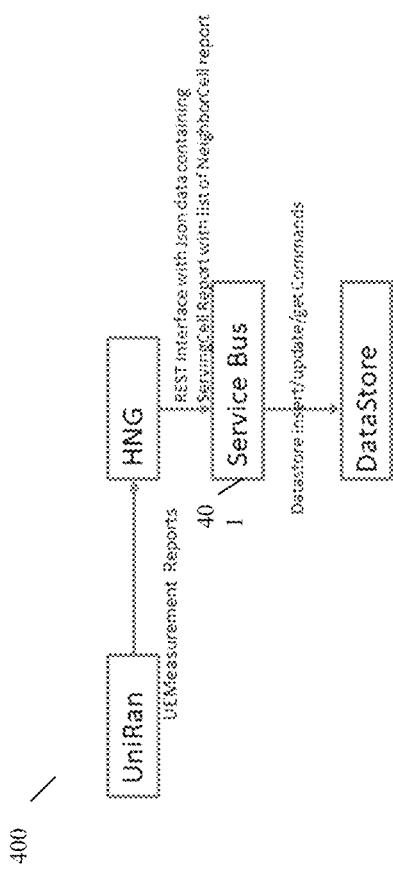
FIG. 4 is a diagram of information flow, in accordance with some embodiments.

FIG. 4 shows the high level flow of information 400 for a use case for Service Bus 401 integrated with UniTask. The Son Transmit Power subsystem is going stateless by persisting the state information to the datastore communicates with another component. When layers of software are tied together synchronously, the "waiting" for responses of this integration adds up and often results in unintended bottlenecks that any one designer of any one component could not predict and thus factor into their design. Here, the UniRAN sends information to the HNG, which sends information via a service bus to a data store, which is able to persist state asynchronously.

Tightly bound application architectures tend to accrete complexity as they move through their lifecycle. This tendency is so prevalent that developers have coined a term for the resulting system—a Big Ball of Mud (BBoM). When a development team is asked to fix a bug or extend a feature in a BBoM, the resulting effort can span across the entire system and prove to be very costly to accomplish—an effort known amongst developers as shotgun surgery. By comparison, a well-designed loosely coupled architecture will typically only require changes to discrete components, and those changes will not have cascading effects across the system. This more focused effort is both less costly to develop and less risky to implement into production.

Figure 5:
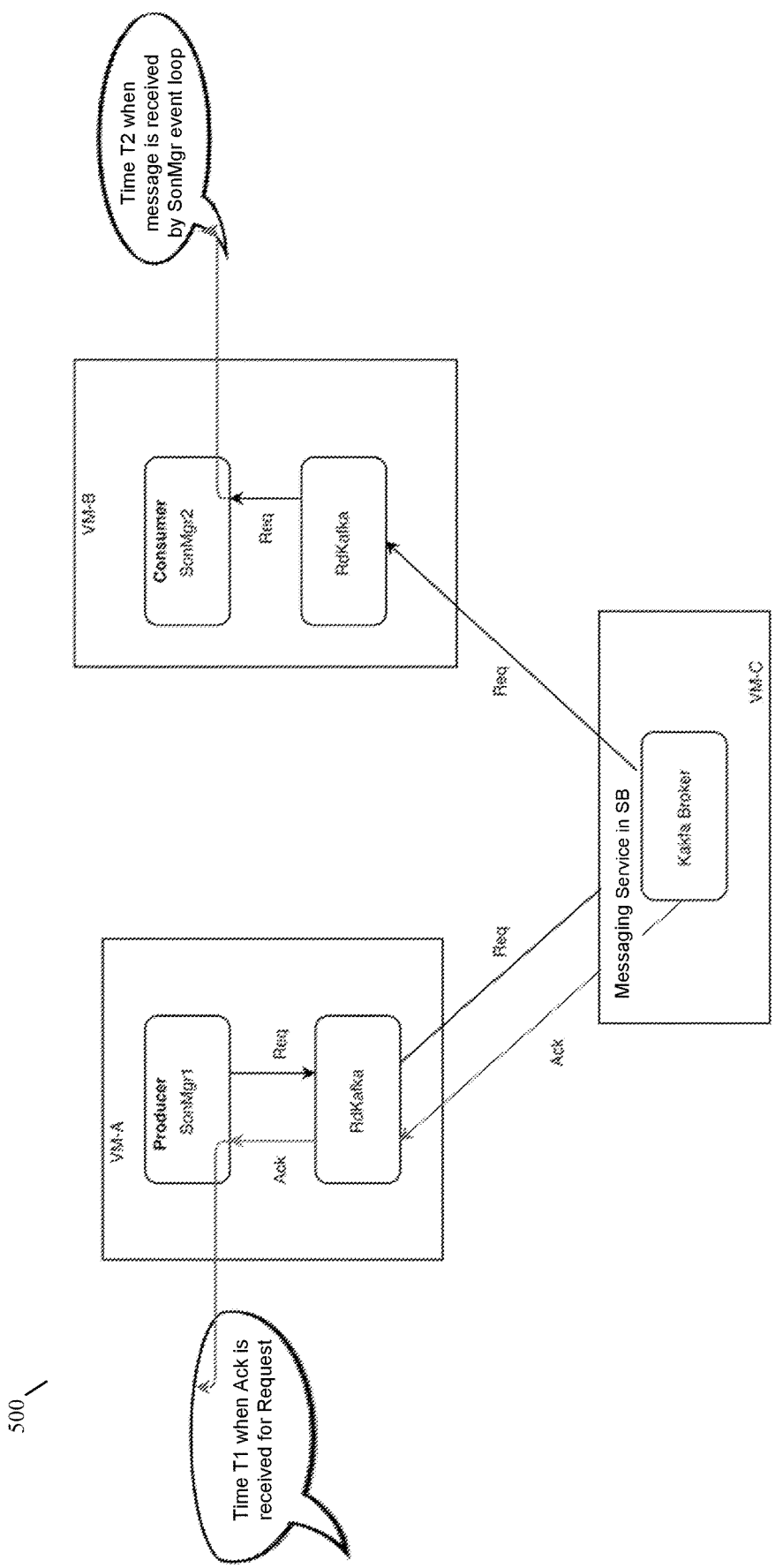
FIG. 5 is a diagram of a messaging architecture, in accordance with some embodiments.

A basic messaging architecture 500 is shown in FIG. 5. SonMgr1, SonMgr2 and Kafka Broker are running on different VM's. Each message has Key and Data of 512 bytes. The key is the incremental sequence number. It is used to relate the request across system. SonMgr1, SonMgr2 are dummy clients calling RdKafka API to produce/consume messages. In this setup SonMgr1 is producer using RDKafka API's to produce and SonMgr2 is consuming message. Both SonMgr1 and SonMgr2 uses the EventLoop to send and receive messages. They have registered the socket for message exchange with the event loop. 50K messages are sent from Producer to Consumer at the rate of 1000 messages/sec. Delivery Ack is enabled. This means that for each message that Producer produces it would receive an Ack. Note that time T1, when the first Ack is received by VM-A, need not be the same as Time T2, when the message is received by VM-B.

Figure 6:
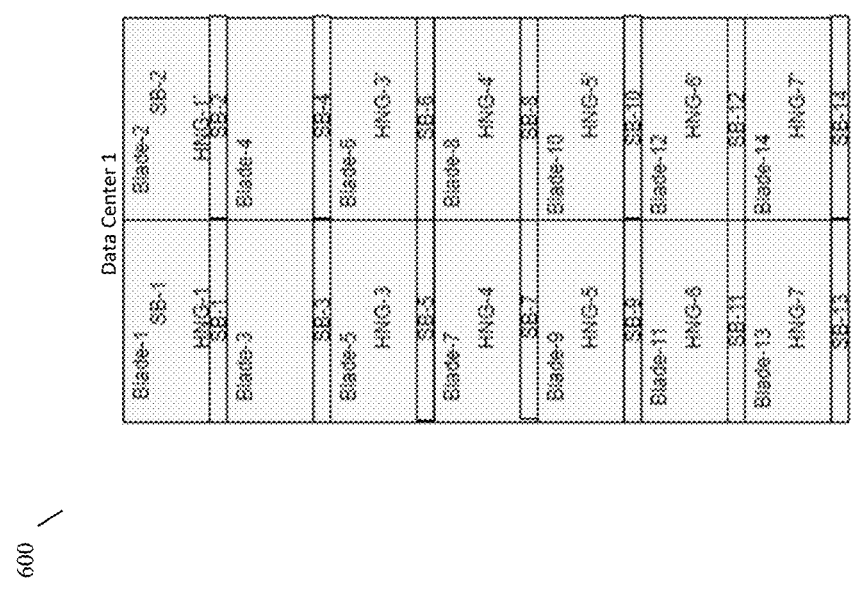

FIG. 6 shows a network architecture 600 for a single data center (DC). In some embodiments, the datacenter could have one chassis with 14 blades. 7 HNG clusters in Active—Standby mode would be created with these 14 blades. Each HNG Blade would run Service Bus. Minimal model supported is 3 HNG clusters (6 blades).

Inter Data Center Mirroring is contemplated, in some embodiments. Each Data center as mentioned in previous section is self-reliant unified system. Multiple Data center cluster is created by mirroring the data from one DC to another. Both the Data centers would be identical in terms of Service Bus setup. Service Bus on DC-1 would form a cluster and mirror the data to the SB cluster on DC2 and vice-versa.

Figure 7:
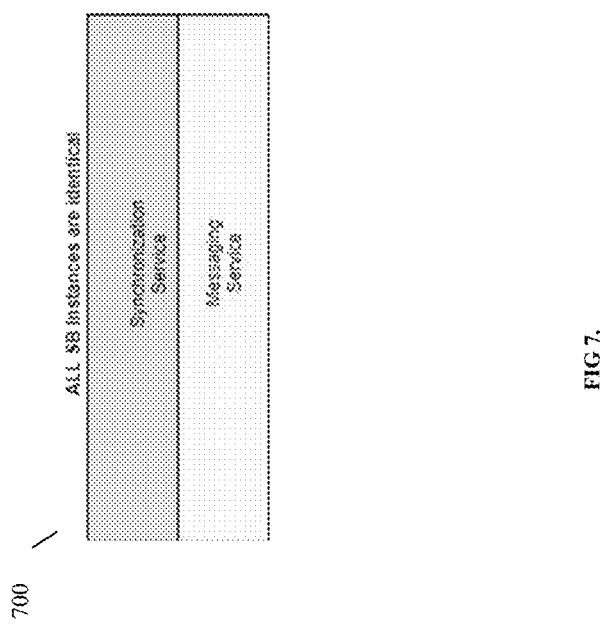
FIG. 7 is a diagram showing Service Bus internals, in accordance with some embodiments.

FIG. 7 shows Service Bus 700 is a microservice that can be based on Dropwizard microservices framework. It hosts multiple services like messaging 701 and synchronization 702 within the framework. Service Bus instance 700 is one such unit of execution. Each SB instance would be independent and would host the service. Also, it would have its own IP and is an entity. Multiple Service Bus instances are created each rendering one or all the services. Service Bus is a stateless entity and the state is the property of the service itself. For example, for messaging service the state information is stored externally by messaging broker. Since Service Bus is stateless it does not have any redundancy requirements. Service Bus IP/Networking requirements are based on the services it offers as explained in subsequent sections. All the instance of Service Bus are identical. Both these instances would be hosting two services: a) Synchronization Service; and b) Messaging Service.

Details of Services Offered by Service Bus

Figure 8:
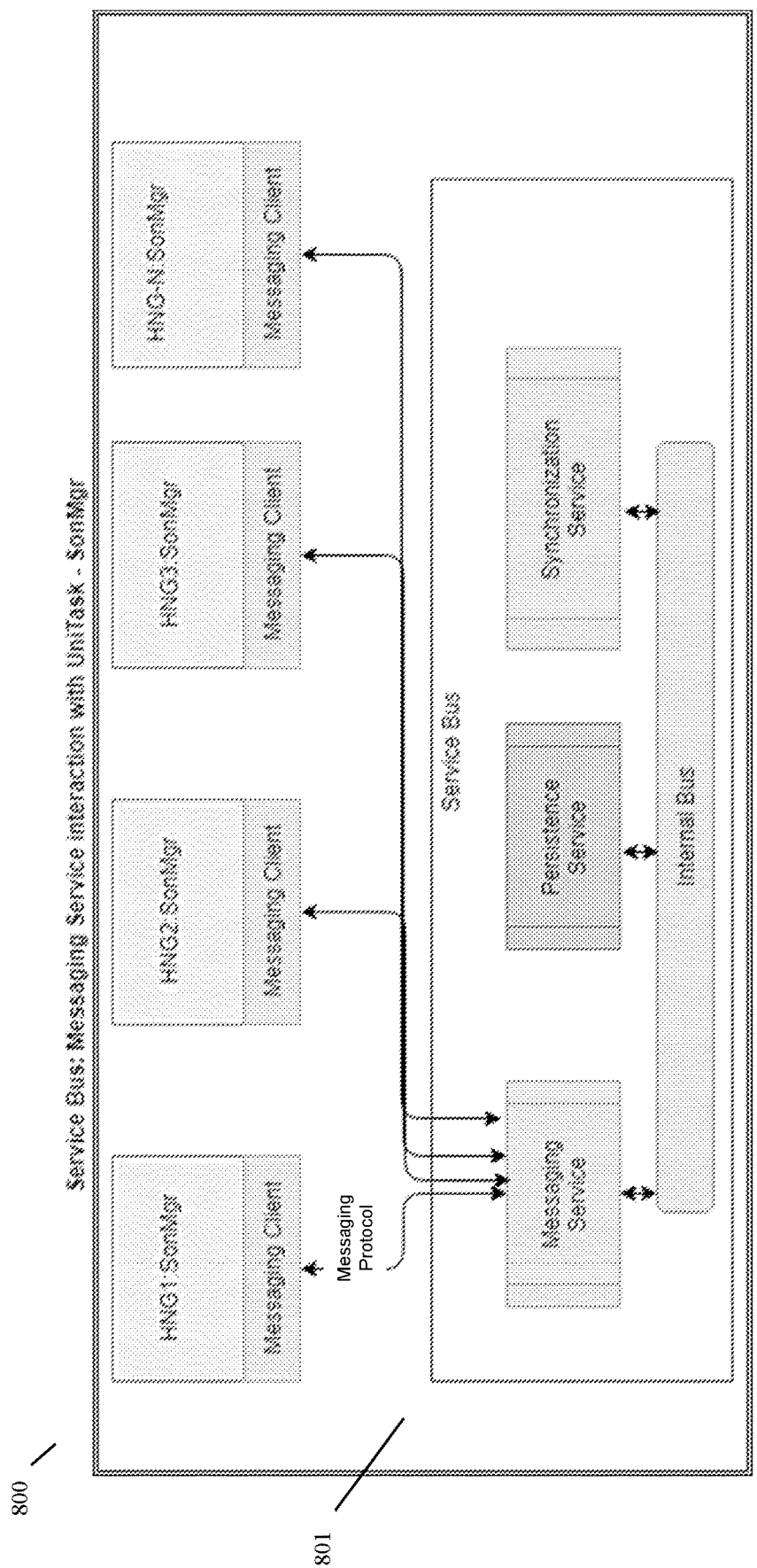
FIG. 8 is a diagram of a Service Bus messaging service, in accordance with some embodiments.

FIG. 8 shows Messaging Service interaction 800. Messaging service of Service Bus 801 provides messaging infrastructure between SonMgr on different HNG's to communicate and share required information. Messaging provides One-To-Many and One-To-One type of communication pattern. Each HNG cluster would be running a SonMgr process. SonMgr would have the messaging client integrated. Using the integrated client, SonMgr would be communicating with the messaging service as shown in FIG. 8. As well, a Persistence Service and a Synchronization Service can be provided in the Service Bus. An internal bus links the Messaging Service, Persistence Service, and Synchronization Service.

Synchronization Services

Figure 9:
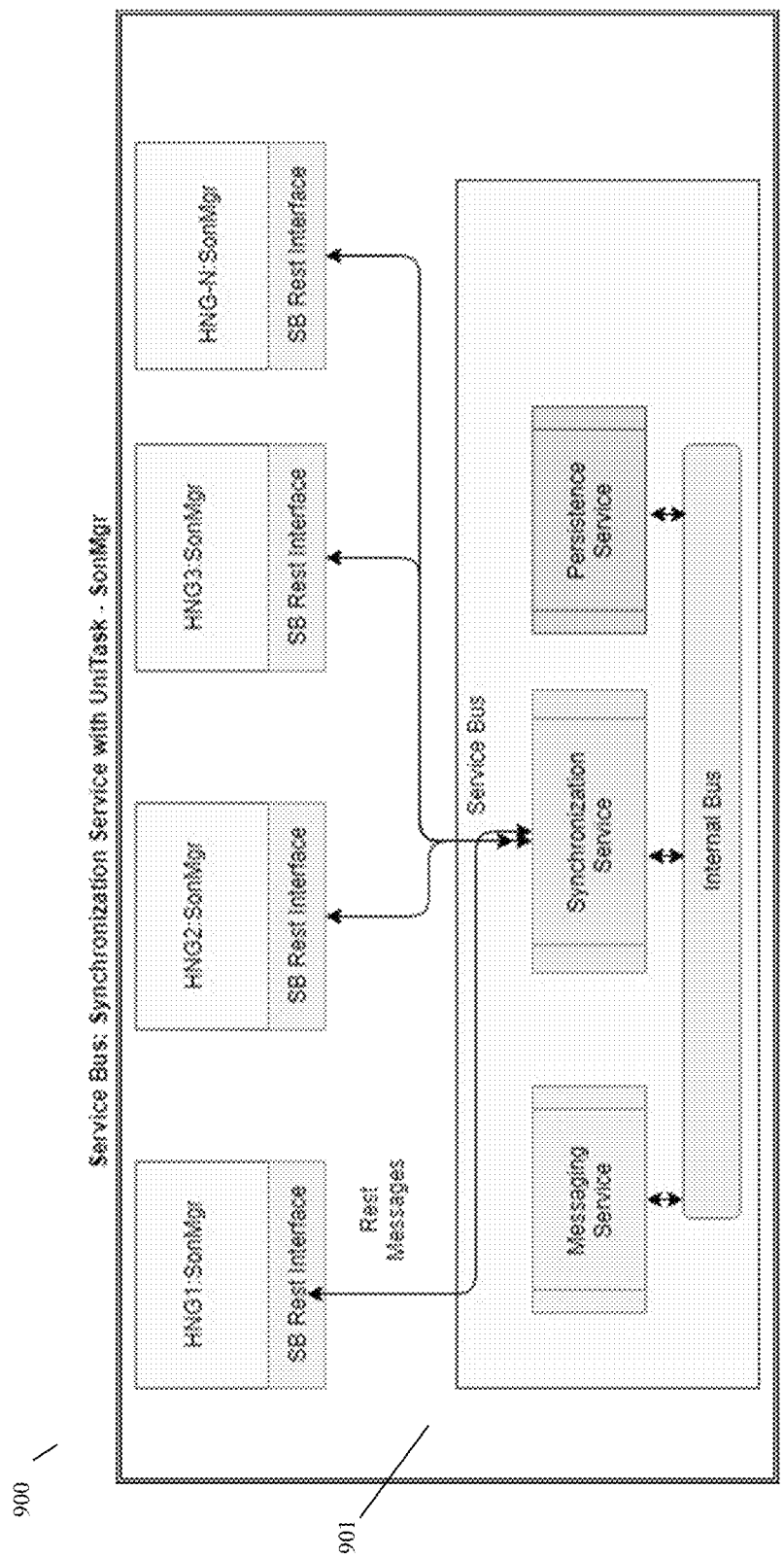
FIG. 9 is a diagram of a Service Bus synchronization service, in accordance with some embodiments.

FIG. 9 shows synchronization services with UniTask 900. In the distributed ecosystem with various SonMgr, there are use cases wherein different SonMgr's synchronizes such that only one SonMgr performs the task. Synchronization service of Service Bus 901 provides the service between different SonMgr to communicate and synchronize. If one SonMgr is performing the required task and another SonMgr attempts to access the service it would be queued and informed once previous SonMgr is done with the task. SonMgr can avail this service from Service Bus using the local REST Interface by connecting to local Synchronous service.

Figure 10:
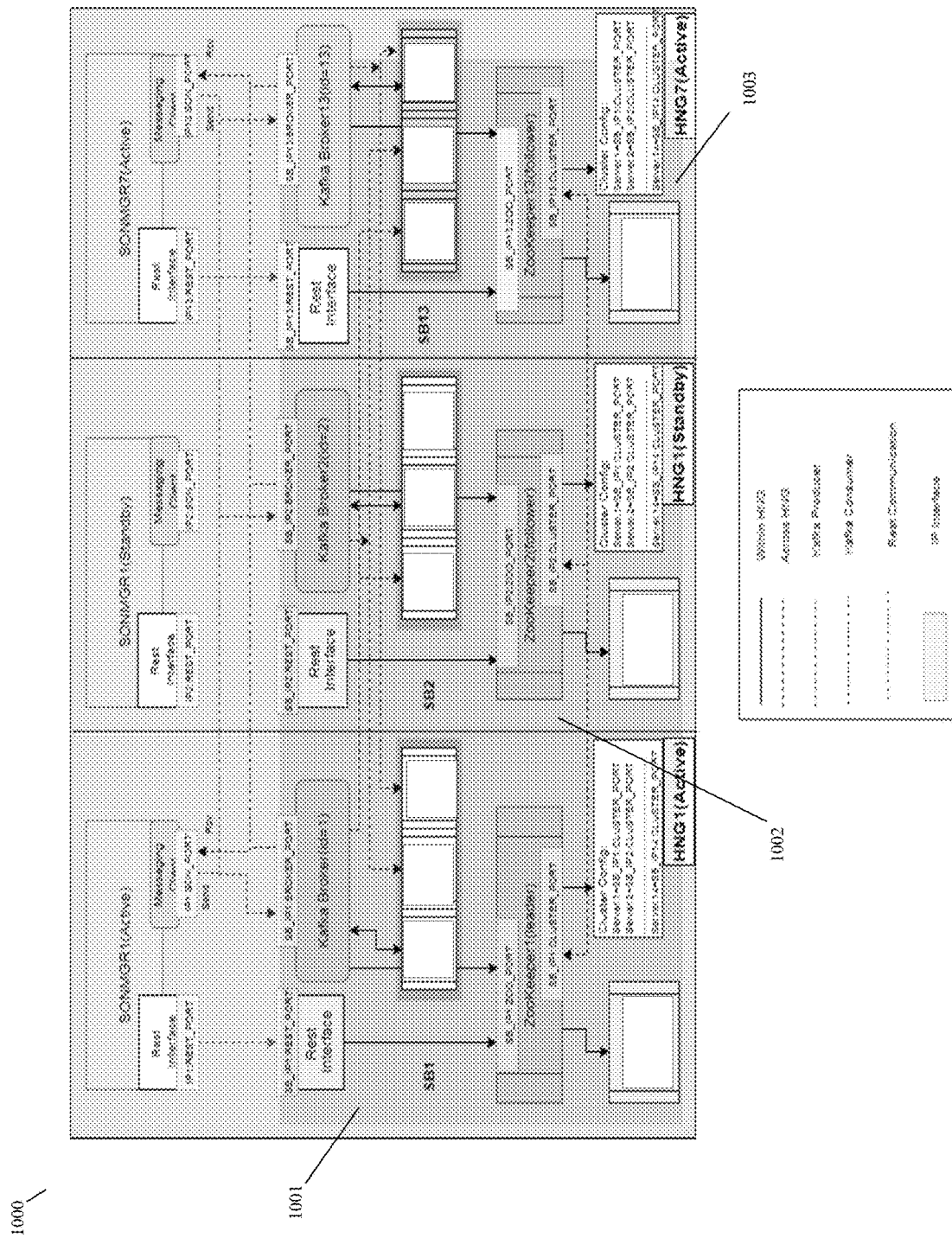
FIG. 10 is a diagram showing a network component view with a data center, in accordance with some embodiments.

Network Component view with Data Center is shown in FIG. 10. Shown are SB1 1001, SB2 1002 and SB13 1003 in communication with different SONs. As well, the interior configuration and data model of the Kafka broker and ZooKeeper configuration manager, together with failover and IP configuration and data flows, is shown.

Software Architecture

Figure 11:
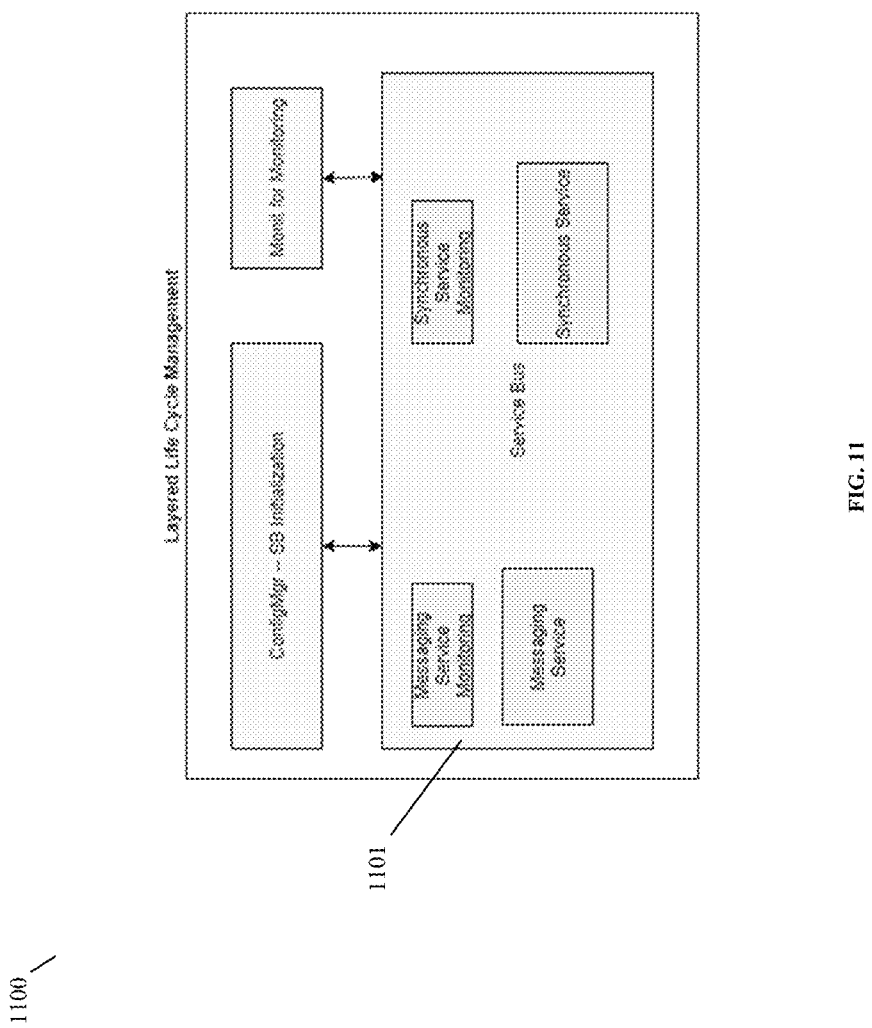
FIG. 11 is a diagram showing components of a layered life cycle management, in accordance with some embodiments.

Layered Life Cycle Management Model 1100 is shown in FIG. 11.

Service Bus 1101 is initialized and spawned by ConfigMgr. It is monitored by Monit. All the services within the Service Bus are spawned by Service Bus internally. Service Bus 1101 actively does monitoring at the application level. In other words, for the messaging service monitoring it would monitor the latency of the messages and other parameters depicting the health of the messaging service. If the parameters are out of range, it would take corrective action.

Messaging Service Internals

Figure 12:
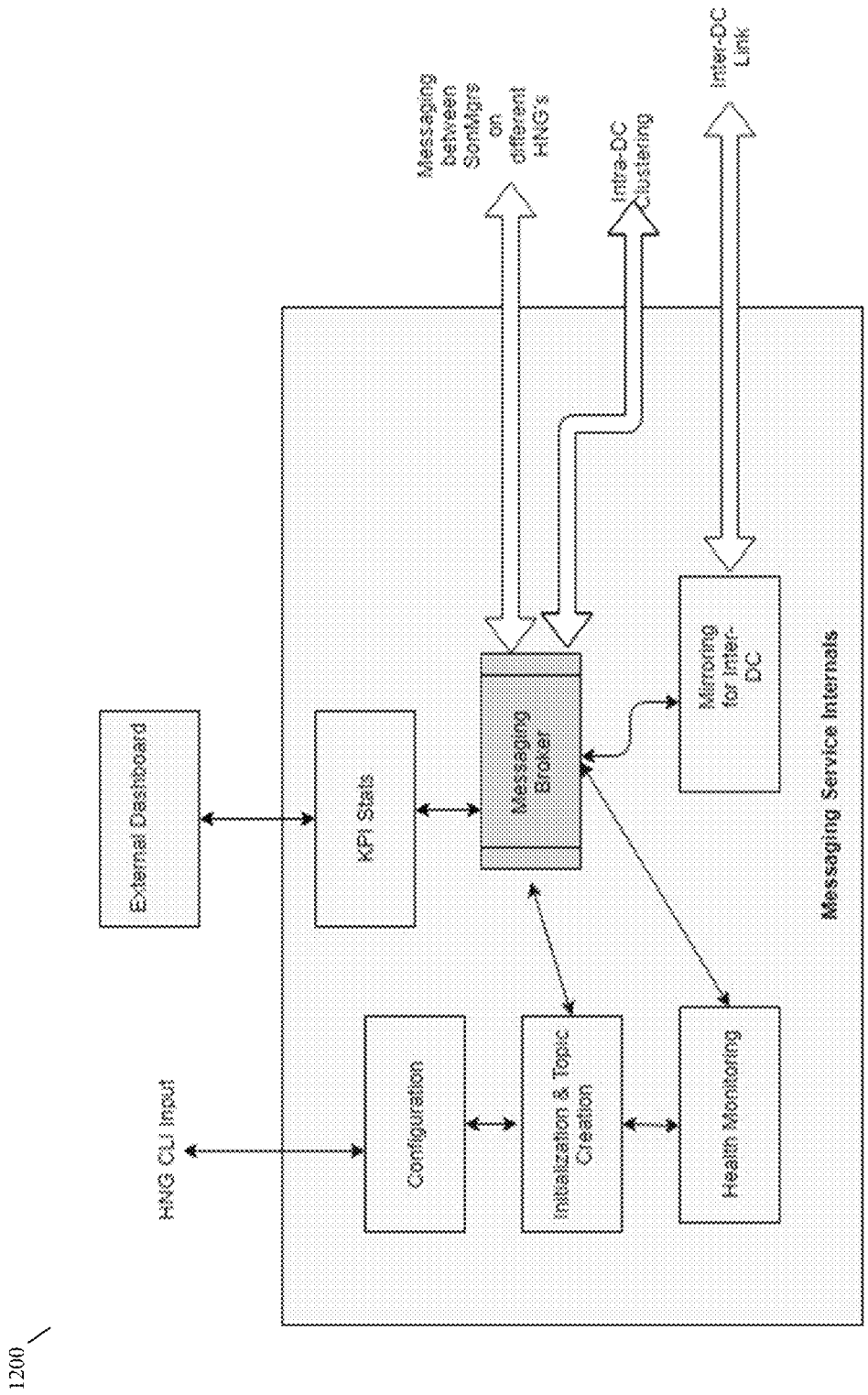
FIG. 12 is a diagram showing messaging service internals, in accordance with some embodiments.

Internals of messaging service as shown in FIG. 12. A yaml file is the input to Service Bus. Initialization and Topic Creation: Depending upon the configuration, ServiceBus spawns the messaging service, initializes it and create message queue (topics) for communications between different SonMgrs. Health Monitoring module is created to do the periodic check of the messaging broker at the application level monitoring the critical KPI. If the KPI are out of range, corrective action is initiated.

KPI in number of messages handled, throughput, memory, I/O etc. as well as health KPI are shared by the messaging broker. These KPI's are exported using the KPI Stats module to the external Dashboard for virtualization. This dashboard would be used for engineering usage. Intra-DC clustering with another broker running on different Service Bus would be handled. It would support inter-broker message flow. Mirror module within messaging service is used for Inter DataCenter communication. This module would absorb all the WAN link related complications. It would also help support multiple Datacenters in active—active configuration.

Figure 13:
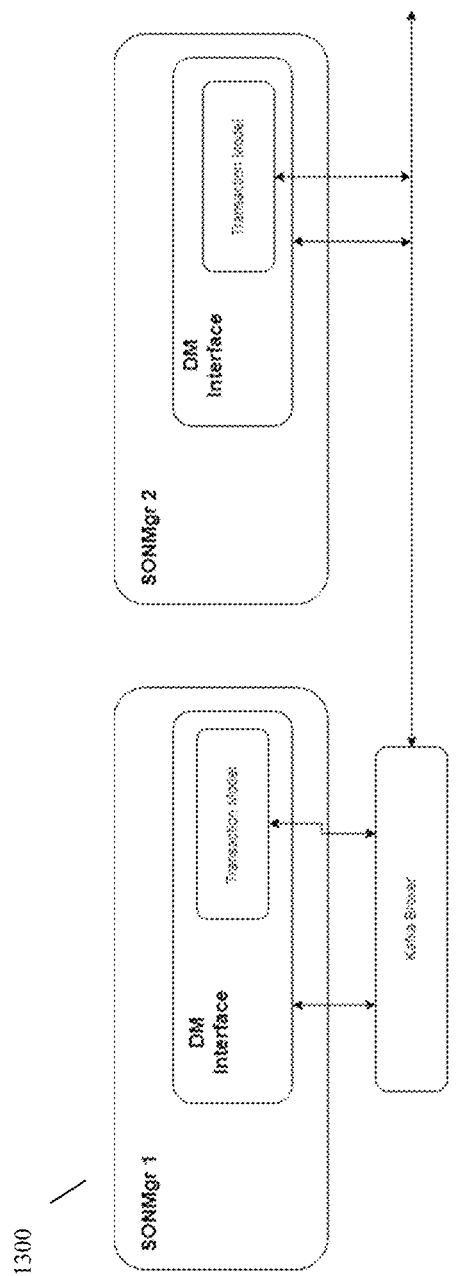
FIG. 13 is a diagram showing the messaging service interface design, in accordance with some embodiments.

Messaging Service Interface Design is shown in FIG. 13. DM interface stands for Distributed Messaging Interface. DM Interface is library and enables user of the library to integrate with messaging service hosted by Service Bus. User would create an instance of DM interface object and would initialize library with unique instance id, broadcast and unicast topic names and brokers information. Broadcast topic would be a shared topic between multiple UniTasks. It is expected that all the interested UniTasks subscribe to events on broadcast topic and send broadcast messages using broadcast topic name.

Unicast topic would be used for direct communication with a particular UniTask. Only one UniTask would subscribe to a unicast topic but multiple UniTasks would send directed messages to the same unicast Topic. librdkafka interface is a multi-threaded interface. DM library would abstract this library and would run in the user's thread of hiding librdkafka thread management.

A library may expose two interfaces Request interface and Transaction interface. Request interface would be provided/implemented through DM Interface object created. Transaction interface needs to be implemented by the user of the DM library. DM library would invoke appropriate Transaction Interface API to notify about the state of the Transaction.

There would be two ways in which messages can be exchanged using DM library; Transaction mode and Non-Transaction Mode. In Transaction mode library would do the co-relation between request and responses received from remote nodes. Library would support a timeout mechanism for each transaction. In Non-Transaction model request would be sent without creating any Transaction and there would be no co-relation between request and response and is left to the user of the library.

DM interface would make use of libevent to schedule Transaction timers. UniTask event base would be shared with the library. All the timers would be directly delivered to the library and would not need to come through UniTask. Due to the way messaging broker is implemented in the librdkafka the user task would need to call the "poll" API exposed by the library periodically. The recommended interval is 10 ms. Longer the period slower would be the response handling. The completion of the transaction would be notified as a callback through Transaction Interface which user needs to implement. DM Library would internally handle re-connecting messaging brokers and management of messaging broker related resources. The DM library makes use of proto-buf (proto3) to exchange user payload and transaction related data. A "payload" attribute is where user application message would be stored. User is free to choose any serialization/deserialization mechanism. Versioning of user data is left to the User of the library.

Figure 14:
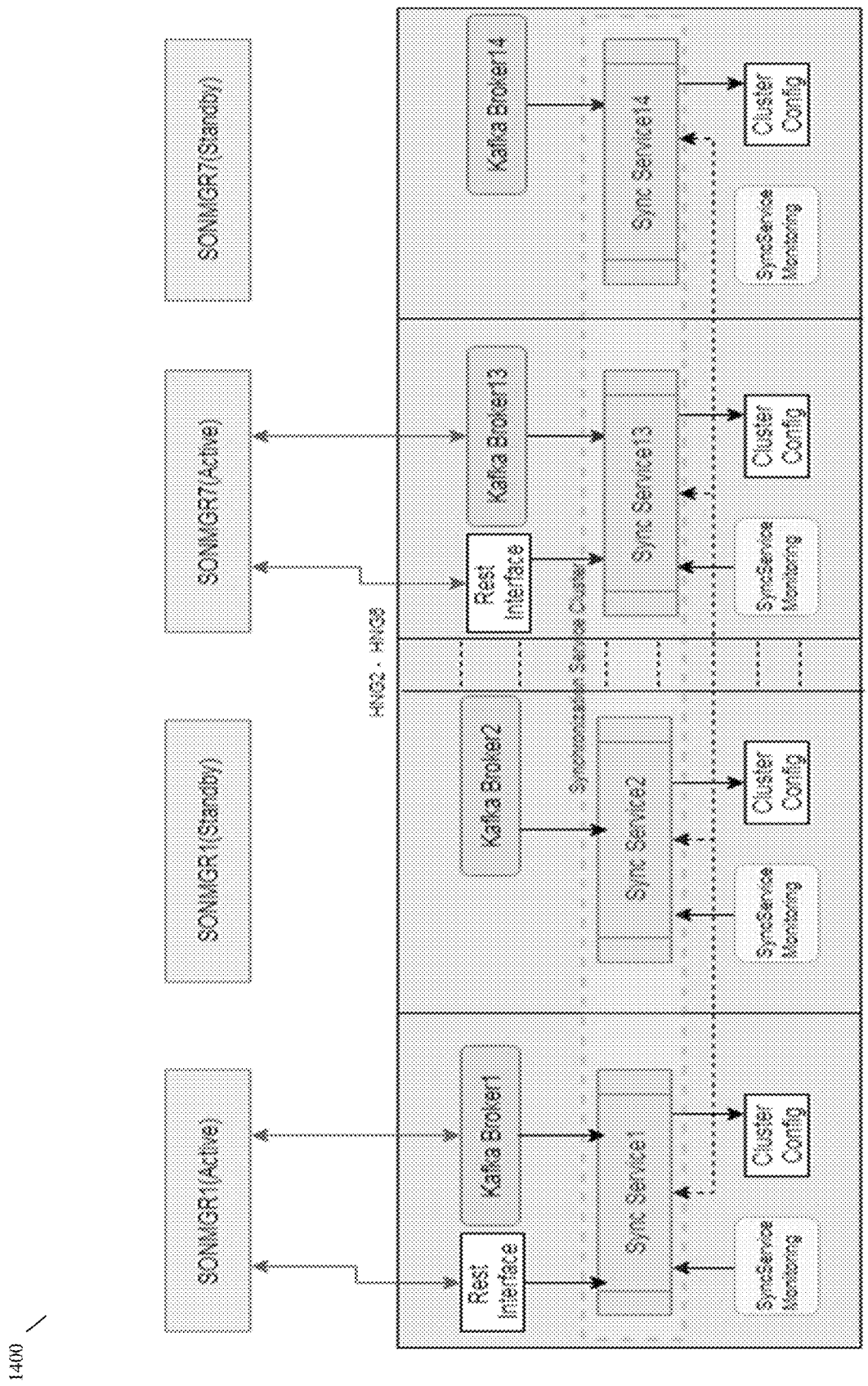
FIG. 14 is a diagram showing the synchronization service interface design, in accordance with some embodiments.

Synchronous Service Interface Design is shown in FIG. 14. Synchronous service on Service Bus provides Serialization/Distributed Lock service and meta-data management for messaging service cluster.

In-order to ensure fault tolerance and high availability, synchronous service cluster is deployed as shown in FIG. 14. Following are interface details for Synchronous service: 14 Synchronous service instances would be created in one data center. Synchronous service cluster would be formed with all synchronous service i.e. all 14-synchronous service running on data center. Complete Cluster IP information must be populated before starting a synchronous service node i.e. each Synchronous service must know about other 13 participating synchronous service on data center. Synchronous service would be using same IP as messaging service for clustering which should be routable within data-center.

Synchronous service require configuration of 3 ports, default ports will be used. These include ClientPort(default: 2181), PeerPort(default: 2888), and LeaderElectionPort(default: 3888). Users of Synchronous service should create instance of synchronous service to make use of data serialization and management. Failure of 7 Synchronous service would lead to unavailability of synchronous service and would resume once 8th node becomes available and leader election succeeds. Synchronous service monitoring would be done via Service Bus and would also support restart of same. TxLock serialization request will be handled via Service Bus REST interface.

Service Bus will be using synchronous service to serialize the TxLock before responding to TxLock request via REST interface. TxLock Rest interface will work in async mode and will complete transaction once synchronous service confirms TxLock request success. The blade addition and removal is supported resulting in the reconfiguring of the Synchronization service at runtime resulting in cluster modifications.

Figure 15:
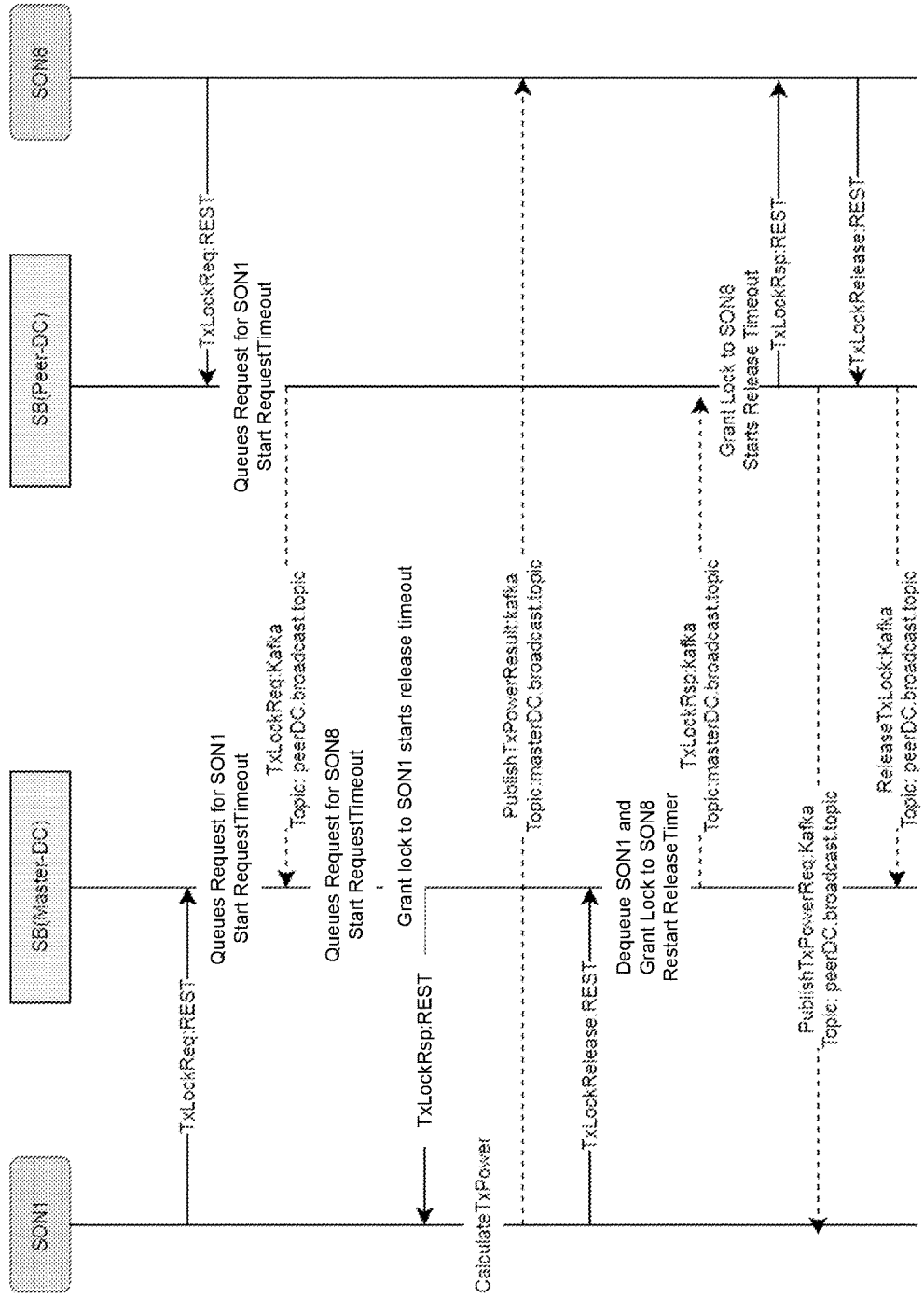
FIG. 15 is a message flow diagram for the synchronous service, in accordance with some embodiments.

Restful Interface 1500 between ServiceBus and Unitask Interface Design is shown in FIG. 15. A master and a peer service bus are shown performing locking, including requesting and receiving locking; locking is done with queues that have individual timers per queue. Publish and subscribe are also shown.

Figure 16:
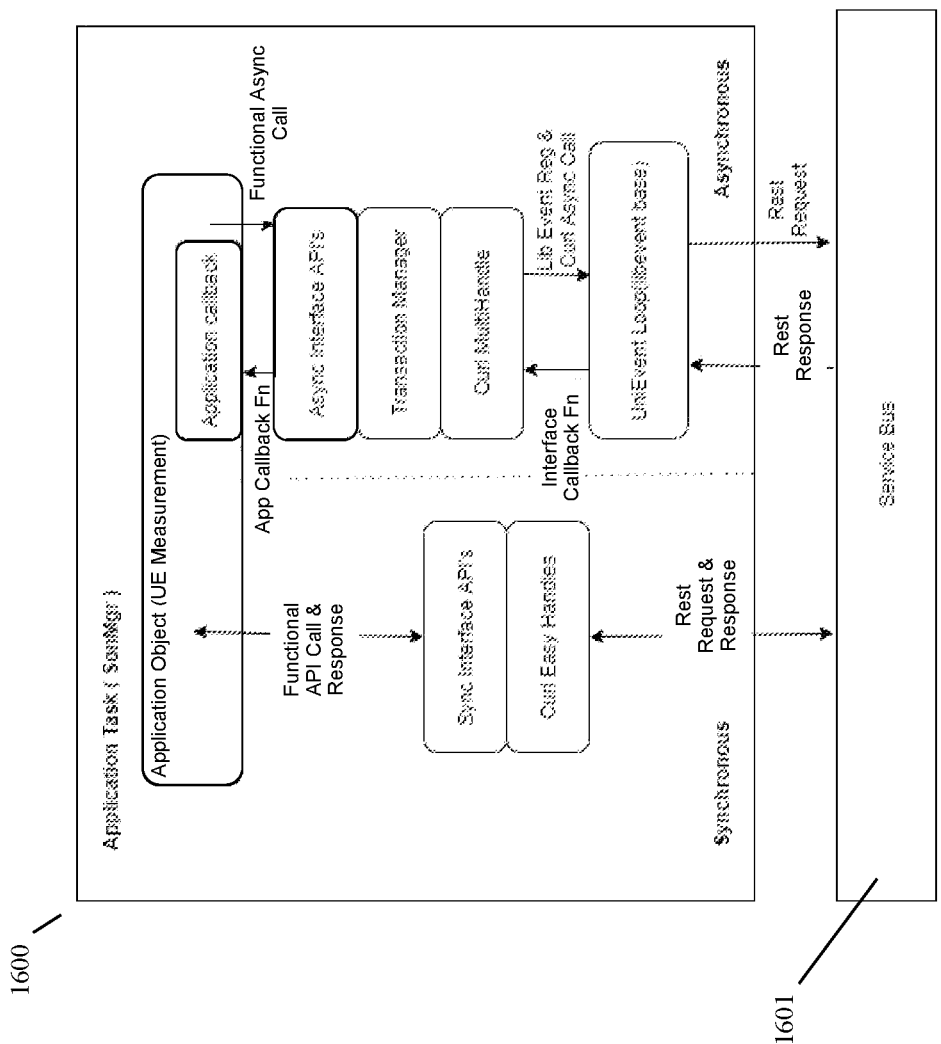
FIG. 16 is a diagram of a Restful interface between the Service Bus and the Unitask interface design, in accordance with some embodiments.

FIG. 16 shows an Application task 1600 and Service Bus 1601. It support both the Asynchronous (non-blocking) as well as synchronous (blocking) API's from the UniTask. From UniTask sendAsyncRestMessageToServiceBus( ) and sendRestMessageToServiceBus( ) are provided to communicate with ServiceBus.

IP Addressing Requirements

Each of the Service Bus instances may use an Internal IP routable within the blade. So it could use 127.0.0.1:8080. In some embodiments, 14 IP Addresses shall be used that are routable across data centers. These 14 IP could be already in use (like EM etc) with the different port numbers or could be new as discussed with the customer.

Component/Feature Design

Figure 17:
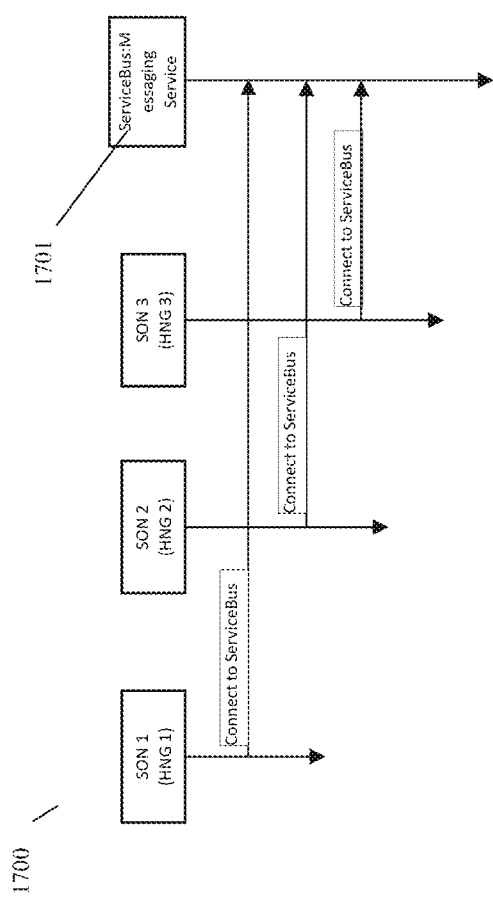
FIG. 17 is a diagram of a Service Bus interface framework, in accordance with some embodiments.

SON Instance Startup 1700 is shown in FIG. 17. SON would create a connection with Service Bus 1701. If this is the first time startup then any old data present on Service Bus would be cleaned up. SON instance would subscribe to required topics with Service Bus. The messaging framework would be used to subscribe the topics. On successful subscription, SonMgr would receive the ack for the subscription from the messaging framework.

Figure 18:
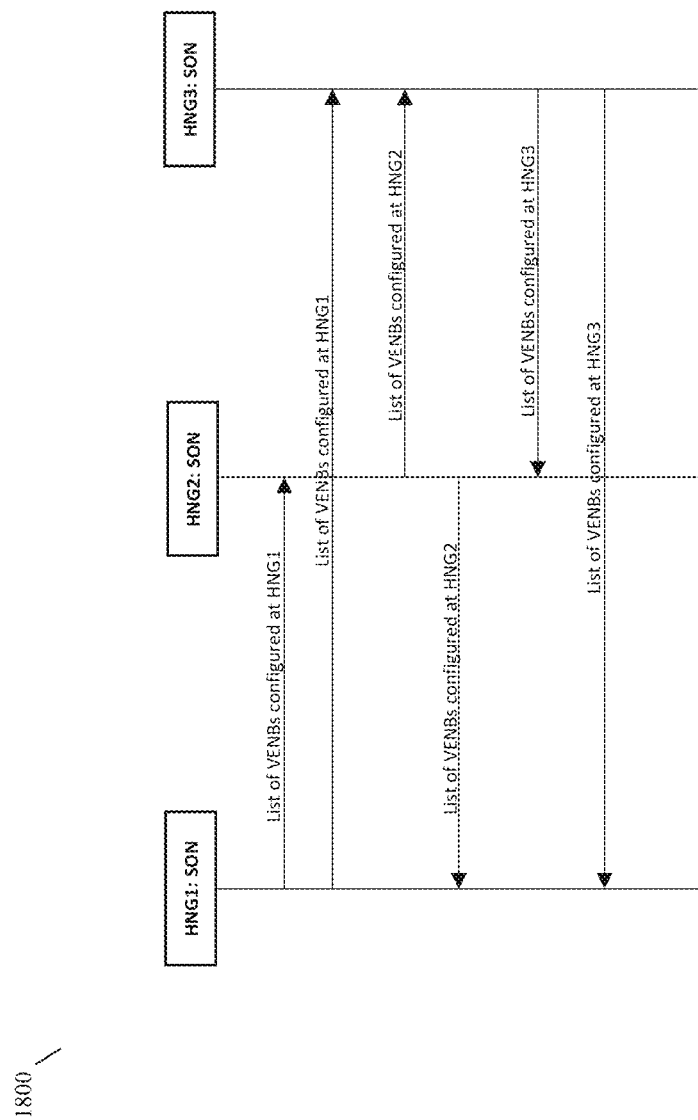
FIG. 18 is a diagram showing VENB discovery, in accordance with some embodiments.

VENB discovery 1800 is shown in FIG. 18. Each SON instance would broadcast it's VENBs to all the other SON instances in the cluster whenever it comes up. As a result, every SON instance will maintain its own copy of all the VENBs configured in the cluster. Every time, a VENB is added/deleted to/from the HNG configuration, SON will broadcast this to all the other SON instances in the cluster.

Figure 19:
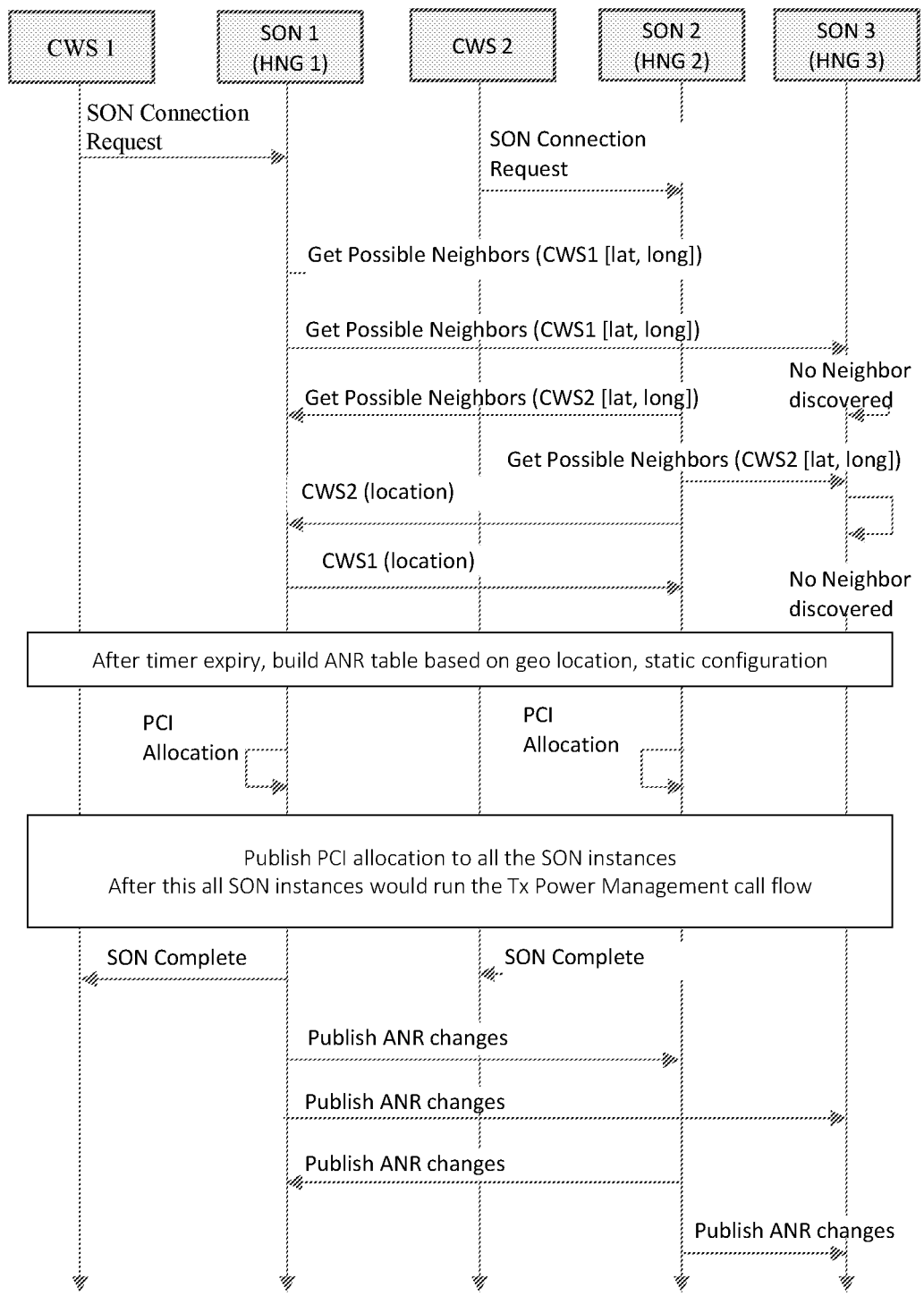
FIG. 19 is a messaging diagram showing ANR building and PCI allocation, in accordance with some embodiments.

CWS Connect and ANR Building 1900 are shown in FIG. 19. In some embodiments the space of all PCIs can be partitioned and assigned to each HNG instance. The partitions are non-overlapping. More information is found in U.S. patent application Ser. No. 16/528,608, hereby incorporated by reference.

Following algorithm shows how initial ANR building and PCI allocation. There is no synchronization event needed for this call flow. CWS 1 connects to SON 1 instance. SON 1 instance would get possible neighbor list (based on geo-location) from all other SON instances. It would use the ServiceBus: Messaging Service to reach all other SON instances. SON 1 instance would start a timer to get responses from other SON instances. Also, if all the SON instances respond back it would stop the timer and start with the handling procedures. SON instances where geo location based neighbors are found would return the list as possible neighbors based on geo-location list. SON instances wherein the neighbors are not identified would not respond to the connection request. In this example, HNG3:SonMgr3 has no association with CWS 1 and CWS 2 and hence it would not respond. After timer expiry on SON 1 instance, SON 1 instance would proceed with ANR table building and PCI allocation. As PCI are partitioned per HNG instance, all the SON 1 instances would allocate PCI simultaneously. Once PCI is allocated SON 1 instance would publish ANR table changes and PCI allocation to all other SON instances.

Figure 20:
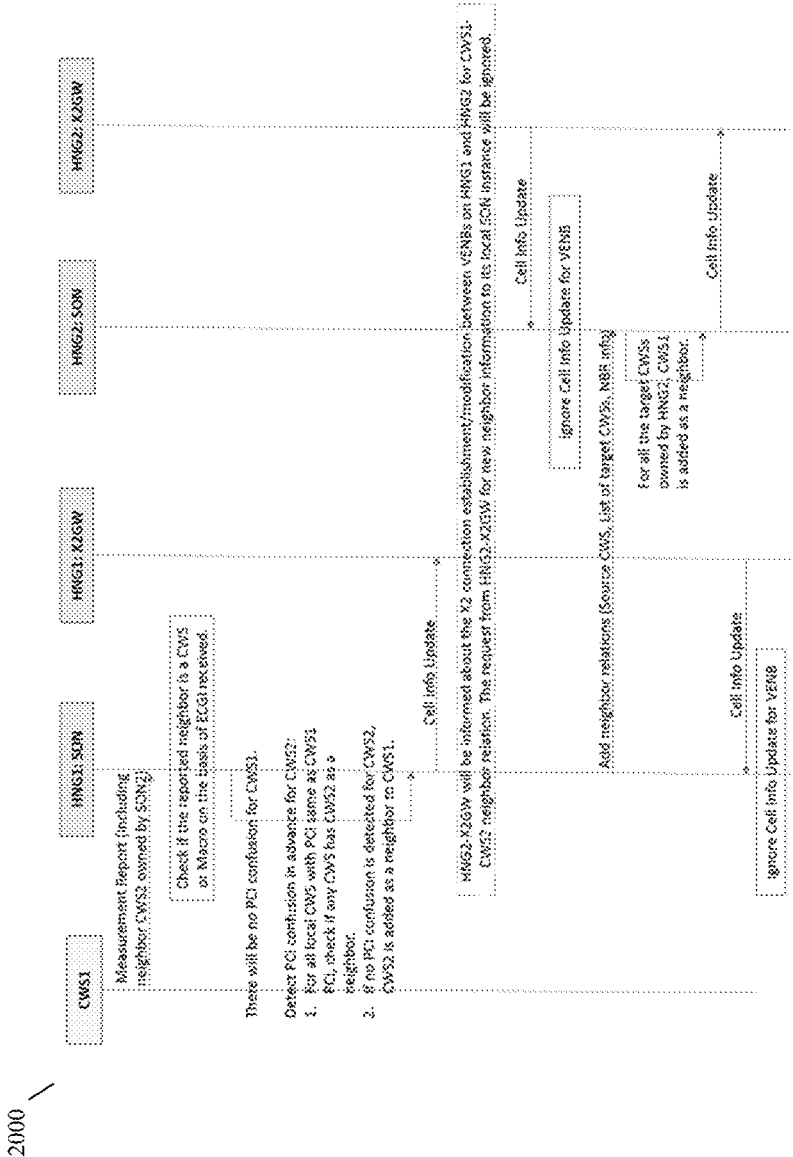
FIG. 20 is a flow diagram showing processing of UE measurement reports for new CWS neighbors, in accordance with some embodiments.

UE Measurement Report and addition of a new CWS Neighbor is shown in FIG. 20. The call flow 2000 describes the processing of UE measurement reports for new CWS neighbors addition with no PCI confusion.

Figure 21:
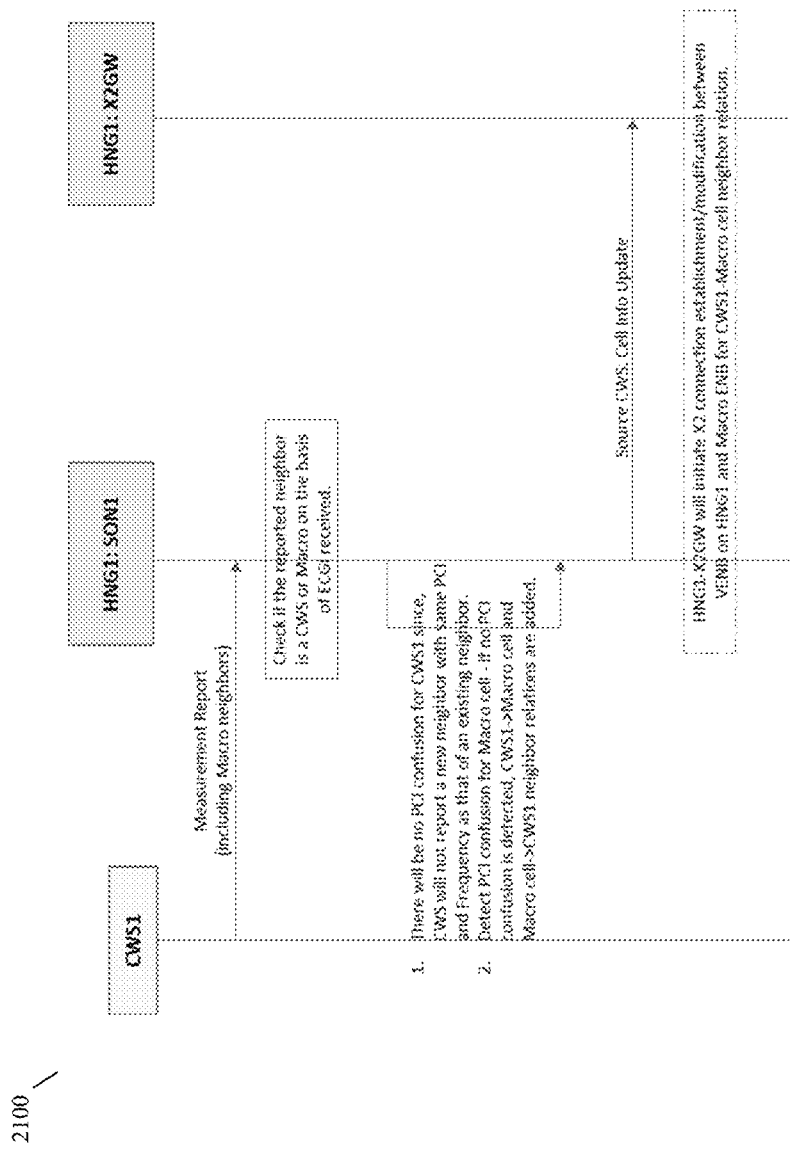
FIG. 21 is a flow diagram showing processing of UE measurement reports for new Macro neighbors, in accordance with some embodiments.

Addition of a new Macro Neighbor is shown in FIG. 21. The call flow 2100 describe the processing of UE measurement reports for new Macro neighbors addition with no PCI confusion.

Figure 22:
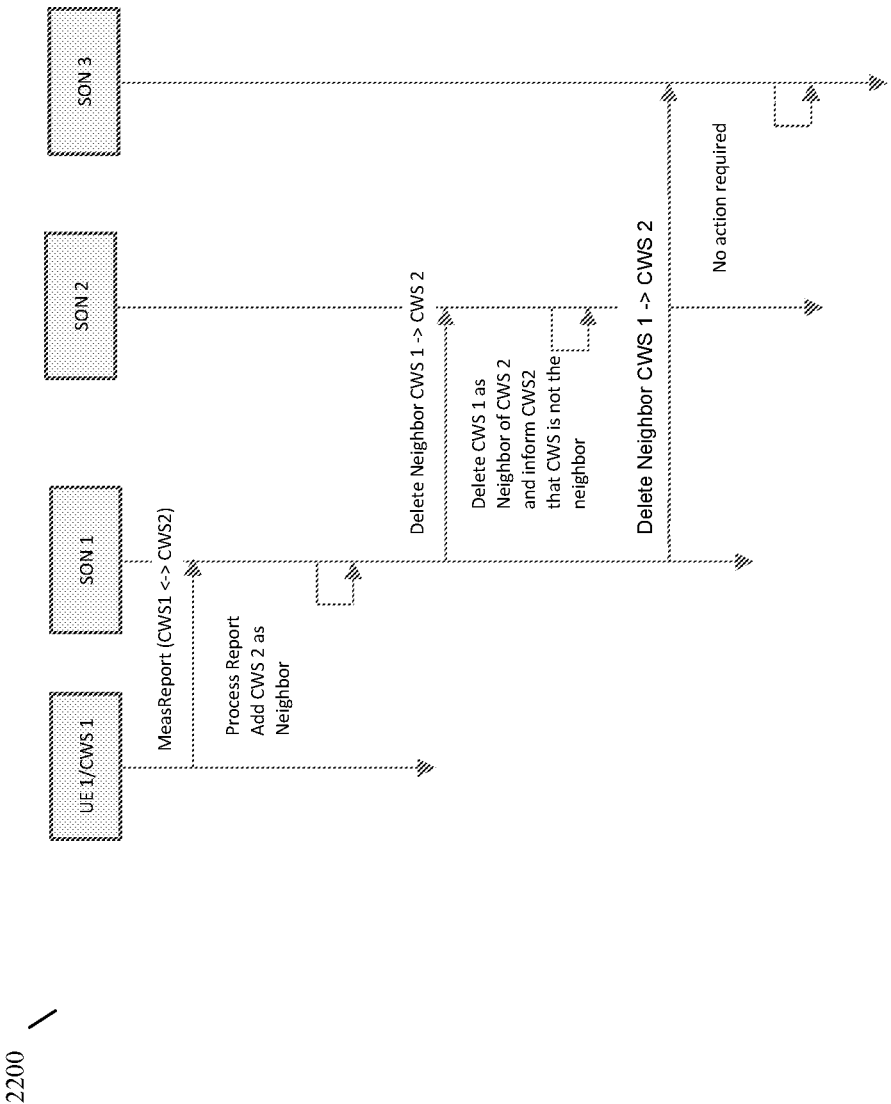
FIG. 22 is a flow diagram showing processing of UE measurement reports for deletion of a neighbor, in accordance with some embodiments.
Figure 23:
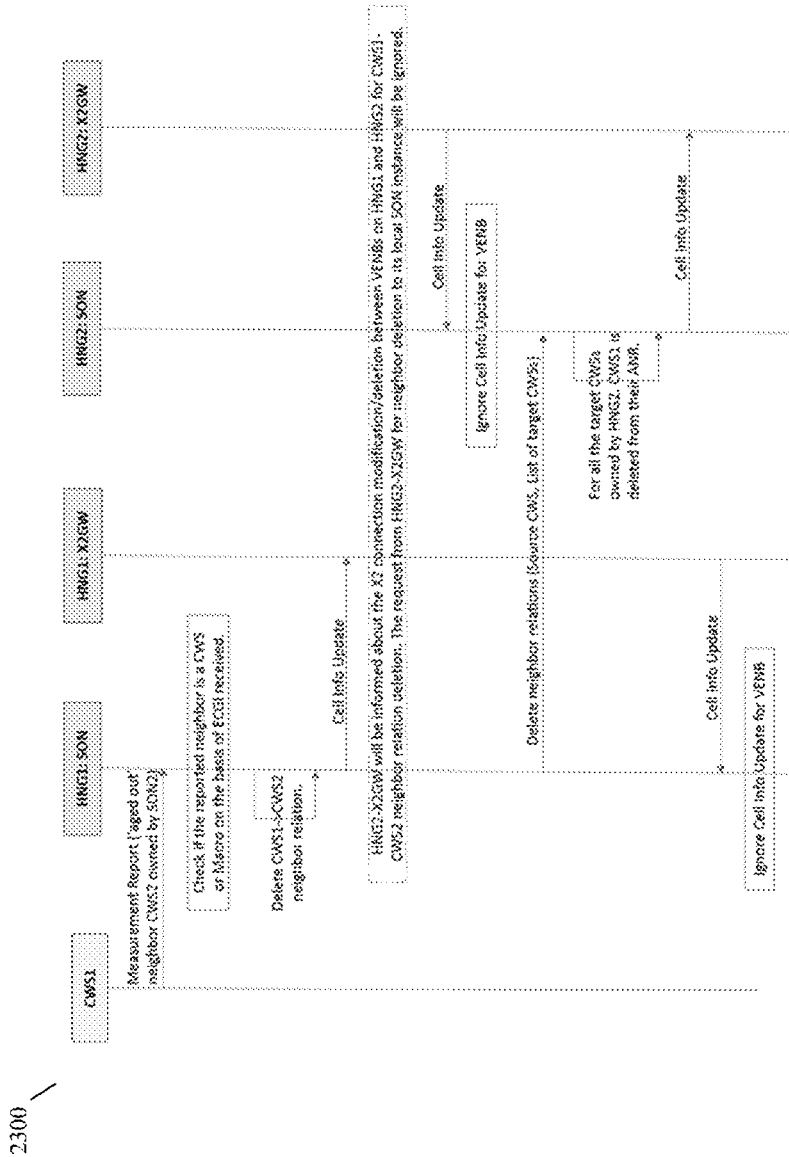
FIG. 23 is a flow diagram showing processing of UE measurement reports for deletion of a neighbor, in accordance with some embodiments.
Figure 24:
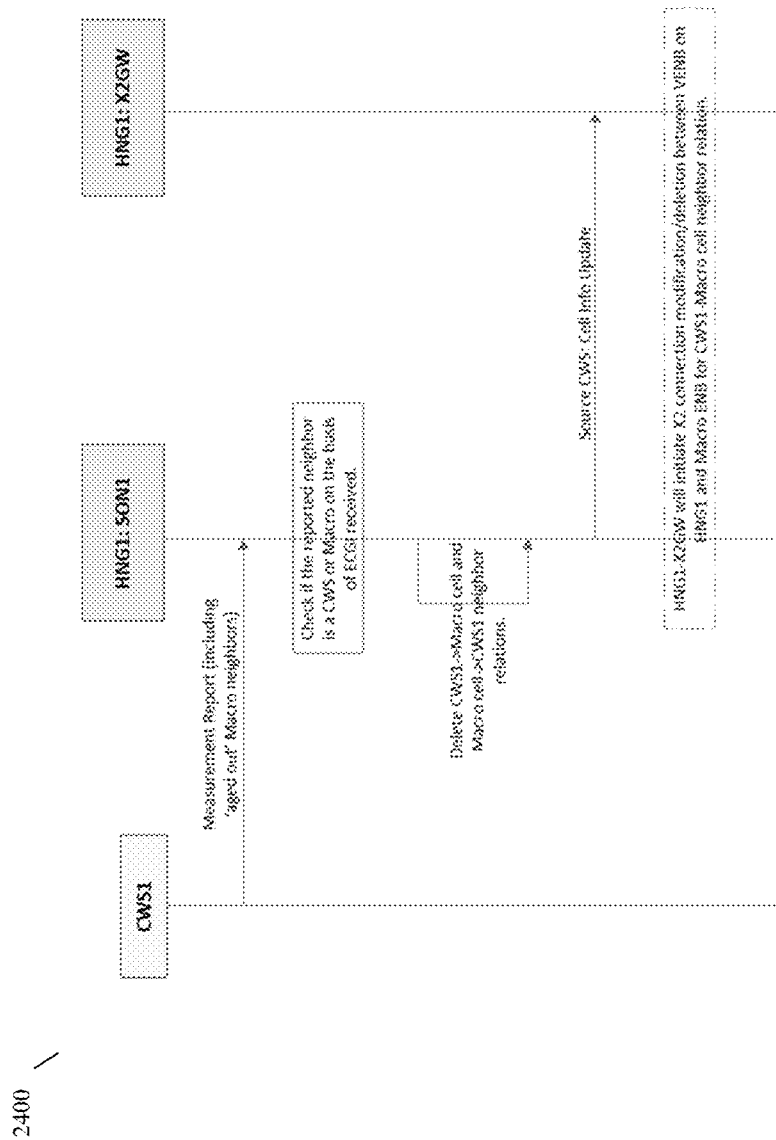
FIG. 24 is a flow diagram showing processing of UE measurement reports for aged out Macro neighbors, in accordance with some embodiments.

Deletion of a CWS Neighbor with CWS is shown in FIG. 22, FIG. 23 and FIG. 24. The call flows 2200, 2300 and 2400 when processing of UE measurement report results into deletion of neighbor. The call flow describes the processing of UE measurement reports for aged out CWS neighbors resulting into CWS neighbor deletion.

Input Triggers: UE Measurement report indicating that CWS 2 is no more neighbor. INFORM message as CWS 2 radio has been switched off. One of the CWS lost the connection and heart beat has failed to the CWS.

Deletion of a Macro Neighbor is shown in FIG. 24. The call flow 2400 describes the processing of UE measurement reports for aged out Macro neighbors resulting into Macro neighbor deletion.

Figure 25:
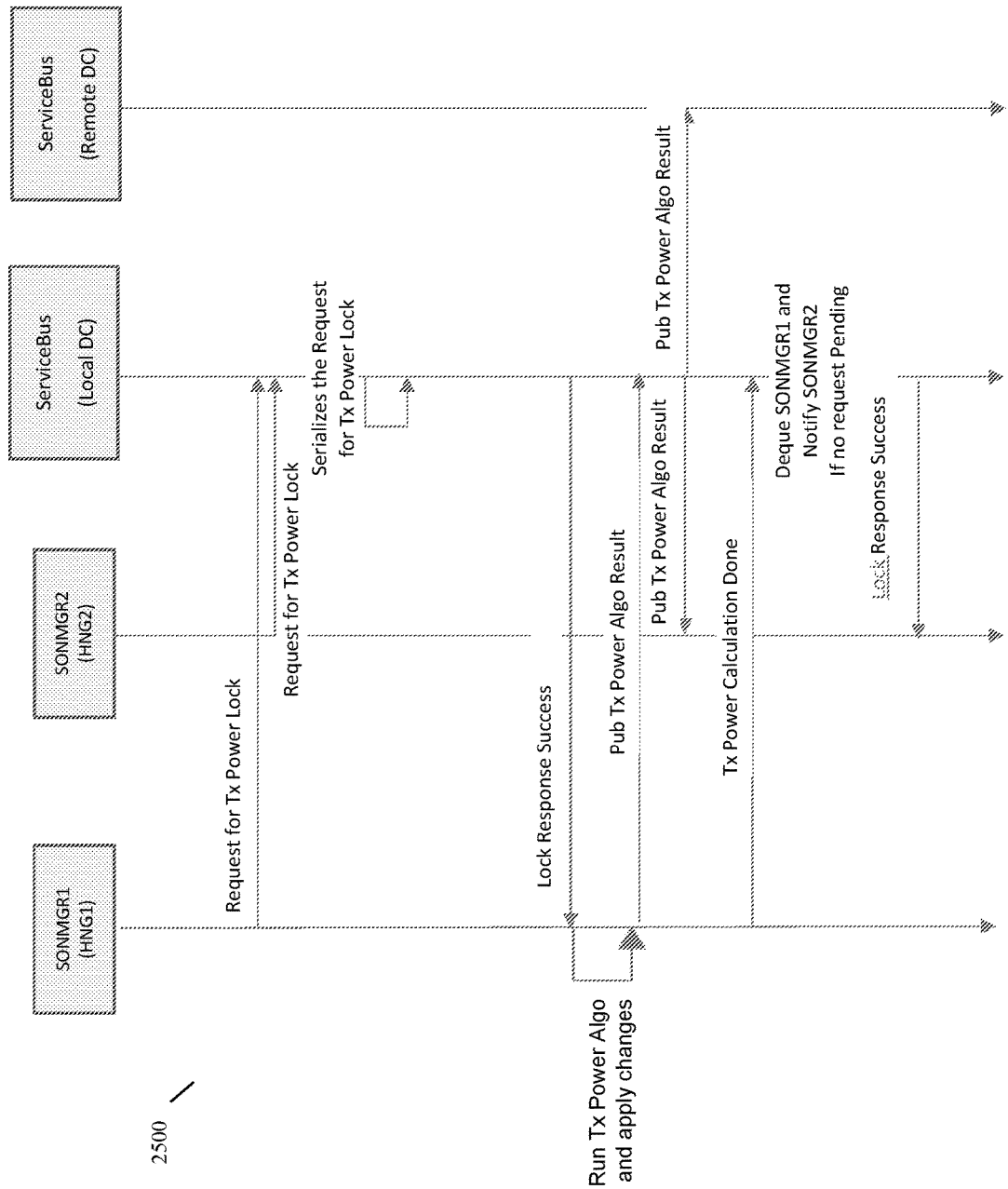
FIG. 25 is a flow diagram of a multi-HNG Tx power call flow, in accordance with some embodiments.
Figure 26:
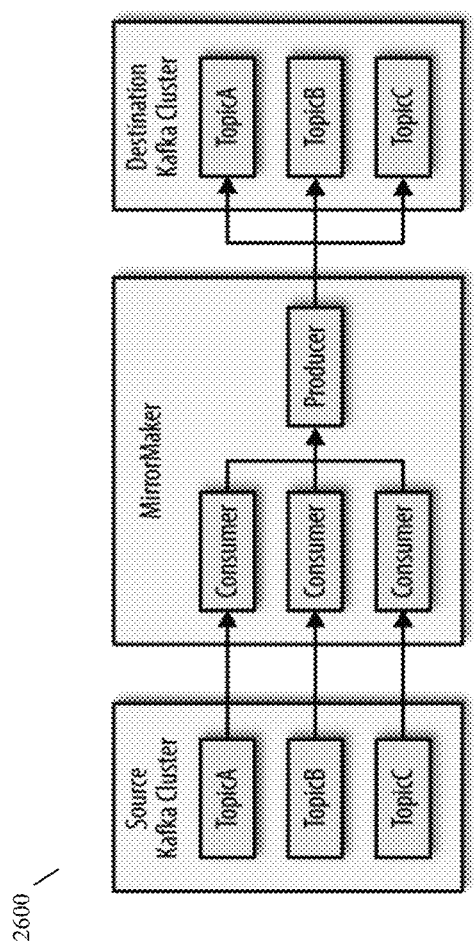
FIG. 26 is a diagram of a Service Bus inter datacenter communication, in accordance with some embodiments.

Multi-HNG Tx Power Call Flow 2500 is shown in FIG. 25, and call flow 2600 is shown in FIG. 26. For Multi-HNG SONMGR case, Tx Power Algorithm shall work as below. All SONMGR Instance has ANR available with required inputs for Tx Power Algorithm. Handling of Concurrency between Multi-HNG SONMGR's shall be done in serialized manner, i.e. at a given point of time only one of the SONMGR will be running Tx Power Algorithm. Once SONMGR1Tx Power calculation is done, modified values shall be published to all SONMGR. SONMGR2 in line will be notified to start Tx Power Algorithm. For Inter-DC locking, messaging service will be used to take lock across data centers. For identifying master data center, data center tag will be used to decide priority. The TxPower Lock is released using the REST Interface whereas the Kafka TxPower updates would be published using Kafka messaging Interface. The below description is to synchronize both these interfaces such that Kafka messages with the change in TxPower is published first followed by the TxLock release.

Check out details as follows: Publish Tx power calculations first as Async Kafka producer with the Ack. The Ack would be delivered to the SonMgr once the message is successfully posted on the shared kafka topic. Once the Ack is delivered, the On Completion callback function would be called to record the metadata and release the TxUnlock.

The point here is the Ack would be received once the message is posted and even replicated to all the replica configured. SonMgr would send Tx UnLock message on OnCompletion callback function. The receiving SonMgr would clear all the messages in the queue from the time t0 it requested for the lock to the time it received the actual lock at time t1. So the delta of t1-t0 need be consumed by receiving SonMgr before making the final decision on TxPower based on marker sent via REST message. Across Data Centers, since the same shared topic is mirrored, the Publish Tx Would be ahead in the queue followed by the TxLock Request in the mirror maker queue. Batching Operation: The batch of TxPower operation happens when the lock is acquired by the SonMgr optimizing the performance.

Availability/Redundancy/Fault Tolerance Design

SonMgr Redundancy: SonMgr on each HNG Cluster works in Active and Standby mode using RDM for checkpointing. There is no change in this approach for MultiHNG SON.

Service Bus Redundancy: Service Bus is stateless entity and operates in Active—Active Mode. So there is no redundancy requirement within the Data center.

FIG. 26 shows the use of a MirrorMaker relationship between n consumers to 1 producer to ensure pub/sub data propagation from source Kafka cluster to destination Kafka cluster.

Service Bus Inter Datacenter Communication

Figure 27:
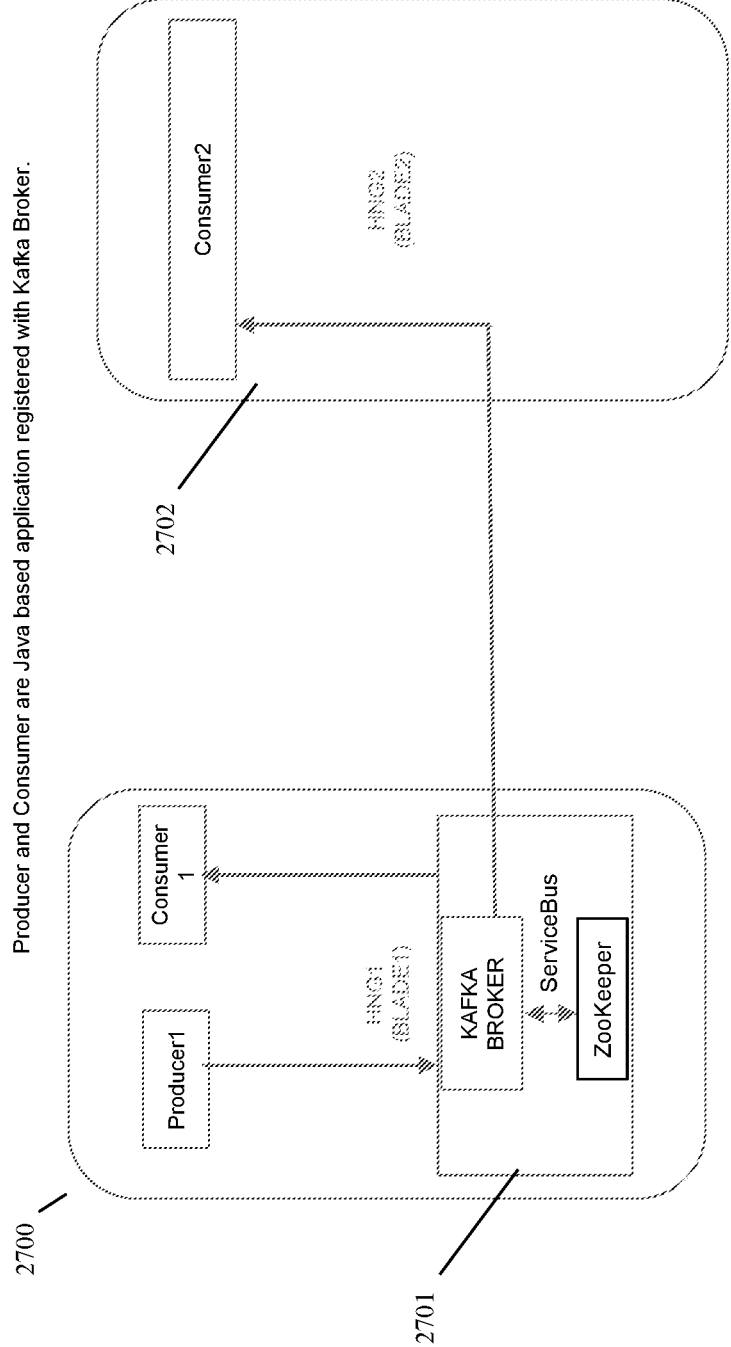
FIG. 27 is a diagram of a messaging service test setup, in accordance with some embodiments.
Figure 28:
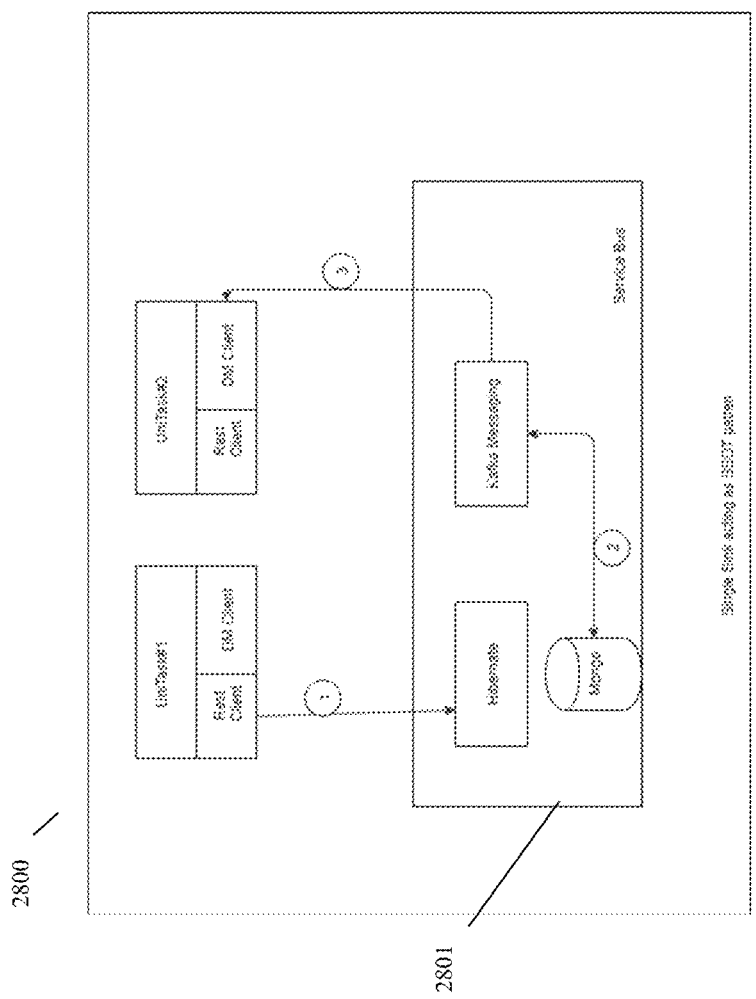
FIG. 28 is a diagram showing a Single Source Of Truth (SSOT) model, in accordance with some embodiments.

Messaging Service:

The Messaging Service 2700 is across Data Center as shown in FIG. 27. Mirroring is essentially B2BUA with consumer from source cluster that is connected with producer to the destination cluster. It would use mirroring of messages on the WAN link between data centers. Two Mirrors would be created within the messaging service. One from the DC-1->DC-2 and another from DC2->DC1. Mirrors have tolerance built in if the WAN links flaps and could be configured for the lag. The approach is highly expandable to more than two data centers. This could be achieved by creating new mirrors as we add more data centers to this architecture.

Synchronous Service:

Synchronous Service would be local to the Data Center.

Configuration, CLI, and EMS

Configuration

The HNG configuration will be enhanced to configure parameters required by the Service-Bus as follows: a new configuration entity named 'hng-zone' will be defined, that refers to a data-center and will contain a unique name and a list of HNG nodes along with an interface address for each node. This entity will additionally contain the peer data-center name and a list of interface addresses to be used to communicate across data-centers.

Different topologies of HNG clusters could be created. For example, the same sample configuration will be duplicated across all HNG nodes in a data center: 14 HNGs, each in one of 7 clusters, each cluster having two interconnects, each of the HNGs being either a primary or a secondary, and the IP addresses can be propagated to each of the HNGs.

Following are some important points to understand. The above configuration will be required on all HNG nodes in a data-center. Each HNG node, on bootup will read this configuration and use it to create the Service-Bus cluster (across all configured nodes).

Each HNG node will pick interface address for matching its own 'nodetag' to start the Service Bus instance running locally. The 'hng-zone/name' and 'peer-hng-zone' configuration will be required by the elected Mirror-Maker instance to talk to the other data-center. Similar configuration will be required on the other data-center. For Inter-DC entry points, minimum two IP interconnects need to be configured. This would ensure that if first IP interconnect is not reachable another configured IP interconnect would be used.

Producer and Consumer are Java based application registered with Kafka Broker.

Examples of technologies that could be used to provide the described functionality include: Dropwizard; Libcurl; Grafana; Prometheus; Swagger; Apache Zookeeper; Apache Kafka; Apache mirrormaker; Librdkafka.

Zookeeper is another option for a centralized open-source server for maintaining and managing configuration information, naming conventions and synchronization for distributed cluster environment. Zookeeper helps the distributed systems to reduce their management complexity by providing low latency and high availability, and can be used with the Service Bus, in some embodiments.

If more than 50% configured nodes are not operational resulting in the cluster outage. This would lead to scenario wherein the different SonMgr's would not be able to communicate and share the ANR and Tx Power updates. SonMgr redundancy should continue as done in PS 1.x using RDM infrastructure. Service Bus should be stateless and does not have redundancy requirements. Inter-DC support to recover from Datacenter failures.

New Logging facility for Service Bus interactions. Control Service Bus internal logging using the HNG CLI. Service Bus logs with exceptions (if any) would be integrated with HNG logging infrastructure. Inter Data center WAN link should be secured. Functional tool to test the SON functionality by creating ANR, Tx Power, CellManagement, GPIO, Location change & UE Measurement reports. Performance tool to test the SON functionality by creating ANR, Tx Power, CellManagement, GPIO, Location change & UE Measurement reports.

In the distributed ecosystem with various SonMgr, there are use cases wherein different SonMgr's synchronizes such that only one SonMgr performs the task. Synchronization service provides the service between different SonMgr to communicate and synchronize. If one SonMgr is performing the required task and another SonMgr attempts to access the service it would be queued and informed once previous SonMgr is done with the task. SonMgr can avail this service from ServiceBus using the local REST Interface by connecting to local Synchronous service. Service Bus is an external component in the HNG environment on the same lines as other external binary components.

Use cases dSON:

Demo adding and removing HNG clusters to the SB infrastructure

Bring up 2 HNG cluster i. Bring up CWS on HNG1 and HNG2, show neighbors

Add 2 HNG to the Cluster to make it 4 Node Cluster by Reconfiguring Existing Nodes configuration via HNG CLI.

i. Bring up CWS on HNG4 and HNG4, show neighbors

Remove 1 HNG Node From Cluster

TXPower Use case

Two vehicles connected to different HNGs on site close enough so only one is radiating The radiating one drives away The remaining vehicle will now radiate.

WIFI/BH:

IP allocation to a GW and one mesh node to the same HNG

The GW and mesh nodes will get different IPs

HNG viewed externally on access and core side could have a Single Ingress IP and Single Egress IP.

Control Planes. HNG based on the functionality could be classified into three planes: Access Control Plane handles all the incoming connection from the CWS. It has SCTP Load balancer to distribute the incoming CWS to one of the UniRAN TEP (Terminal End Point). The UniRAN TEP is essentially the same as UniRAN Conn with some simplifications like it does not manage the CWS to UEMgr mapping statically and more. The UniRAN TEP has dynamic connections with HNG Service plane.

Service Control Plane provides different services. Session Management provided by UEMgr, Config Service by ConfigMgr etc. All the UniTask in this plane provides one or more than one service.

Instances—There may be one or more than one instance of UniTask providing assigned service. For example, if SonMgr could handle 5 k CWS and the requirement is to support 25K CWS we essentially may have 5 instances of SonMgr running. Hence this may help in horizontal scalability.

Service Registration—Each instance of UniTask may register with the Service IP and Port number on which it may be offering Services during the bootup. There may heart beat with these Service UniTask and removed from the Service Group once it is not available.

Loose Coupling: Service Discovery—Each Service UniTask could avail service from another UniTask using the discovery mechanism. For example if SonMgr may like to avail the configuration service it may discover the instance of ConfigMgr dynamically. It may also store the discovered ConfigMgr until it unavailable. Discovery of interested peers keep on happening since bootup. And at every timeout this could be refreshed again. But when actual call comes, it may use already discovered peers to select among them. Then our call latency may not be affected Transaction Stateful—There is also transaction stateful relationship defined for CWS related transactions (attach, detach etc). In this model, once discovered services are lined up the relationship may persist for the complete transaction.

Core Control Plane provides the connection towards the EPC. It may also have SCTP LB and number of Control plane EPC TEP on the same lines as Access Plane.

The planes does not represent different VM's. Multiple VMs or containers could be used for each plane. It is more of logical grouping of UniTask based on the functionality provided. Each Service UniTask may share the Service IP and Port Numbers. The Service Unitask could be on the same VM/blade/container or different. The physical location of the UniTask is more packaging issue. The point here is that Service UniTask has Service IP:Port reachable from other Service Unitask and they have underlying IPC infrastructure to support communication across multiple VM/Containers and even Data centers.

Spawning of the different Service UniTask at the system task using modified procMgr or Kubernetes Cluster Manager may be discussed separately.

ServiceBus may mainly provide following infrastructure: Messaging (both @OneToOne and @OneToMany) design pattern; Service Registration, heartbeating and Discovery; Persistence Service; and Internal load balancing within the Service Group.

Service Plane Scalability—Any of the Services in the services plane could be horizontally scalable as it implements the loose coupling due to dynamic service discovery and association, enabling scalability. The Access/Core Plane scalability could be achieved due the SCTP Load balancing. Service Plane Redundancy could be achieved by making Service UniTask as stateless entities and storing the state information in the Persistence context. Access/Core Redundancy could use redundant SCTP links.

For SonMgr discovering ConfigMgr: a single SonMgr is located at an individual HNG as a UniTask. SonMgr discovers the configMgr using DNS, where the DNS cache was previously populated when service unitask registered, with an IP and port for the configMgr. Once associated, a SonMgr and ConfigMgr are not disassociated until one of the services is no longer available. A watch functionality can provide the notification when an associated service is no longer available. This may be enabled similar to webhooks. This may enable the SonMgr to connect to another ConfigMgr if the original ConfigMgr becomes unavailable.

The general principle of statefulness is enabled by fetching subscriber context from the Service Bus, for example, when a UE attach request appears at a UniRAN UniTask at the HNG. Transaction statefulness achieved via step #4 truly provide the loose coupling design patterns. The UniRan TEP could have more than one UEMgr association and any UEMgr could service the Attach. Call state, subscriber context are all stored in the Service Bus at each checkpoint, enabling a stateless design pattern.

In some embodiments, Zookeeper is used for config management, Kafka or RabbitMQ is used for message passing, and OpenStack is used for hardware virtualization.

In some embodiments, for Inter-DC entry points, minimum two IP interconnects can be configured. This may ensure that if first IP interconnect is not reachable another configured IP interconnect may be used.

In some embodiments, several nodes in the 4G/LTE Evolved Packet Core (EPC), including mobility management entity (MME), MME/serving gateway (S-GW), and MME/S-GW are located in a core network.

Single Source of Truth Design Pattern

Single Source of Truth (SSOT), is the practice of structuring information models and associated data schema such that every data element is stored exactly once. Because all other locations of the data just refer back to the primary "source of truth" location, updates to the data element in the primary location propagate to the entire system without the possibility of a duplicate value somewhere being forgotten.

The SSOT model promotes: Stateless design, therefore opportunity for horizontal scale. Simplified high availability semantics—leverage horizontal scale as a way to replace traditional redundancy (1+1, etc.) models. Simplified access to data for other consumers (e.g. stats, EMS, data analytics).

Figure 29:
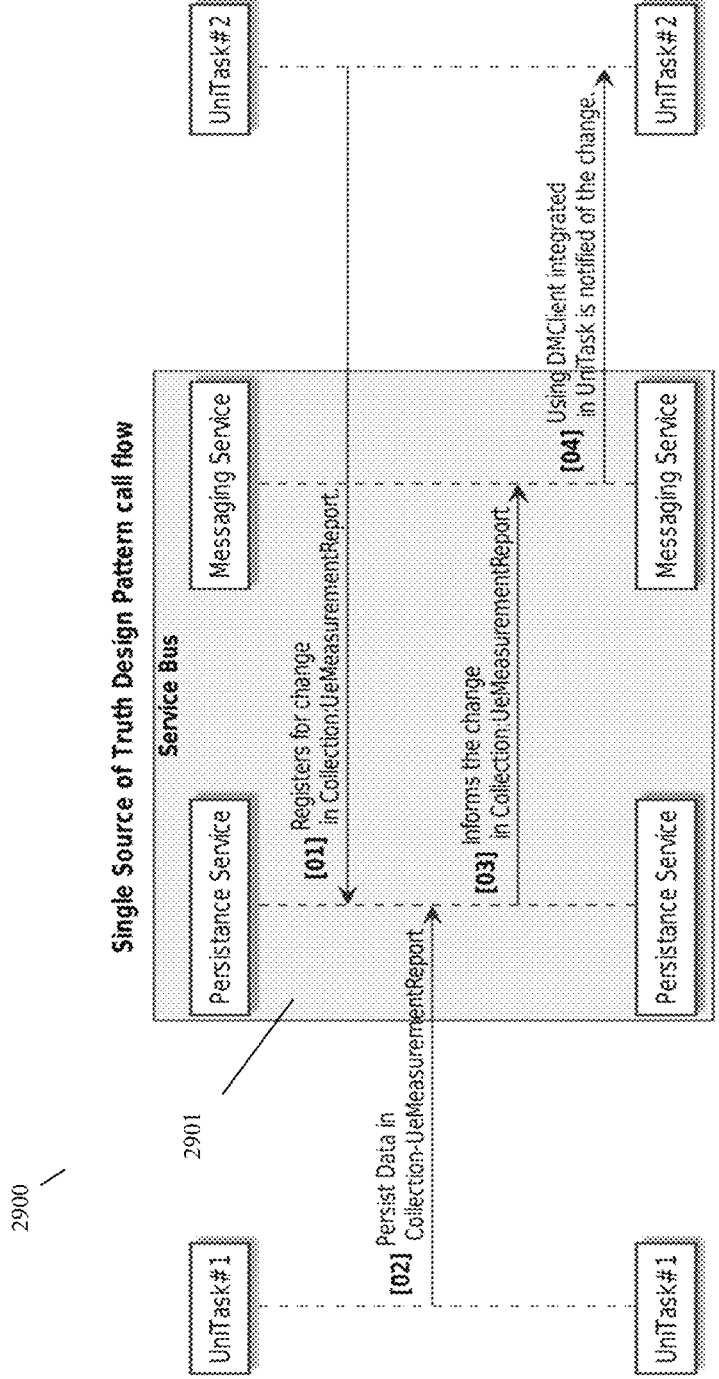
FIG. 29 is a diagram of a SOT call flow, in accordance with some embodiments.

A block diagram 2900 for SSOT is shown in FIG. 29. Hibernate and Mongo constitute the Persistence Service. Kafka Messaging is the building block for Messaging Service. In this example UniTask #1 is the source and the SB 2901 is the Sink of the Data. The UniTask #2 is the listener of the data. UniTask #1 stores the data using embedded REST Client to Hibernate. Hibernate is stacked up with Mongo DataStore. Also, Mongo has inbuilt adaptor to push the data to the Kafka Messaging topic. The data to put on the messaging topic could be configured. If the UniTask #2 is interested in the data it would register with the broadcast Kafka topic and would receive the updates.

Figure 30:
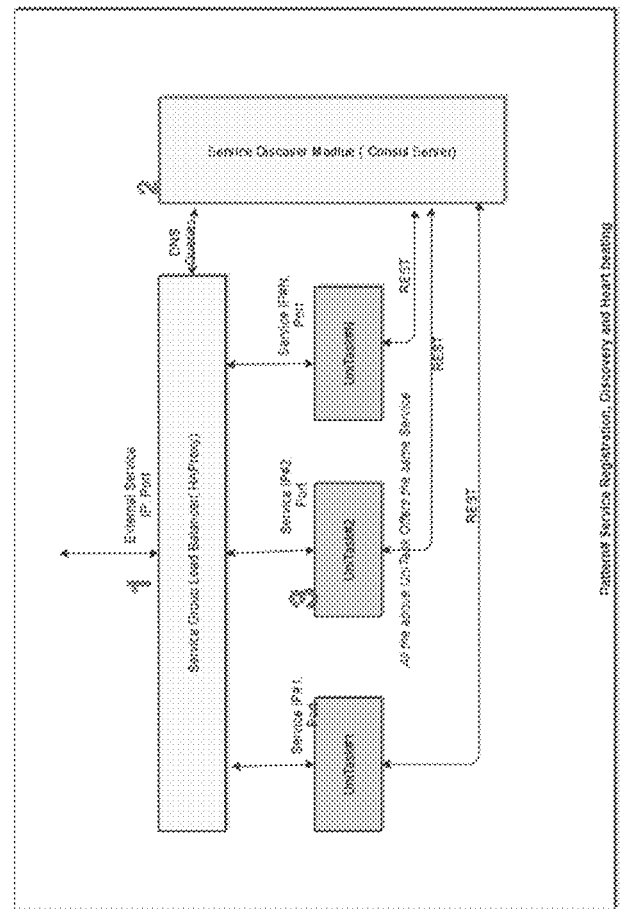
FIG. 30 is a diagram showing service, discovery and load balancing, in accordance with some embodiments.

The call flow 3000 for this pattern is shown in FIG. 30 which includes Service Bus 3001. The mongoDB implements that change stream API. The change stream API enables applications to register for the real time notifications of inserts/updates or deletions in the database. The streams are ingested into one more kafka topics which would route the changes to the UniTask listening for the changes. Unitask can instantly view, filter and act on the changes as soon as changes to data occur.

Service, Discovery, and Load Balancing

The discussions so far for scalable HNG have centered on the theme of subsystem decoupling and horizontal scale of decoupled software layers. There's still work to be done to decide on the exact breakdown of the software layers and what policies will govern the lifecycle of the layers (things like scaling rules, high availability, and affinity/anti-affinity policies).

The nature of virtualization and the means of horizontal scale are also under debate and may have more than 1 answer (e.g. VMs, containers, and their use/distribution across physical servers). Regardless of the results of the lifecycle decisions, it seems there's a universal need for communication between scalable software layers.

Communication between scalable software layers has high level goals: Load Balancers enable Horizontal scaling is distributing your traffic among multiple servers to share the load. Load Balancers facilitate horizontal scaling. Support discovery of a service. Since the software layers may scale independently a feature is required to be able to discover the communication endpoint for a service. Robust, scalable communications. The communication means must be robust to deal with network-based transport (i.e. lossy channels) and include definition of the transport protocol, addressing, and data format/representation. Here we have an opportunity to drive modern and dynamic data representation into our messaging. Ability to be load balanced or abstracted from details of scale. We need to consider how we can abstract the details of horizontal scale between endpoints. Ability to have 'sticky' or 'persistent' communications between endpoints. In some cases we may need to have ephemeral or semi-permanent stickiness between endpoint processes within some logical scope (e.g. a session/call, a CWS or other logical entity). Be agnostic (as much as possible) to the means of scale (e.g. virtualization, containers, orchestration type, etc.). Staying abstracted as much as possible from the means of scale gives us the most flexibility to choose or support different scaling mechanisms.

Figure 31:
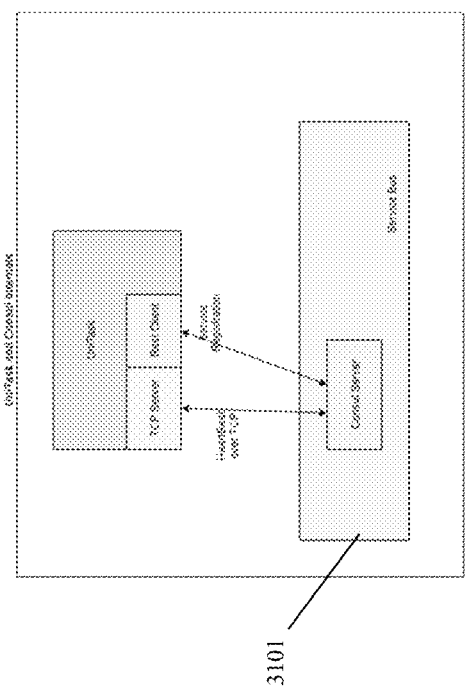
FIG. 31 is a diagram showing service registration, in accordance with some embodiments.

Service Based Architecture 3100 is shown in FIG. 31. Service: Each UniTask is offering some service. For example, UEMgrs offers Session Management Service, ConfigMgr provides Configuration Service and so on. Service IP and Port: Each UniTask offering some service has Service IP: Port number that could be used to avail this service. Service Contract: It specifies the Service IP and Port. Also additional parameters like heart beating detail as follows. It is sample Service Contract created for SON service. Service Registry: It essentially maintains the list of services, service contracts, perform heart beat with registered services. Also, it allows to dynamically add new services. Cloud native building block to achieve this functionality could be 'consul'. Kubernetes also has Service Based Architecture and it internally supports etcd as service registry. Consul can also be integrated with Kubernetes as required.

Figure 32:
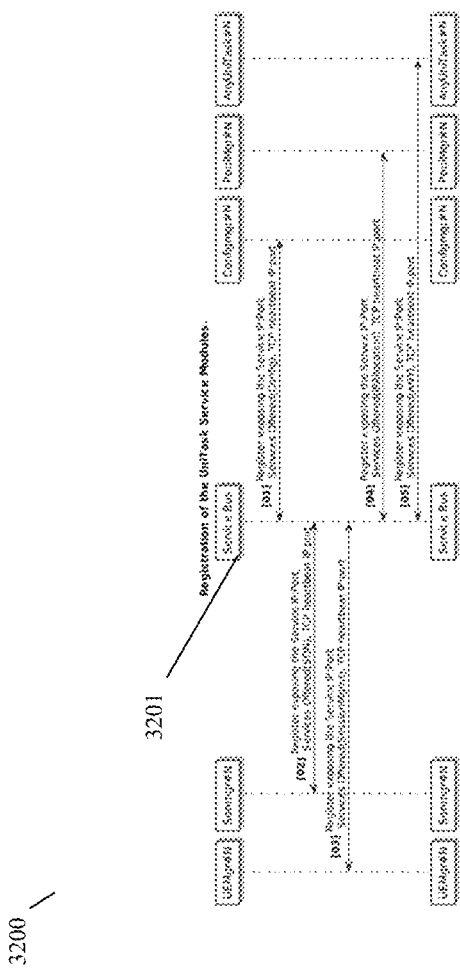
FIG. 32 is a diagram showing registration of Unitask service modules, in accordance with some embodiments.
Figure 33:
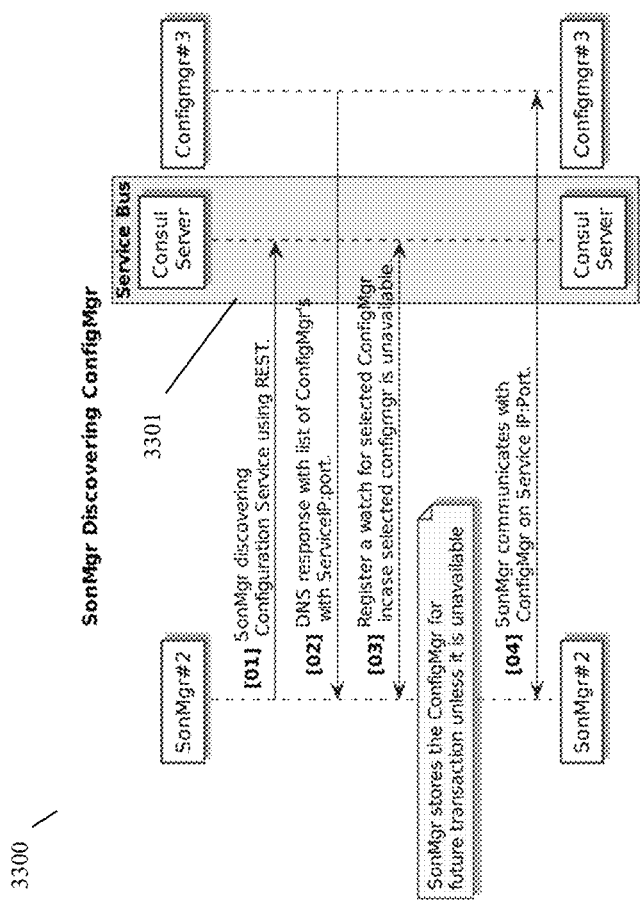
FIG. 33 is a diagram showing SONMgr discovering ConfigMgr, in accordance with some embodiments.

Service Registration 3200 is shown in FIG. 32 which includes Service Bus 3201. The communication between the UniTask offering service and the Service Registry is using the REST interface as follows:

FIG. 33 shows Service Registration 3300 which includes Service Bus 3301 through Service Bus 3302. Each UniTask offering Service Registers the Service Contract as follows:

Service Discovery Pattern

Service discovery is a system-wide function that allows loosely coupled software entities to dynamically locate contact points for other software entities. Cloud native deployments can cause software entities to run across multiple servers, containers, and virtual environments. Due to failover and scaling scenarios, it is too difficult to statically pre-define where a software entity will be located on the network. The result is the need for a pattern where software entities can register their location for others to consume.

Service Discovery: The Services could be Session Management, Statistics, Connection Management etc. In the loosely coupled system, how to discovery UniTask offering the required services is provided by this pattern.

Let's take an example, if the UniRanConn has completed the connection management. The FSM indicate that it need to be forwarded to the UniTask offering Session Management. The UEMgr would be offering the Session Management. Service. The UEMgr could be hosted on the same VM/microservice or could be any other VM/microservice.

So UniRANConn would do the discovery procedure by checking the Service Discovery module over the REST API. It would provide the IP:Port number of the UEMgr to forward the request for session management service.

FIG. 33 includes a SONMgr discovering ConfigMgr via Service Bus 3301.

Messaging/Communication Pattern. There are several communication patterns commonly used.

Figure 34:
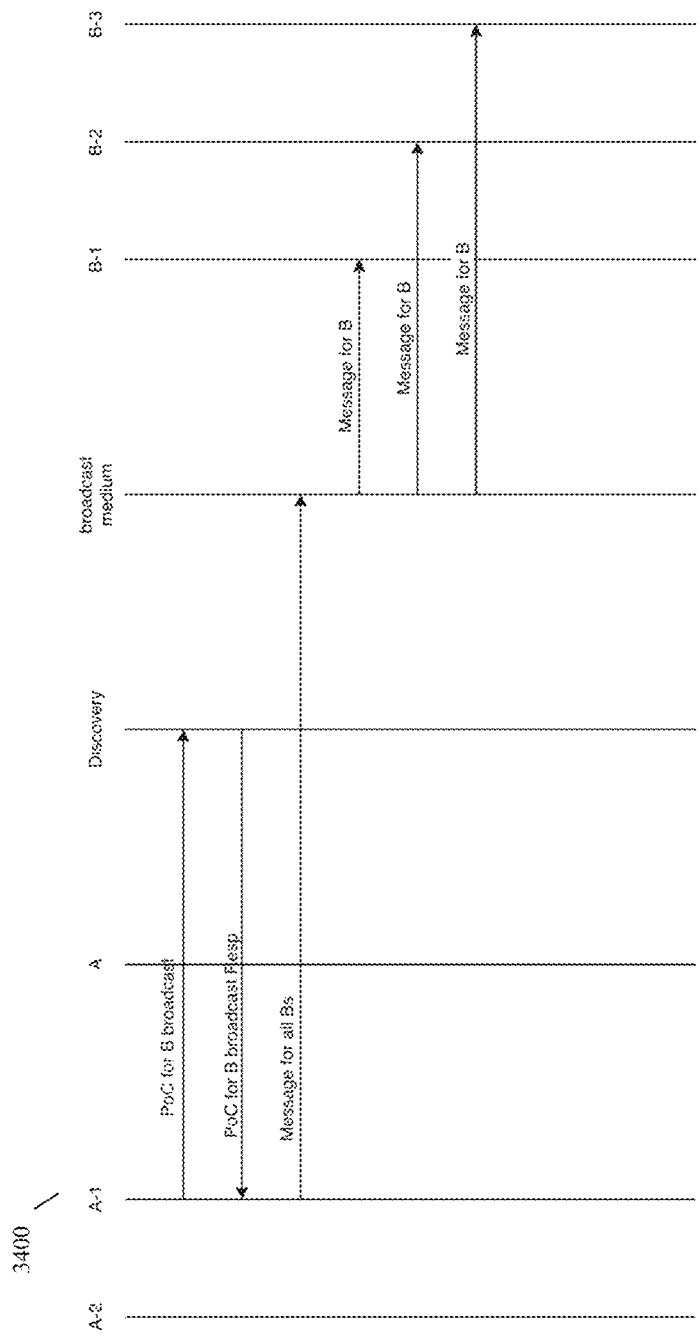
FIG. 34 is a diagram showing messaging for source to any instance, in accordance with some embodiments.

Source to Any Instance Message 3400 (stateless pattern) is shown in FIG. 34. Sources (like (A)) may not care which instance of (B) processes any individual message, or sequence of messages. In this case, the processing of messages by (B) is considered 'stateless' in that any (B) instance can process the message from (A). This is the ideal pattern for scaling and loosely coupled systems as it has the following advantages: allows for limitless horizontal scale from the perspective of the messaging interface. Simplifies high availability from the perspective of the messaging interface of (B) by requiring very little logic in (A) if an instance of (B) dies. At most a retry of the message may be required and (A) has no state on the availability state of an individual instance of (B).

Figure 35:
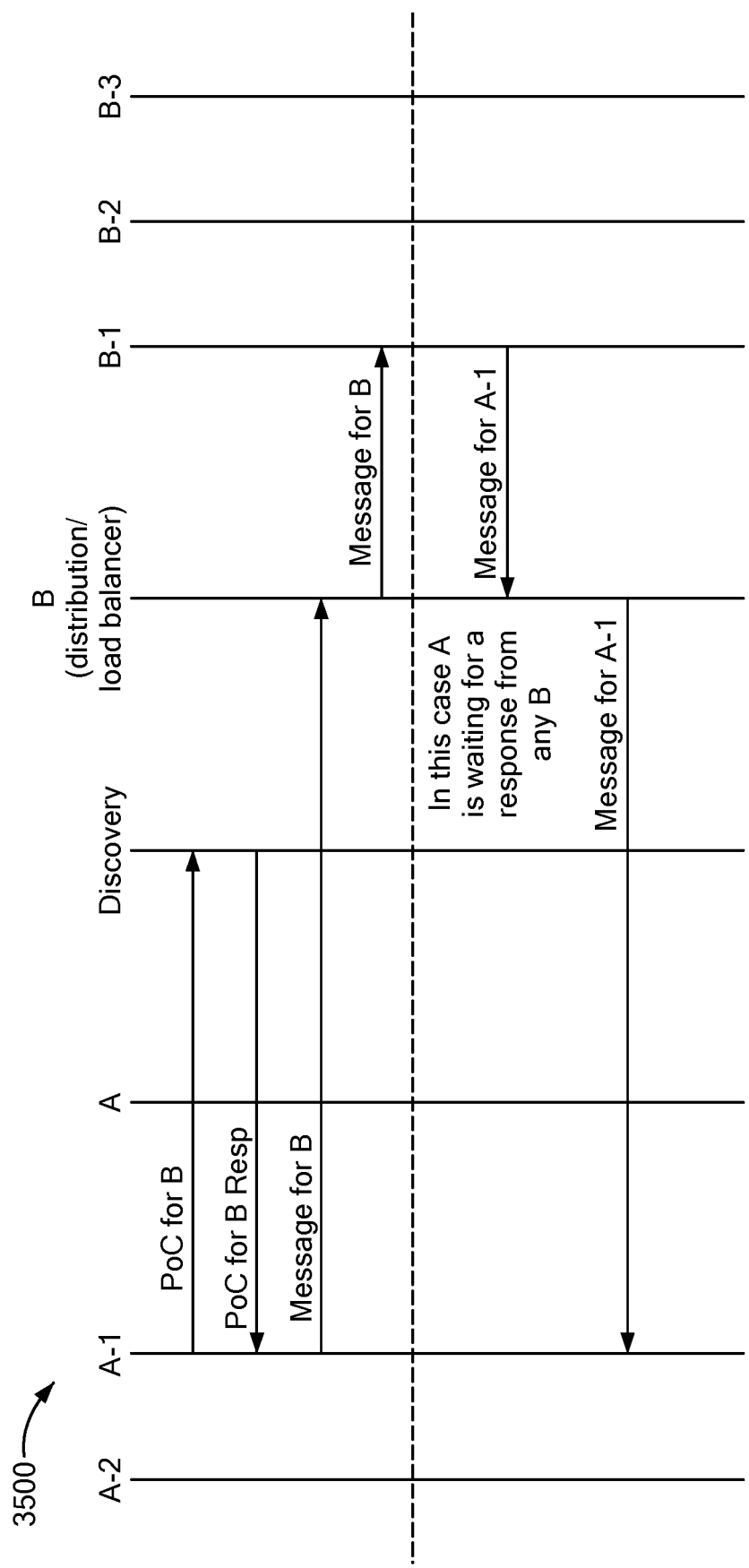
FIG. 35 is a diagram showing messaging for source to a specific instance, in accordance with some embodiments.

Source to All Instances Message (broadcast pattern) 3500 is shown in FIG. 35. Sources (A) may want to inform all running instances of another process (B) about an event or data. This pattern is useful for dSON/multi-HNG. But, broadcasts are sometimes used in replacement for a global semi-consistent datastore, which Service Bus intends to provide.

Figure 36:
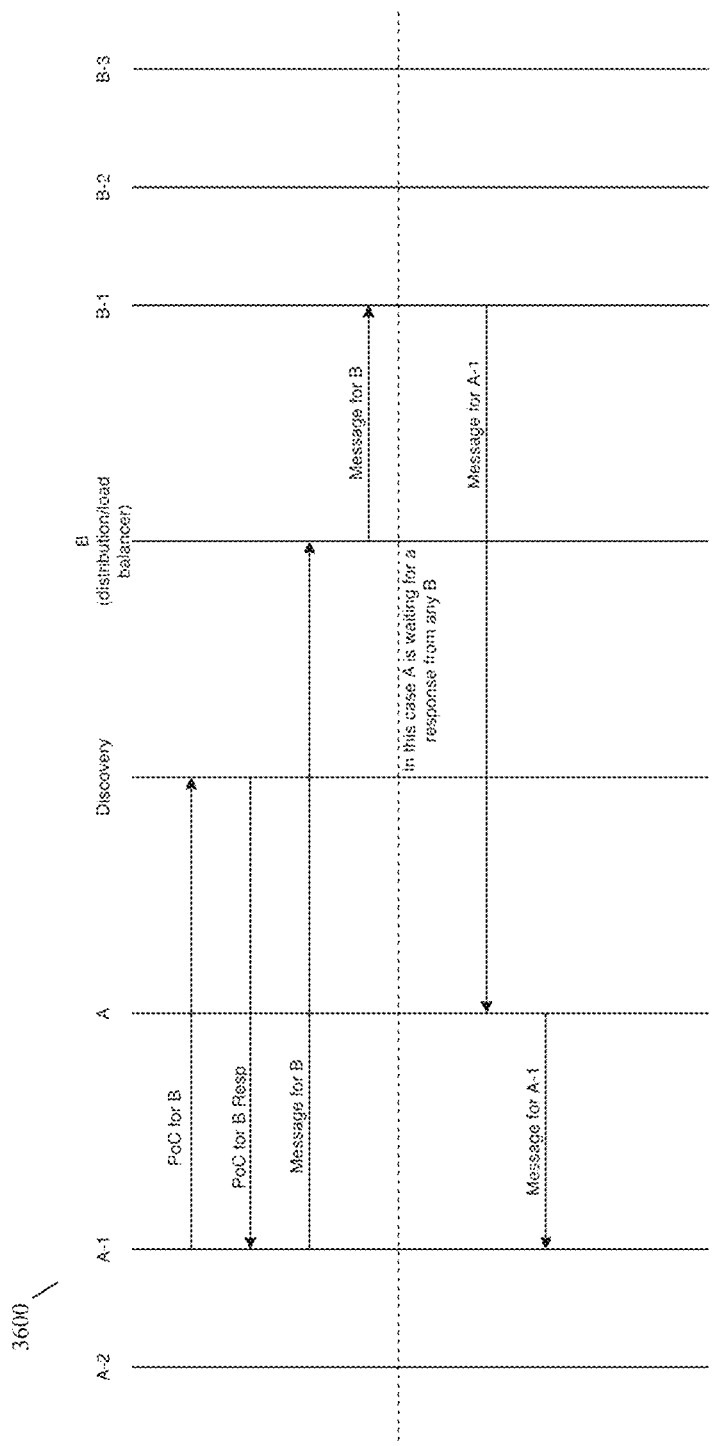
FIG. 36 is a diagram showing messaging where addressing is included in the request to find the requestor, in accordance with some embodiments.

FIG. 36 shows Source to Specific Instance Message (stateful response pattern) 3600. This case is where a message is destined for a specific destination instance due to a client holding state that can handle a response. In this case, discovery should be bypassed for the response, and instead the return address should be: part of the ephemeral state between client and server (e.g. REST).

Figure 37:
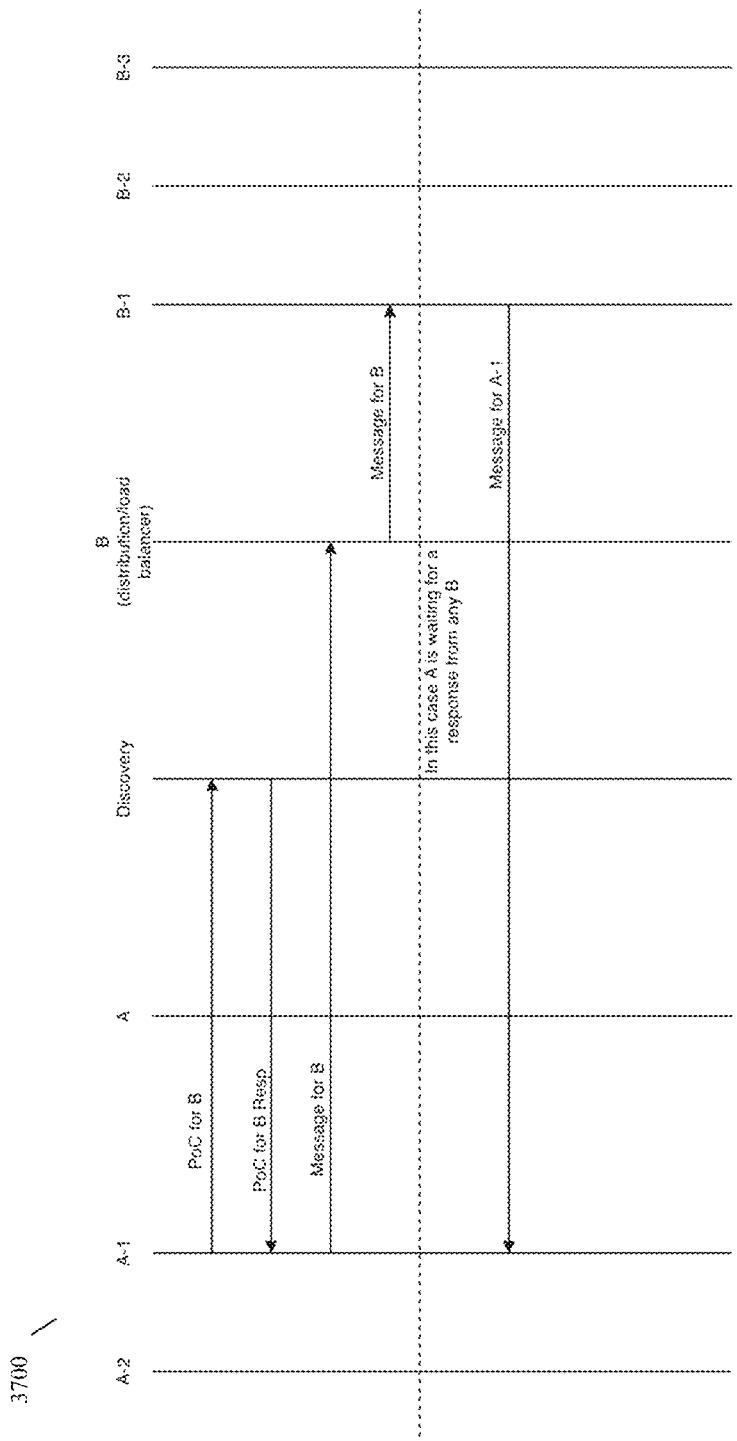
FIG. 37 is a diagram showing messaging where addressing is included in the request to find the requestor, in accordance with some embodiments.

Addressing included in the request to find the requestor through A's distribution/load balancer function 3700 is shown in FIG. 37.

Figure 38:
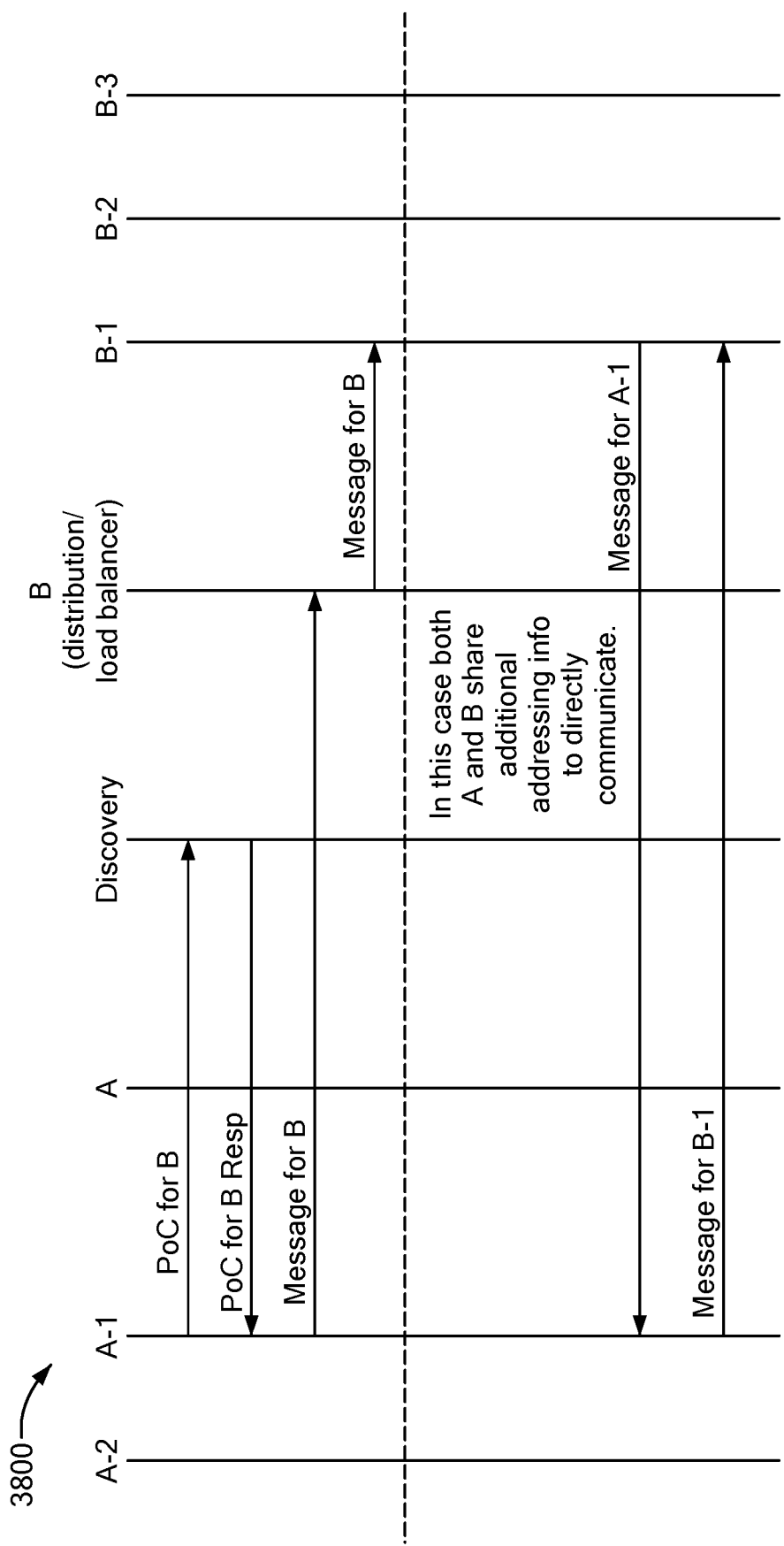
FIG. 38 is a flow diagram of source to specific instance message, in accordance with some embodiments.

FIG. 38 shows addressing included in the request to find the requestor (e.g. Kafka response queue in dSON) directly to the A instance 3800.

Source to Specific Instance Message (ongoing sticky relationship) 3800 is shown in FIG. 38. This pattern is covered to describe processes that have an ongoing 'sticky' relationship. Generally, this case should be avoided as it can complicate HA, scalability, and messaging.

This specific example assumes that (A) locates (B) at the start of a sticky relationship through the discovery service. From there (A) and (B) can communicate directly or through their distribution/load balancers.

Lightning Message Pattern

Figure 39:
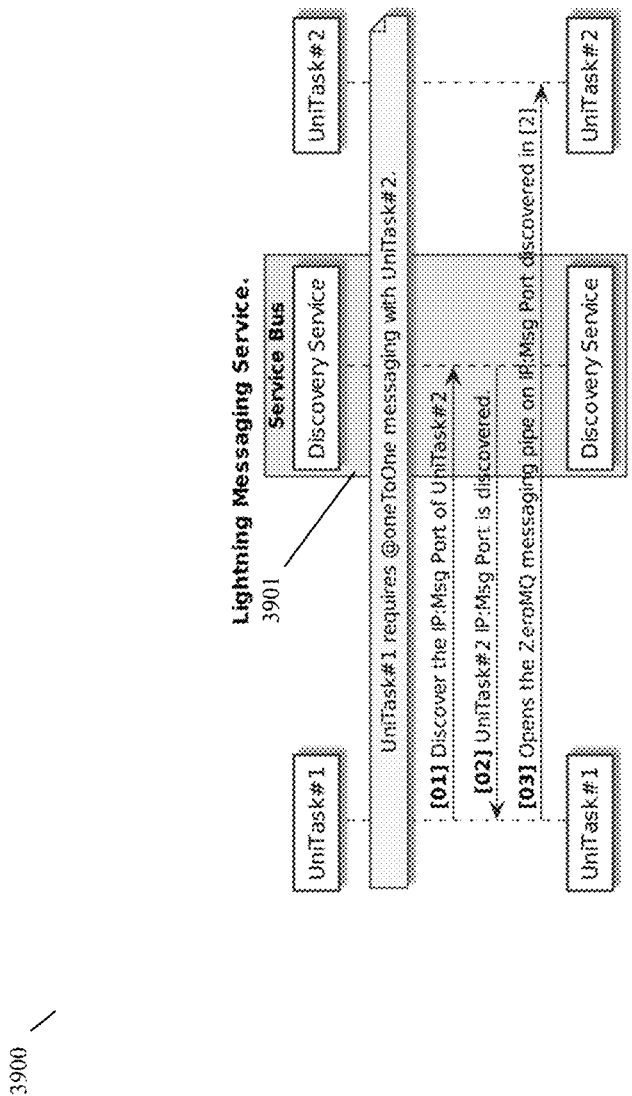
FIG. 39 is a system diagram showing the lightning message service, in accordance with some embodiments.

The lighting message service is shown in FIG. 39, and is between two UniTask providing One-To-One communication pattern. The messaging service as the name suggest uses the ZeroMQ underlying messaging framework over TIPC. The advantage is that it could provide this service over two UniTask on different VM/Microservices.

Lightning Messaging Service helps to directly communicate between two UniTask's across difference VM/Containers Pods providing @OneToOne communication pattern. It essentially uses the zeroMQ building block over TIPC as underlying messaging system. The zeroMQ essentially is optimized for low latency communication requirements and hence the name of the design pattern.

Figure 40:
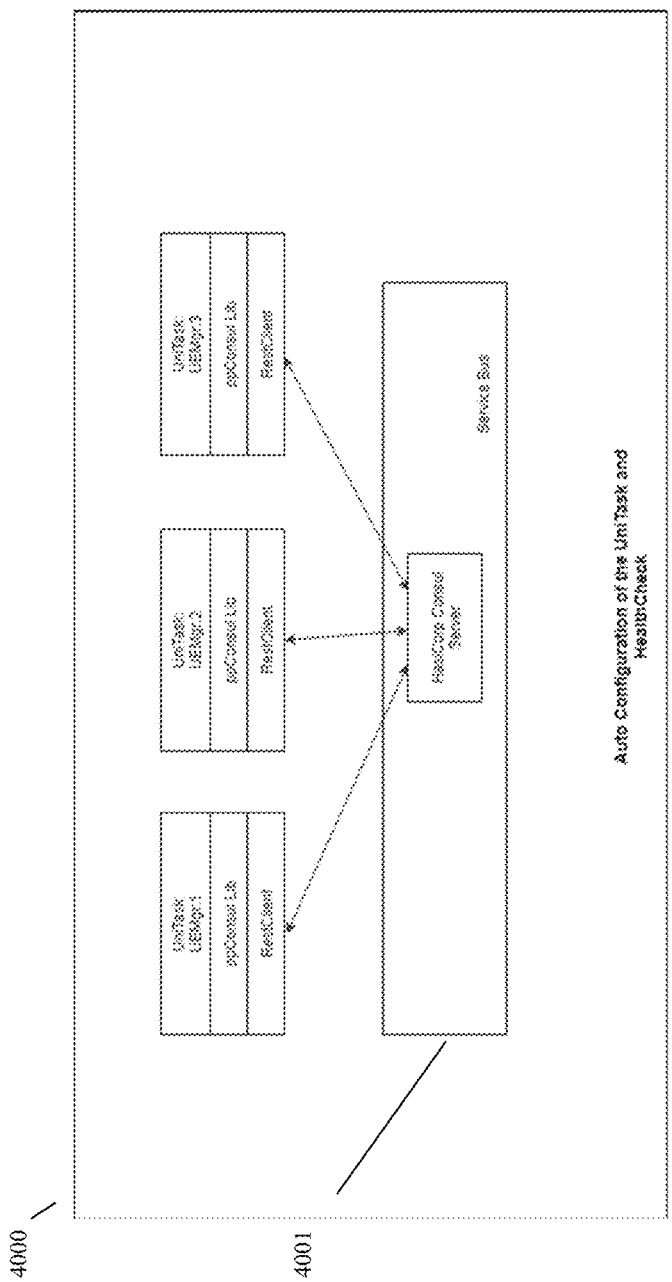
FIG. 40 is a system diagram showing a zero touch configuration, in accordance with some embodiments.

Precondition is that both UniTask #1 and UniTask #2 are registered with the discovery service for it to be discovered. In the call flow 4000 of FIG. 40, UniTask #1 can communicate with UniTask #2 via Service Bus 4001 without any prior configuration of the IP: Msg Port of UniTask #2. The UniTask #1 and UniTask #2 could be on the same VM/Container Pod or could be located elsewhere.

In practice, instead of UniTask #1 discovering directly UniTask #2, it would discover with the service type. It would essentially be discover UniTask providing the Session Management (UEMgr) service instead of specifically requesting for UniTask #2. The lightning design pattern is generic and hence presenting as above.

Figure 41:
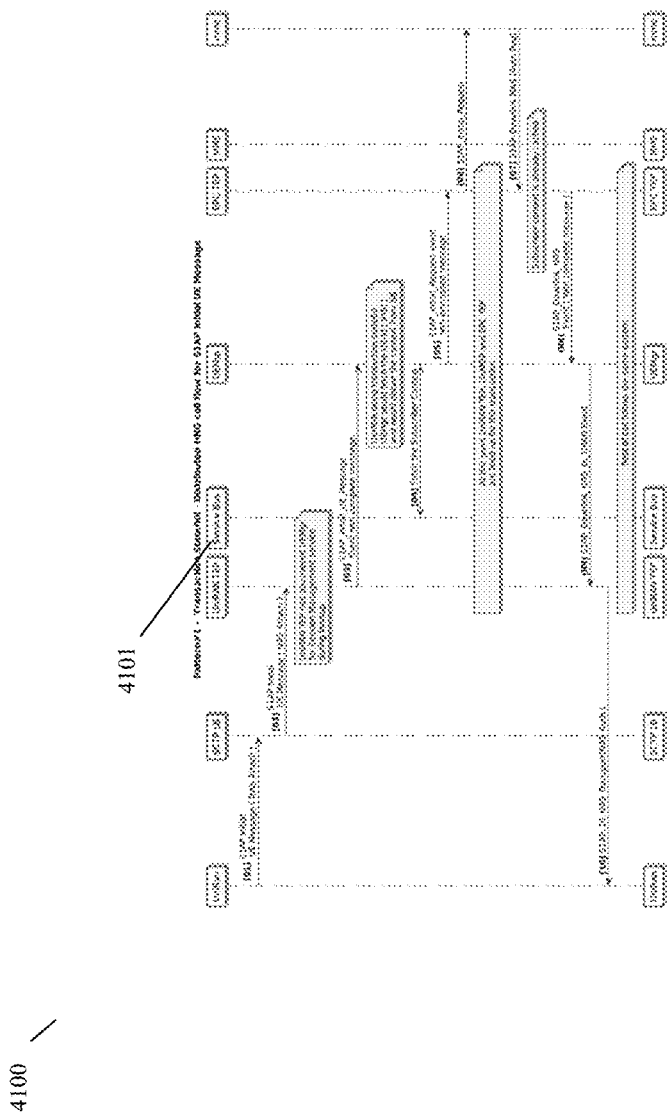
FIG. 41 is a call diagram showing distributed HNG call flow, in accordance with some embodiments.

Synchronization Service 4100 is shown in FIG. 41, and includes Service Bus 4101. In the distributed system with no centralized controlling entity there are certain uses cases. Apache Zookeeper is a highly consistent, scalable and reliable cluster co-ordination service. ZooKeeper itself is a distributed service that is ideal for Configuration management, Naming service, providing distributed synchronization, leader election and group services. In the distributed ecosystem with various SonMgr, there are usecases wherein different SonMgr's synchronizes such that only one SonMgr performs the task. Synchronization service provides the service between different SonMgr to communicate and synchronize. If one SonMgr is performing the required task and another SonMgr attempts to access the service it would be queued and informed once previous SonMgr is done with the task. SonMgr can avail this service from ServiceBus using the local REST Interface by connecting to local Synchronous service.

Figure 42:
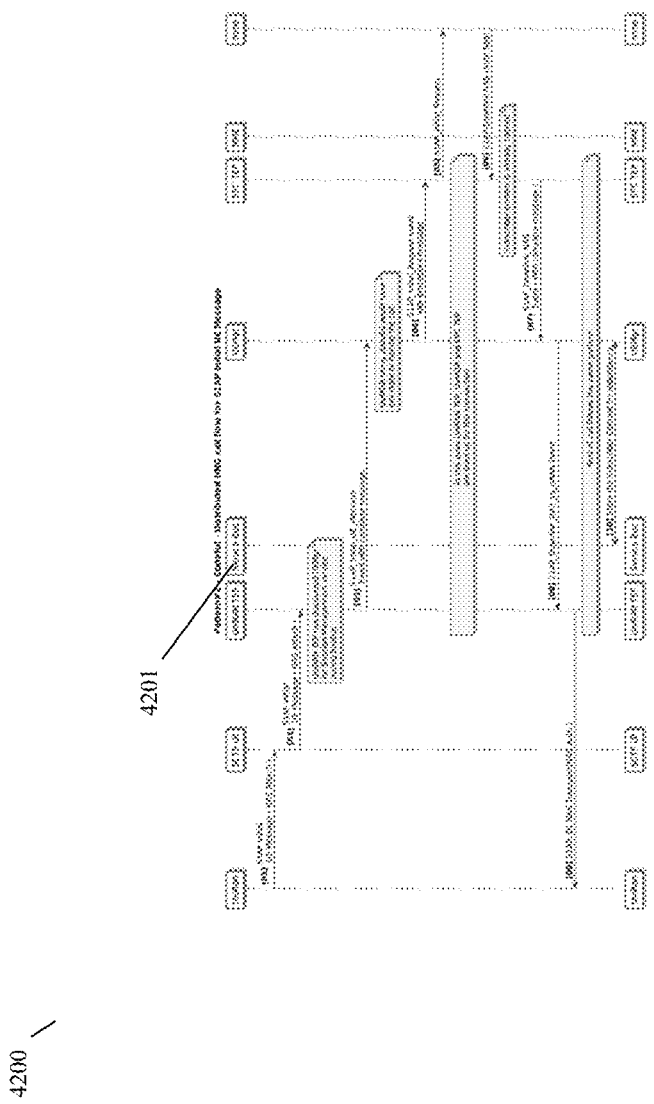
FIG. 42 is a flow diagram showing stateful distributed HNG call flow, in accordance with some embodiments.

Messaging Service 4200 is shown in FIG. 42 and includes Service bus 4200 including Service Bus 4201. The evolved messaging service with Kafka is already integrated with HNG. It provides the One-To-Many and One-To-One messaging pattern. Messaging service provides messaging infrastructure between SonMgr on different HNG's to communicate and share required information. Messaging provides One-To-Many and One-To-One type of communication pattern. Each HNG cluster would be running a SonMgr process. SonMgr would have the messaging client integrated. Using the integrated client, SonMgr would be communicating with the messaging service as shown above.

Figure 43:
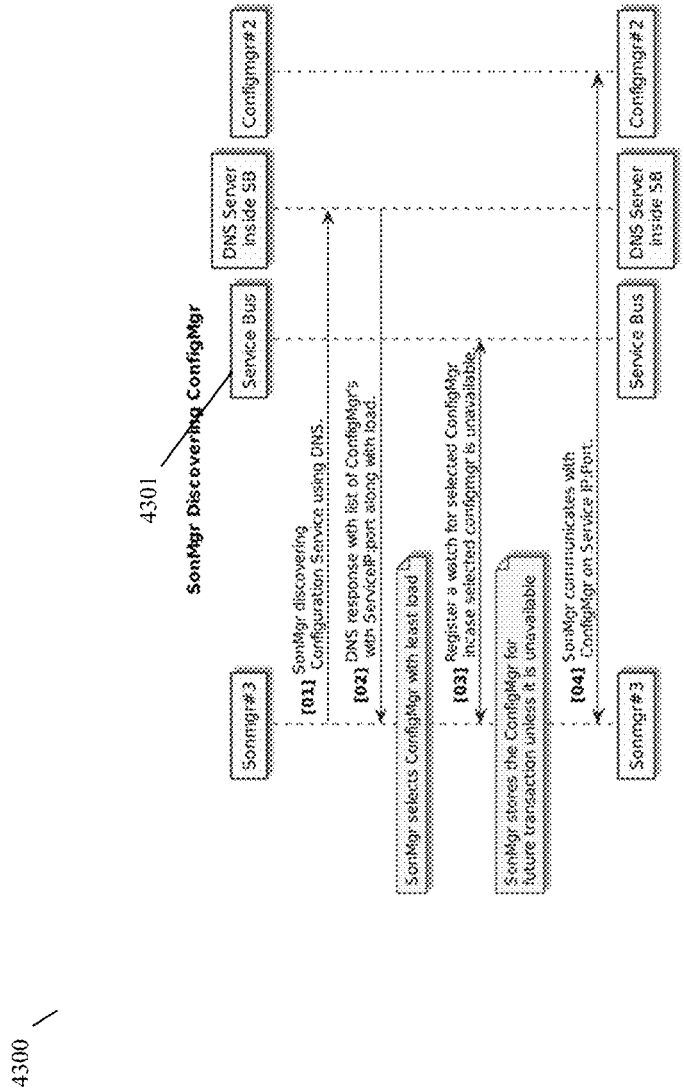
FIG. 43 is a flow diagram of a SONMgr discovering a ConfigMgr, in accordance with some embodiments.

Zero Touch Configuration is shown in FIG. 43, and includes Service Bus 4301. This is one of the pattern which is widely used and with different interpretation. In our context, Zero touch provisioning (ZTP) in HNG pattern would allow the other subcomponents of HNG (microservices/VM's) to be configured automatically, eliminating most of the manual configuration required.

Here are the key features of this patterns: a) Allocation of the IP Address to the UniTask. In the above example, the UniTask would perform the DNS to resolve the SB and invoke the IP Allocation request. The IP Allocation service in turn can use the configured the IP Pool or DHCP on the background and provide the IP Address to the UniTask.

Figure 44:
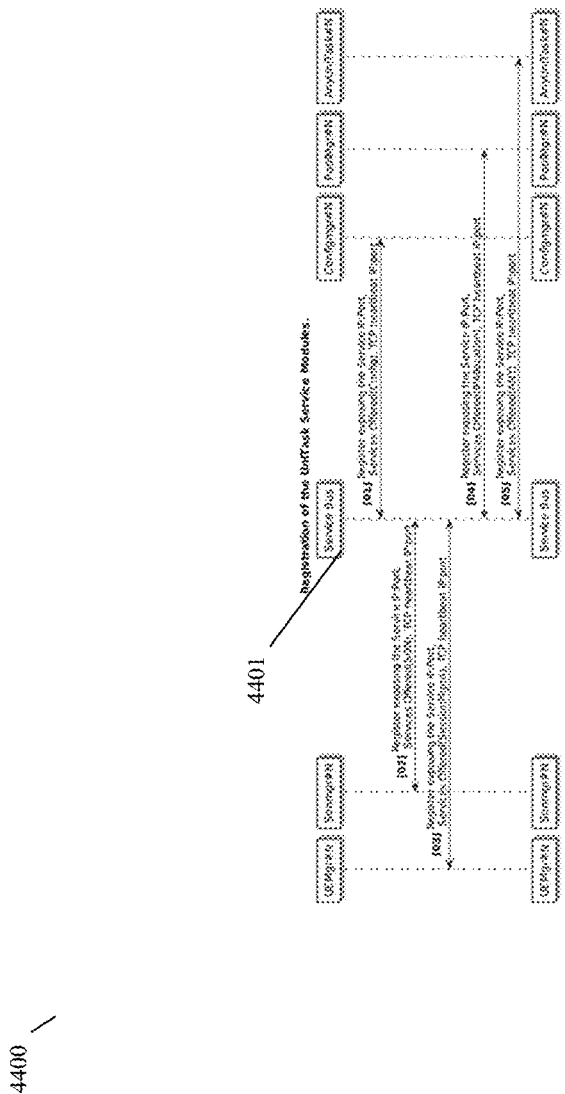
FIG. 44 is a diagram of flow diagram for registration of a UniTask service module, in accordance with some embodiments.
Figure 45:
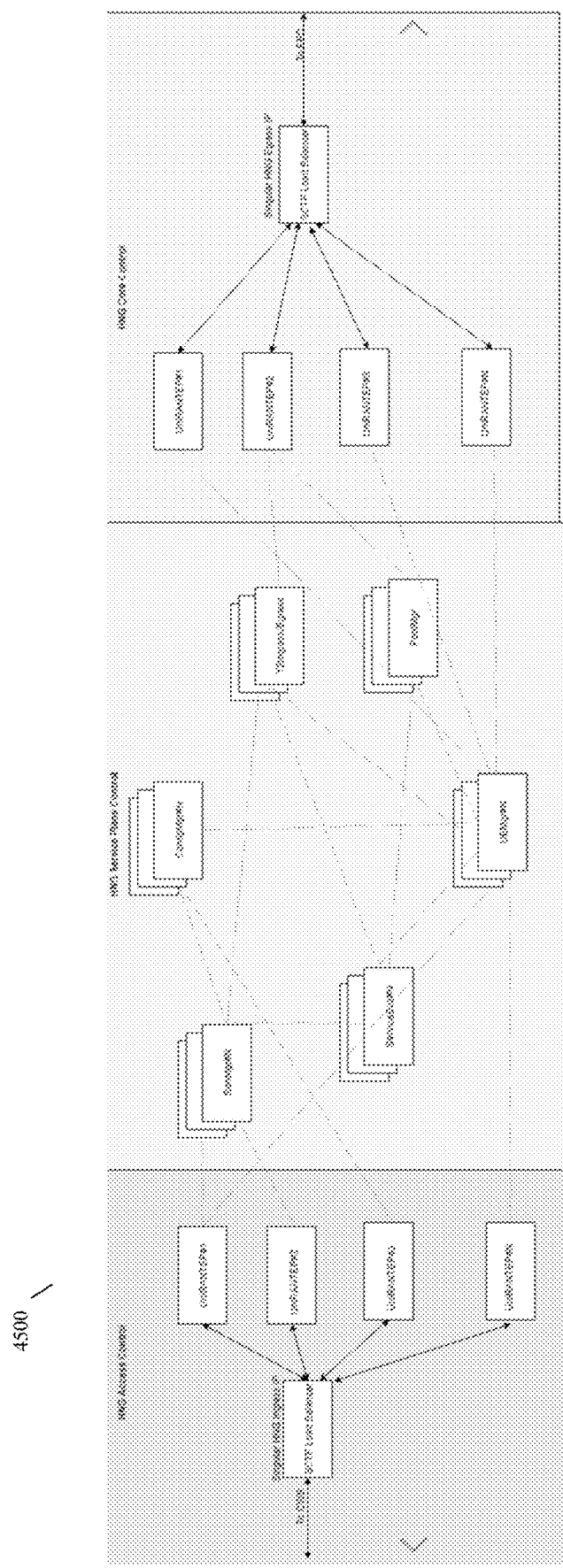
FIG. 45 is a diagram showing communications between components of an HNG access control module, an HNG service control plane, and HNG core control, in accordance with some embodiments.
Figure 46:
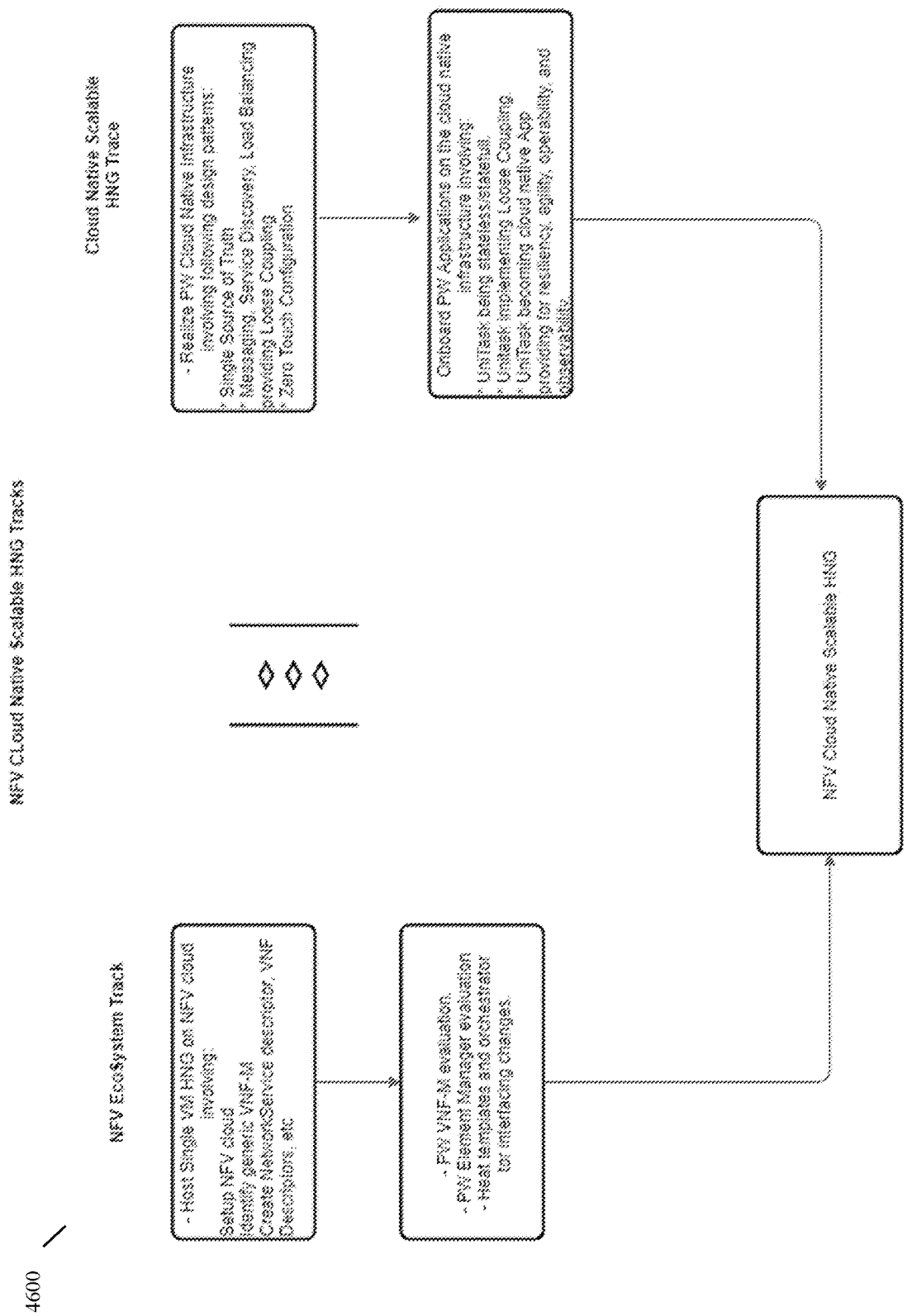
FIG. 46 is a diagram of NFV cloud native scalable HNG tracks, in accordance with some embodiments.
Figure 47:
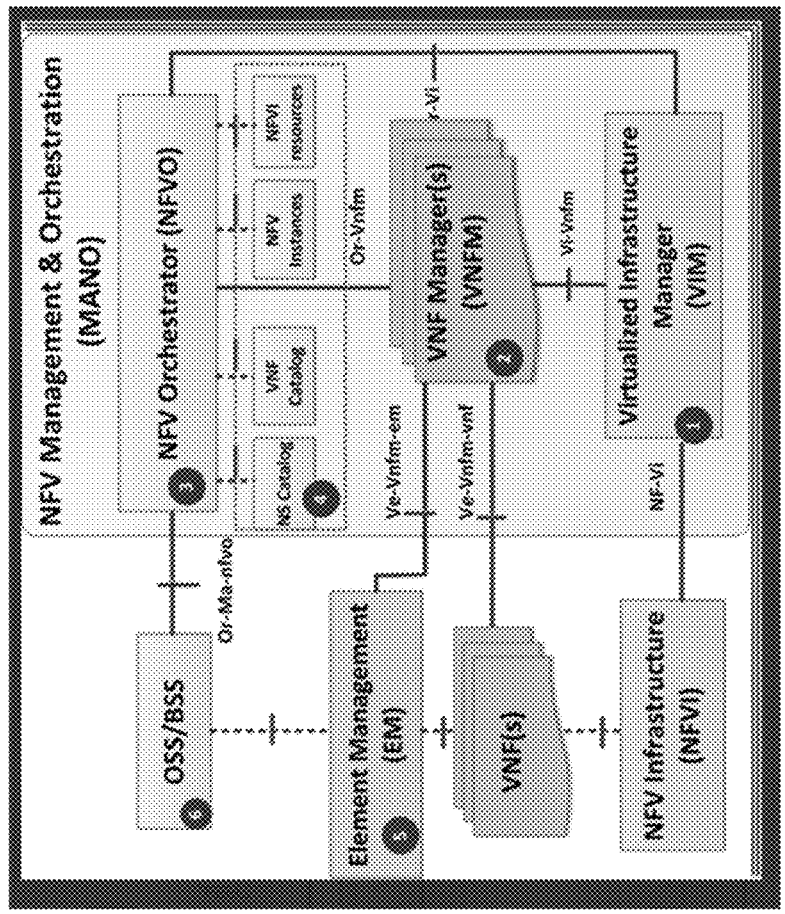
FIG. 47 is a diagram showing NFV management and orchestration, in accordance with some embodiments.

Mirroring Service 4400 is shown in FIG. 44. The Messaging Service is across Data Center. Mirroring is essentially B2BUA with consumer from source cluster that is connected with producer to the destination cluster. It would use mirroring of messages on the WAN link between data centers. Two Mirrors would be created within the messaging service. One from the DC-1->DC-2 and another from DC2->DC1. Mirrors have tolerance built in if the WAN links flaps and could be configured for the lag. The approach is highly expandable to more than two data centers. This could be achieved by creating new mirrors as we add more data centers to this architecture.

Software Architecture

Service Bus Internals:

Service Bus is a microservice based on Dropwizard microservices framework. It host multiple services like messaging & synchronization within the framework. Service Bus instance is one such unit of execution. Each SB instance would be independent and would host the service. Also, it would have its own IP and is an entity. Multiple Service Bus instances are created each rendering one or all the services. Service Bus is stateless entity and the state is the property of the service itself. For example, for messaging service the state information is stored externally by messaging broker. Since Service Bus is stateless it does not have any redundancy requirements. Service Bus IP/Networking requirements are based on the services it offers as explained in previous sections.

Process

FIG. 41 shows a first transaction stateful—distributed call flow 4100 for S1AP initial UE message including a Service Bus 4101. At [01], S1AP Initial UE message is the attach message for the UE. At [02], it is passed via an SCTP connection (could be load balanced) to a RAN terminal endpoint (TEP). TEP sends the message to an HNG that it has already discovered during bootup; at [03] it is sent to the UEMgr at the HNG. The UEMgr does not have the context for the call but fetches it from the service bus at [04], specifically, the UE ID, which can be an IMSI. Once obtained, the HNG sends the information via an S1AP_Initial_Request to the EPC (core) via EPC TEP at [05] via MME at HNG, to the core network MME [06]. The CN MME returns authentication requests [07], which are sent to UEMgr at [08], which then obtains the UE NAS authentication information via [09], [10]. The rest of the call follows the same pattern.

FIG. 42 shows a stateful—distributed call flow 4200 for S1AP initial UE message including a Service Bus 4201, where state is already available on the service bus. At [01], S1AP Initial UE message is the attach message for the UE. At [02], it is passed via an SCTP connection (could be load balanced) to a RAN terminal endpoint (TEP). TEP sends the message to an HNG that it has already discovered during bootup; at [03] it is sent to the UEMgr at the HNG. The UEMgr is stateful and already has call state to handle the call. The HNG sends the information via an S1AP_Initial_Request to the EPC (core) via EPC TEP at [04] via MME at HNG, to the core network MME [05]. The CN MME returns authentication requests [06], which are sent to UEMgr at [07], which then obtains the UE NAS authentication information via [08], [09]. The rest of the call follows the same pattern. This context is stored for redundancy in/via the service bus at [10], enabling call flow 1700.

FIG. 43 shows a call flow 4300 for SONMgr discovering ConfigMgr including Service Bus 4301. A DNS server is present within the service bus, enabling discovery by SonMgr #3 at step [01]; the DNS server returns a list of available HNGs (ConfigMgrs), including, e.g., IP, port, load information at step [02]. The SONMgr is able to select the HNG with the least load and sends a message to the service bus denoting this; this is a registration message [03], handled by the service bus; the service bus is able to deny service if unavailable to route the message or if the HNG does not respond, etc., in which case the service bus will return an error via a callback function. At step [04] the SONmgr is able to communicate directly with the selected HNG.

Figure 48:
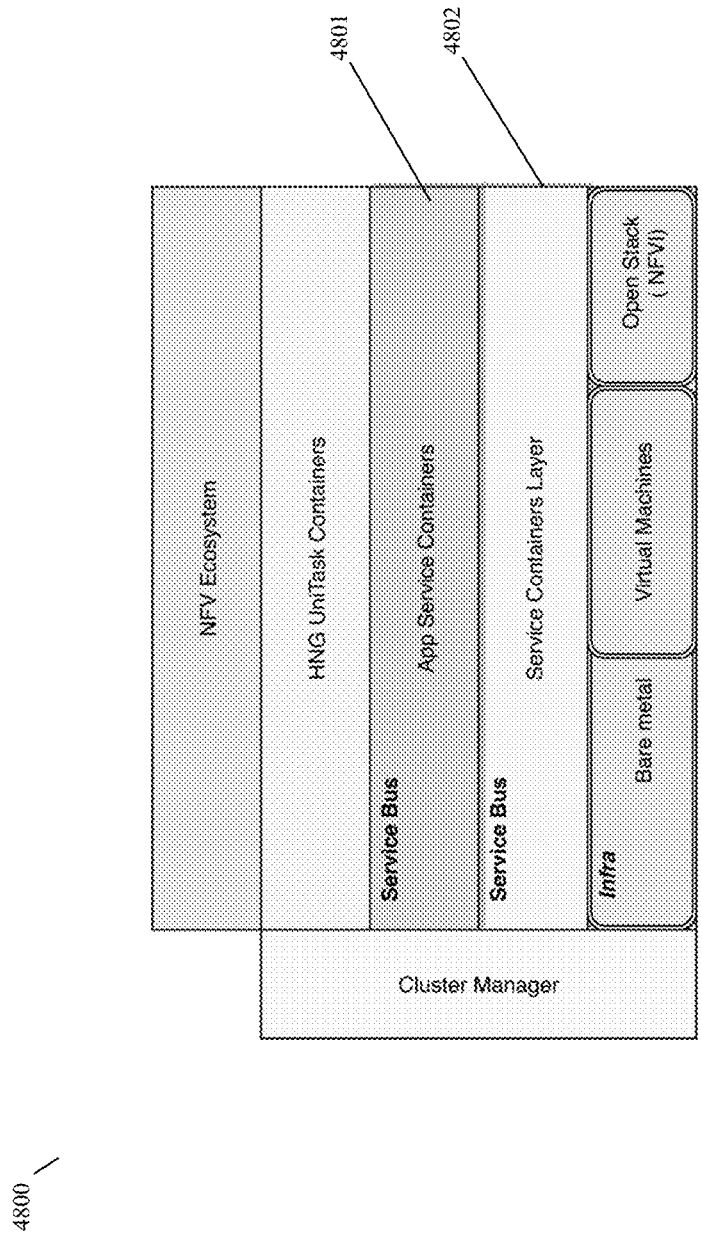
FIG. 48 is a diagram showing a cluster manager with an NFV ecosystem and service containers, in accordance with some embodiments.

FIG. 48 shows a call flow 4800 for registration of the UniTask service modules including Service Bus 4801 and Service Bus 4802.

Figure 49:
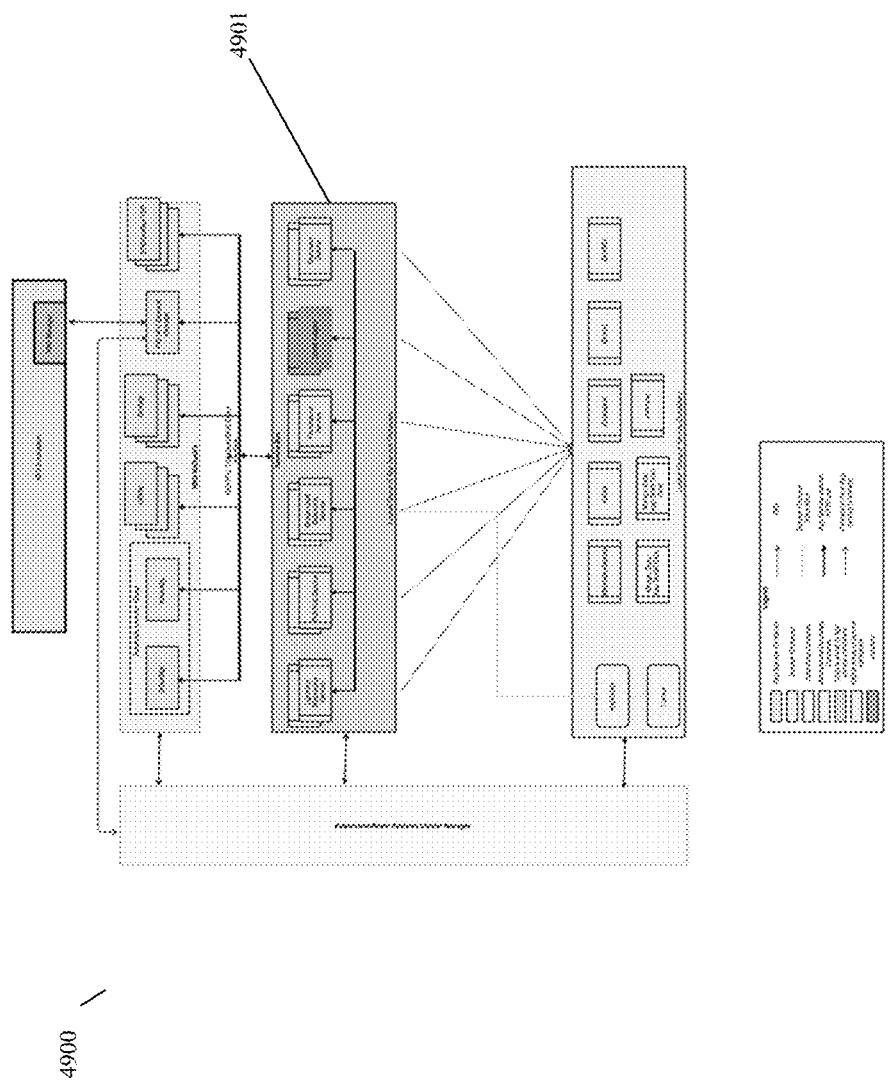
FIG. 49 is a diagram of a system including a Service Bus, in accordance with some embodiments.

FIG. 49 is a diagram 4900 showing communications between components of an HNG access control module, an HNG service control plane, and HNG core control.

FIG. 50 is a diagram 5000 of NFV cloud native scalable HNG tracks.

FIG. 51 is a diagram 5100 showing NFV management and orchestration.

FIG. 52 is a diagram 5200 showing a cluster manager with an NFV ecosystem and service containers, including Service Bus 5201 and Service Bus 5202.

FIG. 53 is a diagram of a system 5300 including a Service Bus 5301.

Where shown in the present disclosure it is understood that an MME/S-GW is representing any combination of nodes in a core network, of whatever generation technology, as appropriate. The present disclosure contemplates a gateway node, variously described as a gateway, HetNet Gateway, multi-RAT gateway, LTE Access Controller, radio access network controller, aggregating gateway, cloud coordination server, coordinating gateway, or coordination cloud, in a gateway role and position between one or more core networks (including multiple operator core networks and core networks of heterogeneous RATs) and the radio access network (RAN). This gateway node may also provide a gateway role for the X2 protocol or other protocols among a series of base stations. The gateway node may also be a security gateway, for example, a TWAG or ePDG. The RAN shown is for use at least with an evolved universal mobile telecommunications system terrestrial radio access network (E-UTRAN) for 4G/LTE, and for 5G, and with any other combination of RATs, and is shown with multiple included base stations, which may be eNBs or may include regular eNBs, femto cells, small cells, virtual cells, virtualized cells (i.e., real cells behind a virtualization gateway), or other cellular base stations, including 3G base stations and 5G base stations (gNBs), or base stations that provide multi-RAT access in a single device, depending on context.

In the present disclosure, the words "eNB," "eNodeB," and "gNodeB" are used to refer to a cellular base station. However, one of skill in the art would appreciate that it would be possible to provide the same functionality and services to other types of base stations, as well as any equivalents, such as Home eNodeBs. In some cases, Wi-Fi may be provided as a RAT, either on its own or as a component of a cellular access network via a trusted wireless access gateway (TWAG), evolved packet data network gateway (ePDG) or other gateway, which may be the same as the coordinating gateway described hereinabove.

The word "X2" herein may be understood to include X2 or also Xn or Xx, as appropriate. The gateway described herein is understood to be able to be used as a proxy, gateway, B2BUA, interworking node, interoperability node, etc. as described herein for and between X2, Xn, and/or Xx, as appropriate, as well as for any other protocol and/or any other communications between an LTE eNB, a 5G gNB (either NR, standalone or non-standalone). The gateway described herein is understood to be suitable for providing a stateful proxy that models capabilities of dual connectivity-capable handsets for when such handsets are connected to any combination of eNBs and gNBs. The gateway described herein may perform stateful interworking for master cell group (MCG), secondary cell group (SCG), other dual-connectivity scenarios, or single-connectivity scenarios.

In some embodiments, the base stations described herein may be compatible with a Long Term Evolution (LTE) radio transmission protocol, or another air interface. The LTE-compatible base stations may be eNodeBs, or may be gNodeBs, or may be hybrid base stations supporting multiple technologies and may have integration across multiple cellular network generations such as steering, memory sharing, data structure sharing, shared connections to core network nodes, etc. In addition to supporting the LTE protocol, the base stations may also support other air interfaces, such as UMTS/HSPA, CDMA/CDMA2000, GSM/EDGE, GPRS, EVDO, other 3G/2G, legacy TDD, 5G, or other air interfaces used for mobile telephony. In some embodiments, the base stations described herein may support Wi-Fi air interfaces, which may include one of 802.11a/b/g/n/ac/ad/af/ah. In some embodiments, the base stations described herein may support 802.16 (WiMAX), or other air interfaces. In some embodiments, the base stations described herein may provide access to land mobile radio (LMR)-associated radio frequency bands. In some embodiments, the base stations described herein may also support more than one of the above radio frequency protocols, and may also support transmit power adjustments for some or all of the radio frequency protocols supported.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to 5G networks, LTE-compatible networks, to UMTS-compatible networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof.

The word "cell" is used herein to denote either the coverage area of any base station, or the base station itself, as appropriate and as would be understood by one having skill in the art. For purposes of the present disclosure, while actual PCIs and ECGIs have values that reflect the public land mobile networks (PLMNs) that the base stations are part of, the values are illustrative and do not reflect any PLMNs nor the actual structure of PCI and ECGI values.

In the above disclosure, it is noted that the terms PCI conflict, PCI confusion, and PCI ambiguity are used to refer to the same or similar concepts and situations, and should be understood to refer to substantially the same situation, in some embodiments. In the above disclosure, it is noted that PCI confusion detection refers to a concept separate from PCI disambiguation, and should be read separately in relation to some embodiments. Power level, as referred to above, may refer to RSSI, RSFP, or any other signal strength indication or parameter.

In some embodiments, the software needed for implementing the methods and procedures described herein may be implemented in a high level procedural or an object-oriented language such as C, C++, C #, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, other 3G/2G, 5G NR/SA/NSA, legacy TDD, or other air interfaces used for mobile telephony, or any combination thereof.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method for providing a Service Bus for telecommunications infrastructure, comprising:
providing a communications system between mutually interacting software applications of the telecommunications infrastructure, including a plurality of telecommunication microservices, each microservice comprising:
an internal bus;
a data store in communication with the internal bus;
a data access object in communication with the internal bus;
a message exchange object in communication with the internal bus;
a MAPReduce engine in communication with the internal bus; and
a restful Application Programming Interface (API) bus in communication with the data access object, the message exchange object and the MAPReduce engine;
providing a telecommunications infrastructure messaging service, a telecommunications infrastructure synchronization service and a telecommunications infrastructure persistence service, and routing messages between services, monitoring and controlling routing of message exchange between servers, resolving contention between communicating service components, controlling deployment and versioning of services, marshaling use of redundant services, and providing commodity services; and
wherein the Service Bus provides infrastructure services for a stateless system wherein processing and state information are separated, and wherein the system has loosely coupled components that are cloned as needed and are decomposable into smaller functional units.

2. The method of claim 1, wherein providing commodity services include at least one of event handling, data transformation and mapping, message and event queueing and sequencing, security and exception handling, protocol conversion, and enforcing quality of communication services.

3. The method of claim 1, wherein the messaging service provides messaging infrastructure between a Self Organizing Network (SON) manager on different HetNet Gateways (HNGs) to communicate and share required information.

4. The method of claim 3 wherein the messaging service further provides one-to-many and one-to-one communications.

5. The method of claim 4, further comprising running, by each HNG cluster, a Self Optimizing Network Manager (SON Mgr) process, the SONMgr having the messaging client integrated therein and wherein the SONMgr, using the integrated client, communicates with the messaging service.

6. The method of claim 1, wherein the synchronization service provides communication and synchronization between different Self Organizing Network (SON) managers such that only one SON manager performs a task.

7. The method of claim 6, further comprising providing, by the synchronization service, synchronized communications between different Self Optimizing Network Managers (SONMgrs).

8. The method of claim 1 further comprising actively monitoring at an application level.

9. The method of claim 8 wherein actively monitoring includes monitoring a latency of messages.

10. A system for providing a Service Bus for telecommunications infrastructure, comprising:
a communications system between mutually interacting software applications of the telecommunications infrastructure, including at least one processor executing software instructions, including a plurality of telecommunication microservices, each microservice comprising:
an internal bus;
a data store in communication with the internal bus;
a data access object in communication with the internal bus;
a message exchange object in communication with the internal bus;
a MAPReduce engine in communication with the internal bus; and
a restful Application Programming Interface (API) bus in communication with the data access object, the message exchange object and the MAPReduce engine;
wherein the Service Bus includes a telecommunications infrastructure messaging service, a telecommunications infrastructure synchronization service and a telecommunications infrastructure persistence service, and wherein messages are routed between services, routing of message exchange between servers are monitored and controlled, contention between communicating service components are resolved, deployment and versioning of services are controlled, use of redundant services is marshalled, and commodity services are provided; and
wherein the Service Bus provides infrastructure services for a stateless system wherein processing and state information are separated, and wherein the system has loosely coupled components that are cloned as needed and are decomposable into smaller functional units.

11. The system of claim 10, wherein commodity services include at least one of event handling, data transformation and mapping, message and event queueing and sequencing, security and exception handling, protocol conversion, and enforcing quality of communication services.

12. The system of claim 10, wherein the messaging service provides messaging infrastructure between a Self Organizing Network (SON) manager on different HetNet Gateways (HNGs) to communicate and share required information.

13. The system of claim 12 wherein the messaging service further provides one-to-many and one-to-one communications.

14. The system of claim 13, wherein each HNG cluster, runs a Self Optimizing Network Manager (SONMgr) process, the SONMgr having the messaging client integrated therein and wherein the SONMgr, using the integrated client, communicates with the messaging service.

15. The system of claim 10, wherein the synchronization service provides communication and synchronization between different Self Organizing Network (SON) managers such that only one SON manager performs a task.

16. The system of claim 15, wherein the synchronization service provides synchronized communications between different SONMgrs.

17. The system of claim 10 active monitoring is performed at an application level.

18. The system of claim 17 wherein active monitoring includes monitoring a latency of messages.

19. A non-transitory computer-readable medium containing instructions for providing a Service Bus for telecommunications infrastructure, comprising:
providing a communications system between mutually interacting software applications of the telecommunications infrastructure, including a plurality of telecommunication microservices, each microservice comprising:
an internal bus;
a data store in communication with the internal bus;
a data access object in communication with the internal bus;
a message exchange object in communication with the internal bus;
a MAPReduce engine in communication with the internal bus;
a restful Application Programming Interface (API) bus in communication with the data access object, the message exchange object and the MAPReduce engine; and
providing a telecommunications infrastructure messaging service, a telecommunications infrastructure synchronization service and a telecommunications infrastructure persistence service, and routing messages between services, monitoring and controlling routing of message exchange between servers, resolving contention between communicating service components, controlling deployment and versioning of services, marshaling use of redundant services, and providing commodity services; and
wherein the Service Bus provides infrastructure services for a stateless system wherein processing and state information are separated, and wherein the system has loosely coupled components that are cloned as needed and are decomposable into smaller functional units.

20. The non-transitory computer-readable medium of claim 19, including instructions wherein providing commodity services include at least one of event handling, data transformation and mapping, message and event queueing and sequencing, security and exception handling, protocol conversion, and enforcing quality of communication services; and
wherein the messaging service provides messaging infrastructure between a Self Organizing Network (SON) manager on different Heterogenous Network (HetNet) Gateways (HNGs) to communicate and share required information.

* * * * *